United States Patent
Muroya et al.

(10) Patent No.: US 12,515,864 B2
(45) Date of Patent: Jan. 6, 2026

(54) PREFORM, DOUBLE CONTAINER AND METHOD OF MANUFACTURING THEREOF

(71) Applicant: KYORAKU CO., LTD., Kyoto (JP)

(72) Inventors: Yosuke Muroya, Yamato (JP); Shinsuke Taruno, Yamato (JP); Yuhi Kurahashi, Yamato (JP); Takayuki Kato, Yamato (JP); Takeru Sano, Yamato (JP); Ippei Ohmura, Yamato (JP); Takaya Niimi, Yamato (JP); Kouichiro Yoshida, Chuo-ku (JP); Tetsuaki Eguchi, Yamato (JP)

(73) Assignee: KYORAKU CO., LTD., Kyoto (JP)

( * ) Notice: Subject to any disclaimer, the term of this patent is extended or adjusted under 35 U.S.C. 154(b) by 23 days.

(21) Appl. No.: 18/551,927

(22) PCT Filed: Mar. 29, 2022

(86) PCT No.: PCT/JP2022/015502
§ 371 (c)(1),
(2) Date: Sep. 22, 2023

(87) PCT Pub. No.: WO2022/215598
PCT Pub. Date: Oct. 13, 2022

(65) Prior Publication Data
US 2024/0190636 A1 Jun. 13, 2024

(30) Foreign Application Priority Data

Apr. 5, 2021 (JP) .................................. 2021-063978
Apr. 23, 2021 (JP) .................................. 2021-073166
(Continued)

(51) Int. Cl.
B65D 77/22 (2006.01)
B29C 49/08 (2006.01)
(Continued)

(52) U.S. Cl.
CPC ............ *B65D 77/06* (2013.01); *B65D 77/22* (2013.01); *B29C 45/16* (2013.01); *B29C 49/08* (2013.01);
(Continued)

(58) Field of Classification Search
CPC .. B65D 77/06; B65D 83/771; B65D 83/7712; B65D 35/24; B65D 35/28; A47K 5/122
See application file for complete search history.

(56) References Cited

U.S. PATENT DOCUMENTS 2,234,857 A * 3/1941 Thorn ................ B65D 83/7712
222/93
2006/0037968 A1* 2/2006 Brenner ............... B65D 83/771
222/105
(Continued)

FOREIGN PATENT DOCUMENTS

EP 2243557 A1 10/2010
JP H074331 U 1/1995
(Continued)

OTHER PUBLICATIONS

International Search Report and Written Opinion issued on Jun. 28, 2022, in corresponding International Application No. PCT/JP2022/015502; 30 pages.
(Continued)

*Primary Examiner* — Andrew T Kirsch
(74) *Attorney, Agent, or Firm* — Maier & Maier, PLLC

(57) ABSTRACT

Provided is a double container where an inner bag can be easily pulled out from an outer shell. According to the present invention, a double container comprising a container body and a mouth part attachment member is provided. The container body includes a mouth part and a body part and a bottom part. The mouth part is a tubular portion having an open end. The body part is arranged adjacent to the mouth
(Continued)

part on a side farther from the open end than the mouth part, and has a larger outer diameter than the mouth part. The bottom part is configured to close a lower end of the body part. The container body includes an inner bag and an outer shell arranged to cover the inner bag. And the mouth part attachment member is configured to be attachable to the mouth part, and is configured such that the inner bag rotates as the mouth part attachment member rotates.

14 Claims, 48 Drawing Sheets

(30) Foreign Application Priority Data

| | | |
|---|---|---|
| May 26, 2021 | (JP) | 2021-088626 |
| Jun. 15, 2021 | (JP) | 2021-099348 |
| Jun. 18, 2021 | (JP) | 2021-102005 |
| Jul. 7, 2021 | (JP) | 2021-113097 |
| Jul. 19, 2021 | (JP) | 2021-119122 |
| Aug. 16, 2021 | (JP) | 2021-132284 |
| Aug. 20, 2021 | (JP) | 2021-135039 |
| Sep. 24, 2021 | (JP) | 2021-155931 |

(51) Int. Cl.
*B65D 77/06* (2006.01)
*B29C 45/16* (2006.01)
*B29D 22/00* (2006.01)
*B29K 23/00* (2006.01)
*B29K 67/00* (2006.01)
*B29K 105/00* (2006.01)
*B29L 9/00* (2006.01)
*B29L 22/00* (2006.01)

(52) U.S. Cl.
CPC ........ *B29D 22/003* (2013.01); *B29K 2023/00* (2013.01); *B29K 2023/086* (2013.01); *B29K 2067/003* (2013.01); *B29K 2105/0085* (2013.01); *B29K 2995/0067* (2013.01); *B29L 2009/001* (2013.01); *B29L 2022/00* (2013.01)

(56) References Cited

U.S. PATENT DOCUMENTS

| | | | |
|---|---|---|---|
| 2006/0054635 A1 | 3/2006 | Iwahashi et al. | |
| 2009/0014471 A1* | 1/2009 | Lin | B05B 11/026 222/96 |
| 2009/0174102 A1 | 7/2009 | Iwahashi et al. | |
| 2020/0324931 A1 | 10/2020 | Hosokoshiyama et al. | |
| 2020/0339300 A1 | 10/2020 | Oshino et al. | |
| 2021/0129409 A1 | 5/2021 | Kelley et al. | |
| 2022/0097893 A1 | 3/2022 | Sasaki | |
| 2022/0258403 A1 | 8/2022 | Covi | |

FOREIGN PATENT DOCUMENTS

| | | |
|---|---|---|
| JP | H10237319 A | 9/1998 |
| JP | 200062745 A | 2/2000 |
| JP | 2000296888 A | 10/2000 |
| JP | 2003026175 A | 1/2003 |
| JP | 2003192031 A | 7/2003 |
| JP | 2004018113 A | 1/2004 |
| JP | 3169296 U | 7/2011 |
| JP | 2011148094 A | 8/2011 |
| JP | 2013224020 A | 10/2013 |
| JP | 2014005073 A | 1/2014 |
| JP | 2015163520 A | 9/2015 |
| JP | 2017171368 A | 9/2017 |
| JP | 2017197258 A | 11/2017 |
| JP | 2018052578 A | 4/2018 |
| JP | 2018052616 A | 4/2018 |
| JP | 2018134813 A | 8/2018 |
| JP | 2018138477 A | 9/2018 |
| JP | 2018167884 A | 11/2018 |
| JP | 2019010741 A | 1/2019 |
| JP | 2019130915 A | 8/2019 |
| JP | 2019131256 A | 8/2019 |
| JP | 2020193007 A | 12/2020 |
| JP | 2020203468 A | 12/2020 |
| JP | 2021020698 A | 2/2021 |
| JP | 2021084701 A | 6/2021 |
| WO | 2004071887 A1 | 8/2004 |
| WO | 2020158127 A1 | 8/2020 |
| WO | 2021009785 A1 | 1/2021 |
| WO | 2021085374 A1 | 5/2021 |

OTHER PUBLICATIONS

Partial Supplementary Search Report issued on Aug. 29, 2024, in corresponding European Application No. 22784582.3, 16 pages.
Office Action issued on Aug. 27, 2024, in corresponding Japanese Application No. 2021-099348, 8 pages.
Office Action issued on May 7, 2025, in corresponding Japanese Application No. 2021-102005, 6 pages.
Office Action issued on Jun. 23, 2025, in corresponding Korean Application No. 10-2023-7037881, 44 pages.
Office Action issued on Jun. 24, 2025, in corresponding Japanese Application No. 2021-135039, 6 pages.
Office Action issued on Apr. 22, 2025, in corresponding Japanese Application No. 2021-088626, 8 pages.
Office Action issued on Feb. 4, 2025, in corresponding Japanese Application No. 2021-073166, 6 pages.
Office Action issued on Aug. 12, 2025, in corresponding Japanese Application No. 2021-102005, 14 pages.
Office Action issued on Jul. 15, 2025, in corresponding Japanese Application No. 2021-155931, 10 pages.
Office Action issued on May 20, 2025, in corresponding Japanese Application No. 2021-119122, 12 pages.
Office Action issued on Sep. 9, 2025, in corresponding Japanese Application No. 2021-119122, 11 pages.

\* cited by examiner

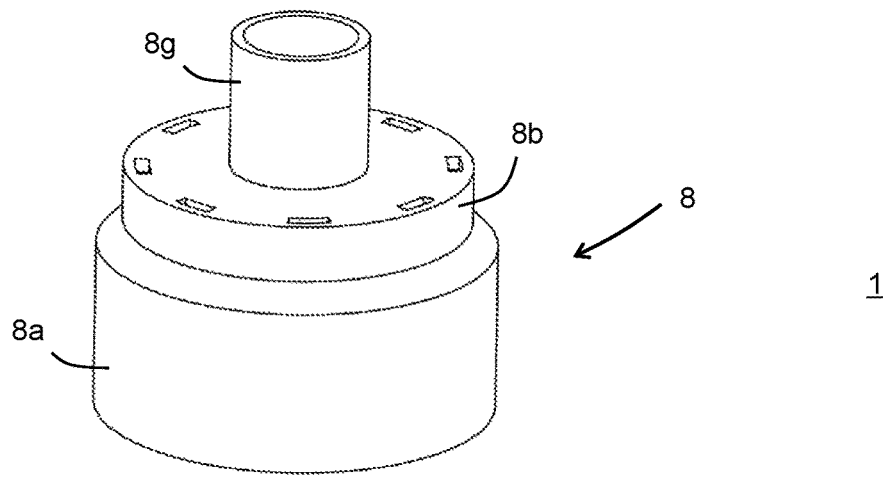
FIG.4A
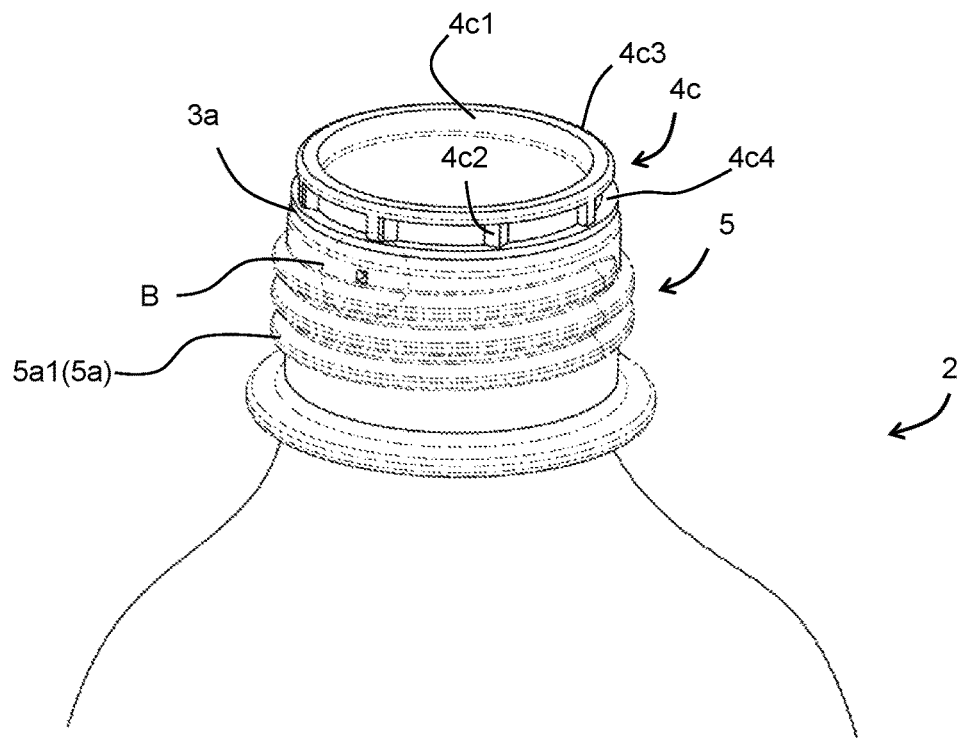
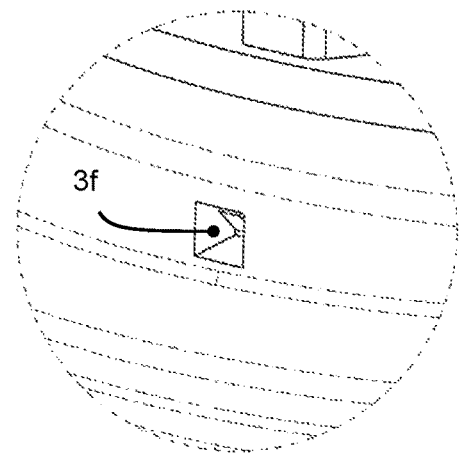
FIG.4B

FIG.10
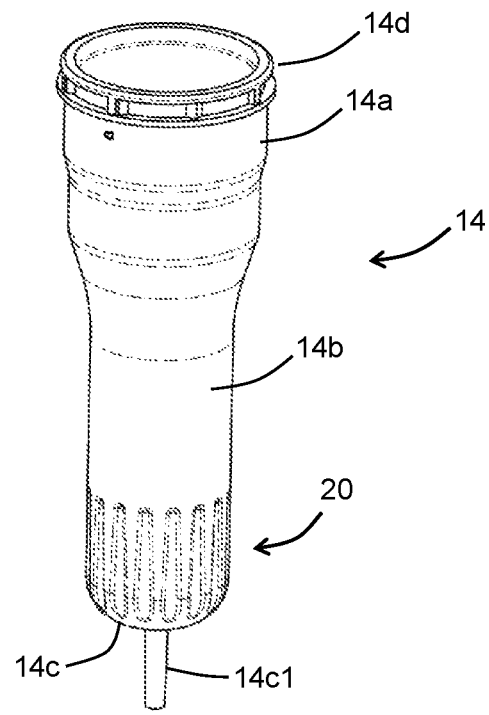
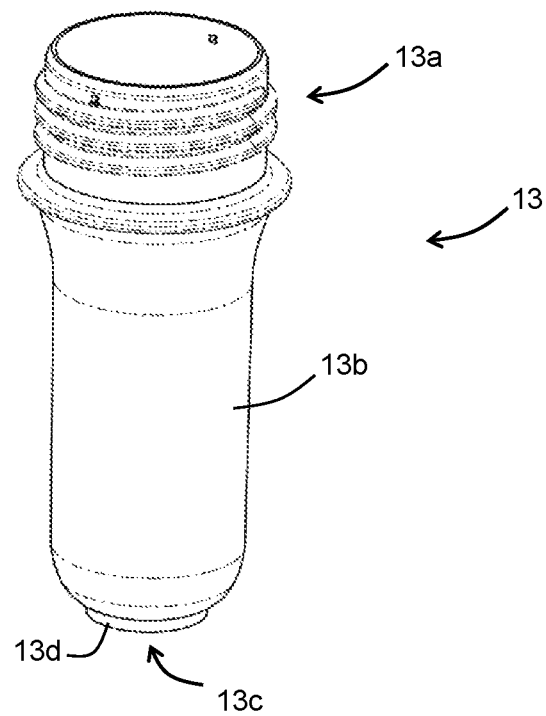

FIG.16
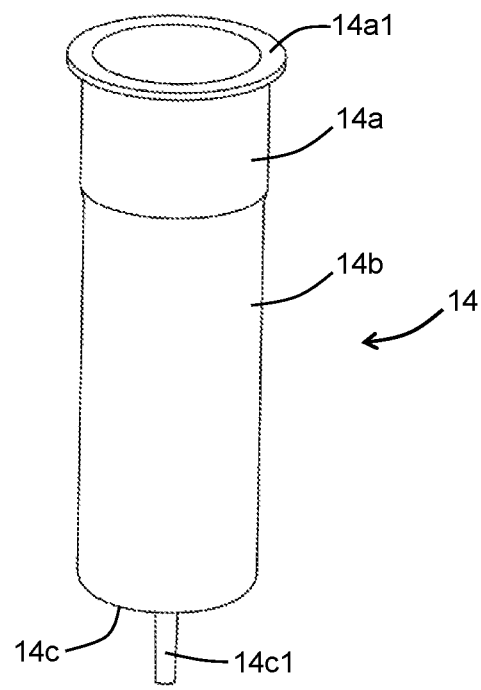
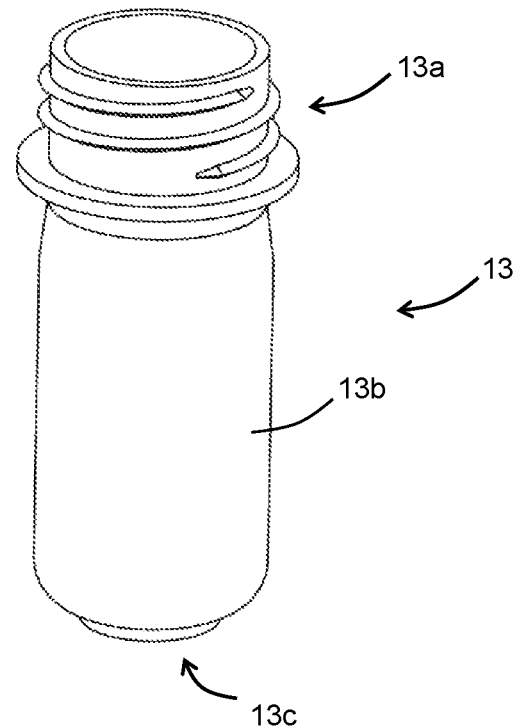

FIG.26
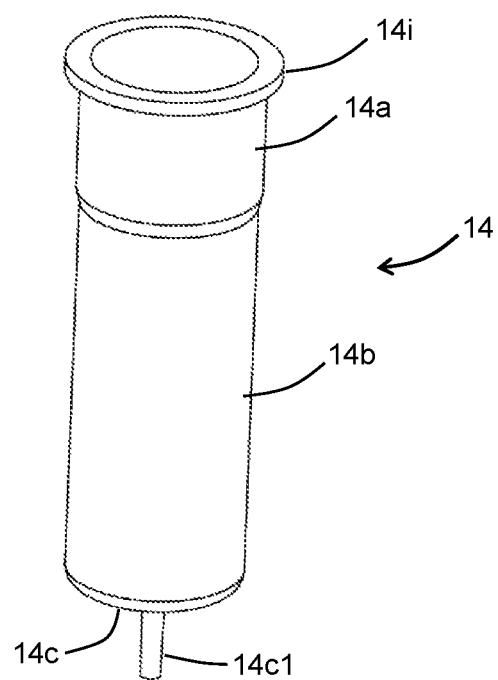
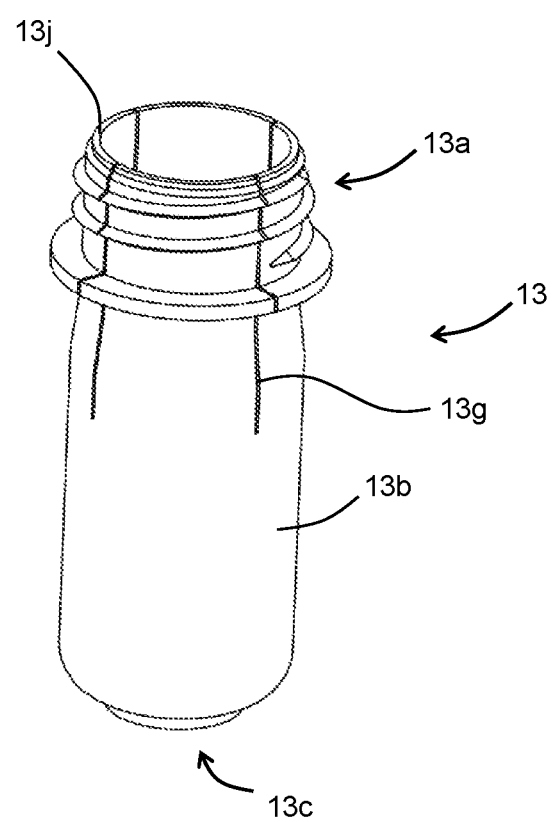

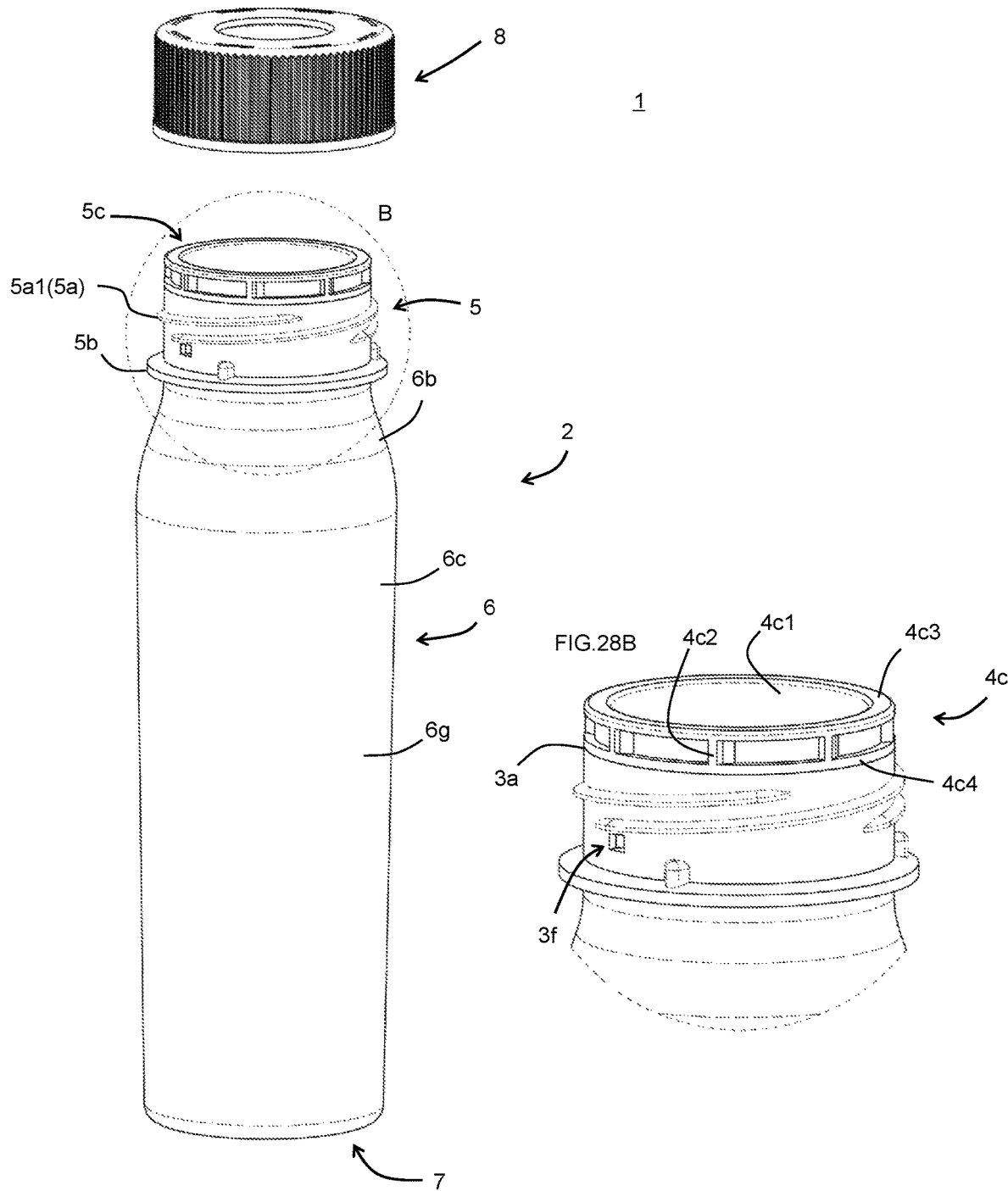

FIG. 36
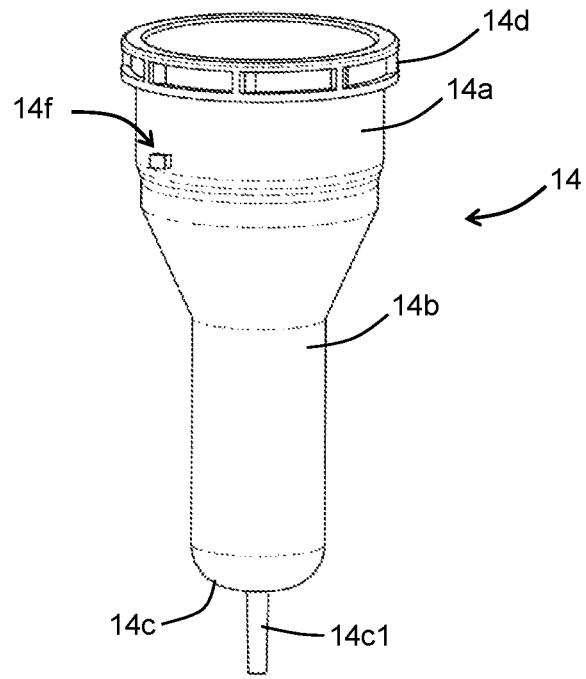
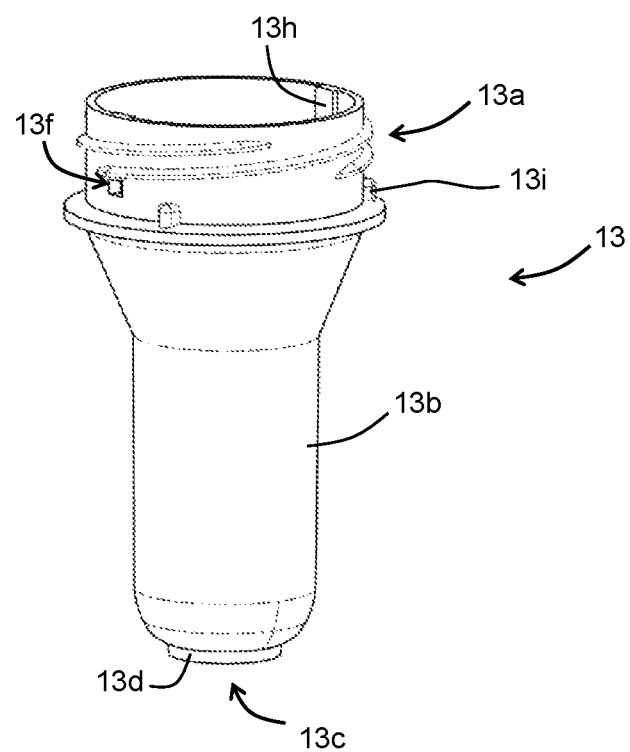

FIG.42
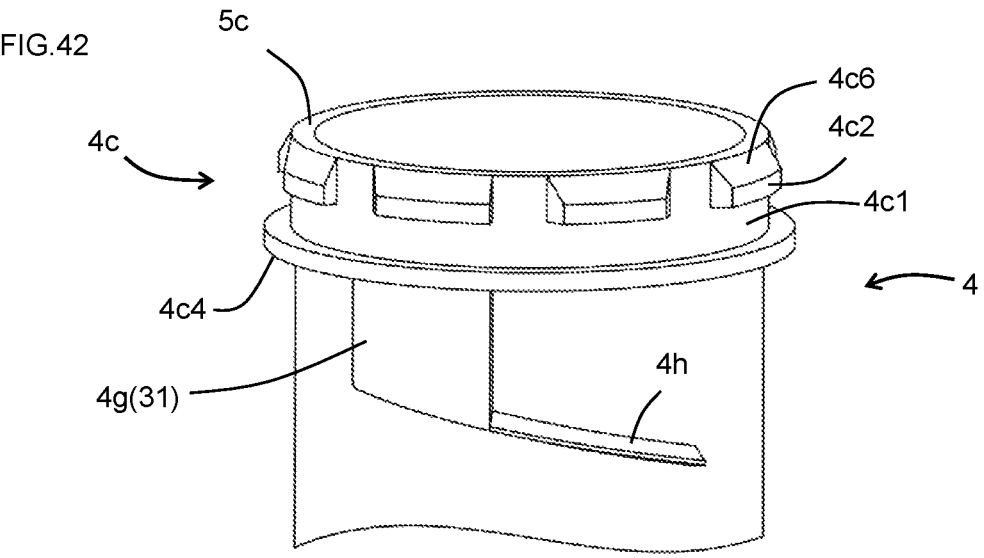
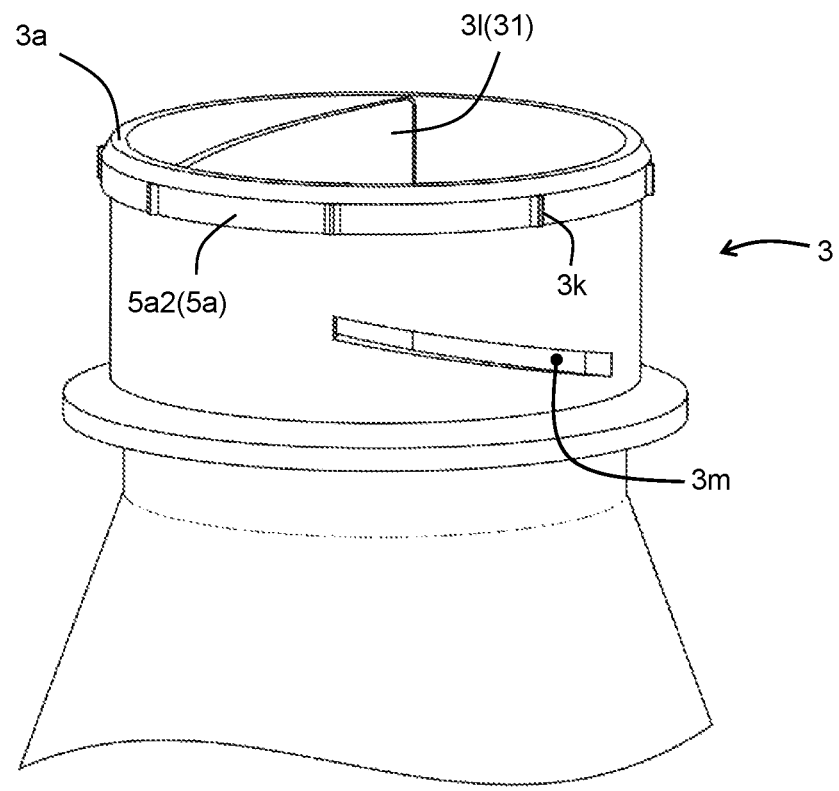

FIG. 47
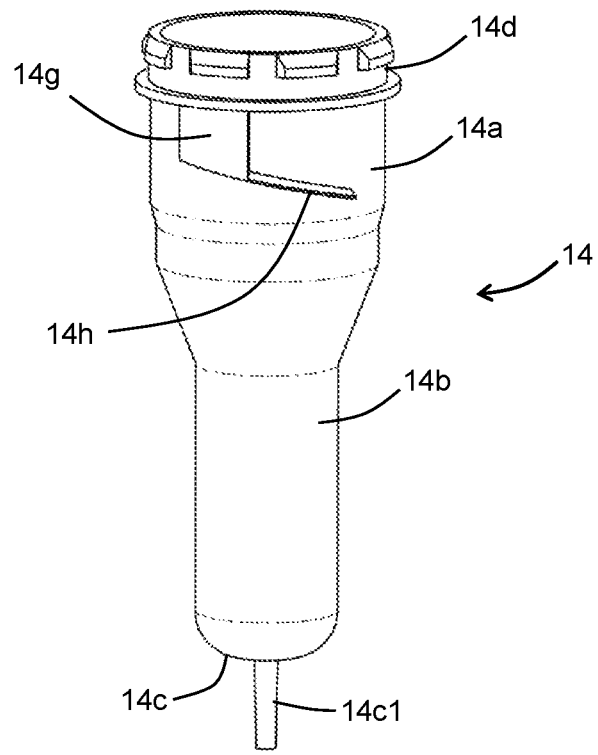
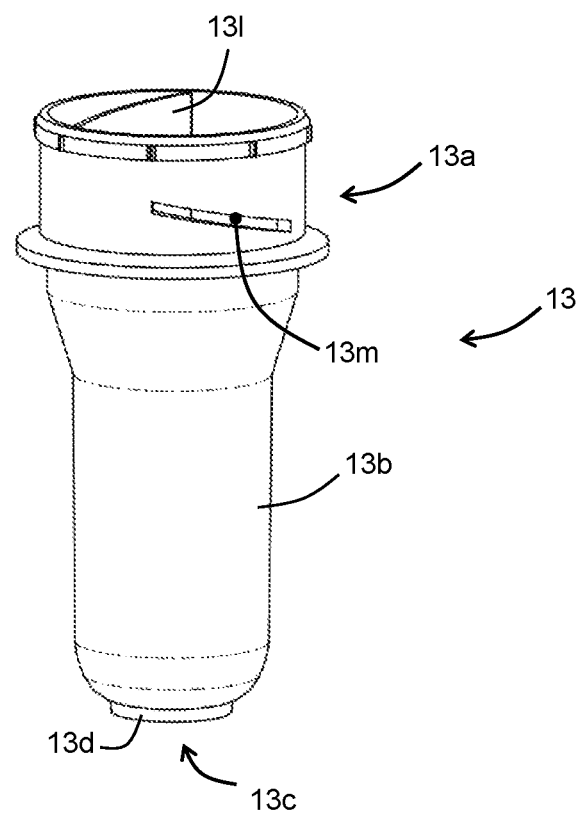

PREFORM, DOUBLE CONTAINER AND METHOD OF MANUFACTURING THEREOF

TECHNICAL FIELD

The present invention relates to a preform, a double container and a method of manufacturing thereof.

BACKGROUND ART

Conventionally, a double container is known which comprises a container body having an outer shell and an inner bag. For example, Patent Literatures 1 and 2 disclose a double container formed by biaxially stretch blow molding in a state where an outer preform and an inner preform are stacked.

CITATION LIST

Patent Literature

[Patent Literature 1] JP-A-2019-10741
[Patent Literature 2] WO2004/071887

SUMMARY OF INVENTION

Technical Problem

By the way, when the outer shell and the inner bag of such a double container are formed of different materials, or when a content adheres to the inner bag after use, etc., it is desirable to separate the outer shell and the inner bag when recycling the double container.

First and Second Perspectives

The present invention has been made in view of such circumstances, and provides a double container where the inner bag can be easily pulled out from the outer shell.

Third Perspective

In order to facilitate separation of the inner bag from the outer shell, it is preferable that the inner bag and the outer shell are loosely fitted at a mouth part of the container body so that the inner bag is not tightened by the outer shell. However, in this case, the inner bag tends to rotate relative to the outer shell at the mouth part of the container body. After the content is filled in the container body, when a mouth part attachment member (a cap, a pump, etc.) having an inner ring is screwed into the mouth part of the container body and attached, a friction between the inner ring and an inner surface of the mouth part may causes the mouth part of the inner bag and the cap to rotate together, twisting the inner bag. When the inner bag is twisted, there arises a problem that the content in the inner bag overflows.

The present invention has been made in view of such circumstances, and provides a double container where twisting of the inner bag is suppressed when the mouth part attachment member having the inner ring is attached and the inner bag can be easily pulled out from the outer shell after use.

Fourth Perspective

In a reference example using a homopolypropylene as a material for the inner preform and an amorphous PET as a material for the outer preform, when the double container is manufactured by biaxial stretch blow molding in a state where the inner preform and the outer preform are stacked, the inventor of the present invention discovered a phenomenon where the inner bag of the double container shrinks during cooling, a gap occurs between the inner bag and the outer shell, and the content quantity of the inner bag becomes less than the specified amount may occur.

The present invention has been made in view of such circumstances, and provides a preform that can suppress shrinkage of the inner bag during cooling after molding.

Fifth Perspective

Although the outer shell and the inner bag can be separated by the user pulling the inner bag out of the outer shell, it is not easy for the user to determine how to handle the inner bag after separation.

The present invention has been made in view of such circumstances, and provides a double container that can improve the handleability of the inner bag separated from the outer shell.

Sixth to Eighth Perspectives

The outer shell and the inner bag can be separated by the user pulling the inner bag out of the outer shell, but it is desired to reduce the force required to pull.

The present invention has been made in view of such circumstances, and provides a double container that can reduce the force required to pull out the inner bag.

Ninth Perspective

It is assumed that the outer shell and the inner bag are separated by pulling the inner bag out of the outer shell, and it is desired that the inner bag be easily pulled out of the outer shell.

The present invention has been made in view of such circumstances, and provides a double container that allows the inner bag to be pulled out from the outer shell.

Tenth Perspective

It is desirable to be able to separate the outer shell and inner bag by pulling the inner bag from the outer shell by the user, and to reduce the force required to pull the inner bag out.

In addition, it is desired to improve the gas barrier property of the inner bag in order to suppress deterioration of the contents. If an EVOH layer having excellent gas barrier properties is provided in the inner bag, it is possible to improve the gas barrier properties, but the inner bag becomes hard and the pullability of the inner bag deteriorates.

The present invention has been made in view of such circumstances, and provides a double container that can improve the gas barrier properties of the inner bag while suppressing the deterioration of the pullability of the inner bag.

Solution to Problem

First Perspective

According to the present invention, a double container comprising a container body and a mouth part attachment member is provided. The container body includes a mouth part and a body part and a bottom part. The mouth part is a tubular portion having an open end. The body part is arranged adjacent to the mouth part on a side farther from the open end than the mouth part, and has a larger outer diameter than the mouth part. The bottom part is configured to close a lower end of the body part. The container body includes an inner bag and an outer shell arranged to cover the inner bag. The mouth part attachment member is configured to be attachable to the mouth part, and is configured such that the inner bag rotates as the mouth part attachment member rotates.

In the double container of the present invention, since the inner bag is configured to rotate as the mouth part attachment member rotates, the inner bag can be twisted by rotating the mouth part attachment member. Since the body part of the container body has a larger outer diameter than the mouth part, it is not easy to pull out the inner bag through the mouth part simply by pulling the inner bag. However, by twisting the inner bag to reduce the diameter of the body part, the body part of the inner bag can easily pass through the mouth part of the outer shell, and the inner bag can be easily pulled out from the outer shell.

Hereinafter, various embodiments of the present invention will be described. The embodiments described hereinafter can be combined with each other.

Preferably, the inner bag includes a projecting part projecting from an open end of the outer shell, the projecting part includes a projecting cylinder and an engagement protrusion projecting radially outward from a peripheral surface of the projecting cylinder, and the double container is configured such that the inner bag rotates as the mouth part attachment member rotates by engaging the engagement protrusion with a claw part of the mouth part attachment member in a rotational direction of the mouth part attachment member.

Preferably, the projecting part includes an engagement flange at a position farther from the open end than the engagement protrusion, and the double container is configured such that the inner bag is pulled out from the outer shell as the mouth part attachment member is moved in a direction away from the open end by engaging the engagement flange with the claw part of the mouth part attachment member in an axial direction of the mouth part.

Preferably, the projecting part includes an abutting flange abutting on the open end, and the engagement protrusion is arranged between the abutting flange and the engagement flange.

Preferably, a concave-convex shape is provided where a recessed stripe and a projecting stripe alternately appear in a circumferential direction of the mouth part on an inner surface of at least one of the mouth part and a position of the body part adjacent to the mouth part, and the recessed stripe and the projecting stripe extend non-parallel to the circumferential direction of the mouth part.

Preferably, a double container comprising a container body is provided. The container body includes a mouth part and a body part and a bottom part, the mouth part is a tubular portion having an open end, the body part is arranged adjacent to the mouth part on a side farther from the open end than the mouth part, and has a larger outer diameter than the mouth part, the bottom part is configured to close a lower end of the body part, the container body includes an inner bag and an outer shell arranged to cover the inner bag, an concave-convex shape is provided where a recessed stripe and a projecting stripe alternately appear in a circumferential direction of the mouth part on an inner surface of at least one of the mouth part and a position of the body part adjacent to the mouth part, and the recessed stripe and the projecting stripe extend non-parallel to the circumferential direction of the mouth part.

Second Perspective

According to the present invention, a double container comprising a container body is provided. The container body includes a mouth part and a body part and a bottom part. The mouth part is a tubular portion having an open end. The body part is arranged adjacent to the mouth part on a side farther from the open end than the mouth part, and has a larger outer diameter than the mouth part. The bottom part is configured to close a lower end of the body part, the container body includes an inner bag and an outer shell arranged to cover the inner bag. And an alternating wall thickness shape where a thin part and a thick part having a greater thickness than the thin part alternately appear in a circumferential direction is provided in a bottom part of the inner bag.

Since the body part of the container body has a larger outer diameter than the mouth part, it is not easy to pull out the inner bag through the mouth part simply by pulling the inner bag. However, by twisting the inner bag to reduce the diameter of the body part, the body part of the inner bag can easily pass through the mouth part of the outer shell. On the other hand, in a conventional double container, even if the inner bag is simply twisted, the diameter of the bottom part is not easily reduced, and it is not easy to pull out the bottom part from the mouth part.

In the double container of the present invention, an alternating wall thickness shape where a thin part and a thick part alternately appear in a circumferential direction is provided in the bottom part of the inner bag. With such a shape, when the inner bag is twisted, the thin part is likely to be selectively bent, and as a result, the bottom part of the inner bag is likely to be deformed into a bellows shape and reduced in diameter. Therefore, in the double container of the present invention, when the inner bag is twisted, the diameter of the bottom part is easily reduced, so that the inner bag can be easily pulled out from the outer shell.

Hereinafter, various embodiments of the present invention will be described. The embodiments described hereinafter can be combined with each other.

Preferably, a bottom part concave region and a peripheral edge region surrounding the bottom part concave region are provided in the bottom part of the inner bag, and the alternating wall thickness shape is provided on at least one of a peripheral surface of the bottom part concave and the peripheral edge region.

Preferably, the alternating wall thickness shape is provided to extend over the peripheral surface and the peripheral edge region.

Preferably, the alternating wall thickness shape is provided to extend over the peripheral edge region and a side surface of the inner bag.

Preferably, the thin part is formed by providing a recessed stripe on one or both of an inner surface and an outer surface of the inner bag.

Preferably, when a thickness of the inner bag at the thin part is T1 and a thickness of the inner bag at the thick part is T2 in a cross section perpendicular to a height direction of the inner bag, a minimum value of T1/T2 is 0.8 or less.

Third Perspective

According to the present invention, a double container comprising a container body is provided. The container body includes a mouth part and a body part and a bottom part. The mouth part is a tubular portion having an open end. The body part is arranged adjacent to the mouth part on a side farther from the open end than the mouth part, and has a larger outer diameter than the mouth part. The bottom part is configured to close a lower end of the body part. The container body includes an inner bag and an outer shell arranged to cover the inner bag. And a first resistance to relative rotation in one direction of the inner bag with respect to the outer shell in the mouth part is greater than a second resistance to relative rotation in the other direction.

In the double container of the present invention, the first resistance to relative rotation in one direction of the inner bag with respect to the outer shell in the mouth part of the container body is greater than a second resistance to relative rotation in the other direction. Therefore, by setting one direction as the tightening direction of the mouth part attachment member, twisting of the inner bag when the mouth part attachment member is attached is suppressed. When the inner bag is separated from the outer shell after use, the inner bag can be easily twisted and reduced in diameter by rotating the mouth part of the inner bag in the other direction relative to the outer shell. Therefore, it is easy to pull out the inner bag from the outer shell.

Hereinafter, various embodiments of the present invention will be described. The embodiments described hereinafter can be combined with each other.

Preferably, the mouth part includes a male threaded part that is a right-hand thread, and the one direction and the other direction are a clockwise direction and a counterclockwise direction, respectively, when viewed from an upper side of the container body.

Preferably, the double container includes a mouth part attachment member, the mouth part attachment member includes a female threaded part that can be screwed onto the male threaded part of the mouth part, the one direction is a tightening direction of the mouth part attachment member, and the other direction is a loosening direction of the mouth part attachment member.

Preferably, the inner bag and the outer shell are in concave-convex engagement in the mouth part, and the concave-convex engagement is configured such that the first resistance is greater than the second resistance.

Preferably, the concave-convex engagement is an engagement between a convex part provided on an outer peripheral surface of the inner bag and a concave part provided on an inner peripheral surface of the outer shell.

Preferably, a concave part of the concave-convex engagement is formed of a groove, and the concave-convex engagement is configured to able to be released by moving the convex part of the concave-convex engagement along the groove.

Preferably, an inclination angle of the groove coincides with an inclination angle of a thread of a male threaded part provided in the mouth part.

Preferably, a method of manufacturing a double container comprising biaxial stretch blow molding step is provided. In the biaxial stretch blow molding step, a container body is formed by heating a preform configured by covering an inner preform with an outer preform and performing a biaxial stretch blow molding, and the inner preform and the outer preform are in concave-convex engagement in the mouth part of the preform.

Fourth Perspective

According to the present invention, a preform configured by covering an inner preform with an outer preform is provided. The inner preform includes a polyolefin layer composed of a polyolefin-based resin including a polyolefin. The outer preform includes an amorphous PET layer composed of an amorphous PET-based resin including an amorphous PET. And when a temperature range between a crystallization peak temperature and a melting peak temperature of the polyolefin-based resin is a first temperature range and a temperature range between a softening completion temperature and a crystallization start temperature of the amorphous PET-based resin is a second temperature range, an overlapping temperature range where the first temperature range and the second temperature range overlap is 2° C. or more.

In the above reference example, when the reason why the inner bag is likely to shrink when cooling after molding is analyzed, the amorphous PET becomes a softened state suitable for molding at the molding temperature in the reference example, it was found that the reason was that the homopolypropylene was not sufficiently softened. In other words, it was found that the inner bag was likely to shrink during cooling after molding because the homopolypropylene forming the inner preform was not sufficiently softened during the molding.

As a result of further analysis, it was found that polyolefin such as homopolypropylene becomes a softening state suitable for molding in the first temperature range, amorphous PET becomes a softening state suitable for molding in the second temperature range, and within the overlapping temperature range where the first temperature range and the second temperature range overlap, both polyolefin and amorphous PET are in a softened state suitable for molding. It was also found that homopolypropylene and amorphous PET are not easily molded at a temperature suitable for both because the overlapping temperature range is within a very narrow temperature range of about 1° C.

On the other hand, in the preform of the present invention, the overlapping temperature range is 2° C. or higher. For this reason, compared to the case of the reference example described above, it becomes easier to mold at a molding temperature at which both polyolefin and amorphous PET can be in a softened state suitable for molding. As a result, shrinkage of the inner bag during cooling after molding can be suppressed.

Hereinafter, various embodiments of the present invention will be described. The embodiments described hereinafter can be combined with each other.

Preferably, the polyolefin includes a propylene copolymer which is copolymer between a propylene and another monomer.

Preferably, the polyolefin includes a homopolypropylene and a low density polyethylene or a linear low density polyethylene.

Preferably, the overlapping temperature range is 10° C. or more.

Preferably, A method of manufacturing a double container using the preform is provided. Biaxial stretch blow molding is performed by heating the preform to a temperature within the overlapping temperature range.

Fifth Perspective

According to the present invention, a double container comprising a container body is provided. The container body includes an inner bag and an outer shell arranged to cover the inner bag. The inner bag is configured to be separable from the outer shell. And an information transmission display is printed on the inner bag by irradiating a laser light.

In the configuration of the present invention, an information transmission display is printed by irradiating a laser light on the inner bag that is configured to be separable from the outer shell. The "information transmission display" is a display for transmitting information, and is composed of, for example, graphics and text. For this reason, for example, by attaching the information transmission display indicating the material of the inner bag and the recycling method to the inner bag, it becomes easier for the user to determine how to handle the separated inner bag. For this reason, the handleability of the inner bag separated from the outer shell is improved.

Hereinafter, various embodiments of the present invention will be described. The embodiments described hereinafter can be combined with each other.

Preferably, the laser marking agent is blended into the inner bag, and the laser marking agent is a substance that absorbs a laser light more easily than a resin that configures the inner bag and/or that discolors due to a laser light absorption more easily than the resin that configures the inner bag.

Sixth Perspective

According to the present invention, a double container comprising a container body including an inner bag and an outer shell is provided. The container body includes a mouth part and a body part and a bottom part. The mouth part is a tubular portion having an open end. The body part is arranged adjacent to the mouth part on a side farther from the open end than the mouth part, and has a larger outer diameter than the mouth part. The bottom part is configured to close a lower end of the body part. The body part includes a shoulder part that increases in outer diameter as it moves away from the mouth part. And a concave-convex shape that reduces a contact area between an outer surface of the inner bag and an inner surface of the outer shell is provided in at least one of the outer surface of the inner bag and the inner surface of the outer shell in the shoulder part of the container body.

In the double container of the present invention, a concave-convex shape that reduces a contact area between an outer surface of the inner bag and an inner surface of the outer shell is provided in at least one of the outer surface of the inner bag and the inner surface of the outer shell in the shoulder part of the container body. Since the shoulder part is a portion where the outer diameter increases as the distance from the mouth part increases, the outer surface of the inner bag is particularly strongly pressed against the inner surface of the outer shell at the shoulder part when the inner bag is pulled out from the outer shell. Therefore, by providing the concave-convex shape on the shoulder part, it is possible to effectively reduce the force required to pull out the inner bag.

Hereinafter, various embodiments of the present invention will be described. The embodiments described hereinafter can be combined with each other.

Preferably, when the concave-convex shape is a first concave-convex shape, a concave-convex shape is not provided or a second concave-convex shape that is not complementary shape to the first concave-convex shape is provided on the other of the outer surface of the inner bag and the inner surface of the outer shell.

Preferably, A method of manufacturing a double container comprising a step for manufacturing a container body by biaxially stretch blow molding a preform configured by an inner preform and an outer preform is provided. In a portion that become a shoulder part of the container body after the biaxial stretch blow molding, a concave-convex shape is provided with at least one of an outer surface of the inner preform and an inner surface of the outer preform.

Preferably, the concave-convex shape is provided with the outer surface of the inner preform.

Preferably, the concave-convex shape is formed by transferring a concave-convex shape formed on a mold by blasting to the inner preform or the outer preform.

Seventh Perspective

According to the present invention, a double container comprising a container body including an inner bag and an outer shell is provided. An easily diameter expandable part that facilitates diameter expansion of the mouth part of the outer shell when the inner bag is pulled out from the outer shell is provided in the mouth part of the outer shell.

In the double container of the present invention, the easily diameter expandable part is provided in the mouth part of the outer shell. Therefore, when the inner bag is pulled out from the outer shell, the diameter of the mouth part of the outer shell is expanded, thereby reducing the force required to pull out the inner bag.

Hereinafter, various embodiments of the present invention will be described. The embodiments described hereinafter can be combined with each other.

Preferably, the easily diameter expandable part is configured by a slit provided in the mouth part of the outer shell.

Preferably, the easily diameter expandable parts are provided at a plurality of locations spaced apart in a circumferential direction in the mouth part of the outer shell.

Preferably, the double container includes a diameter expansion suppression part that suppresses diameter expansion of the mouth part of the outer shell before starting to pull out the inner bag.

Preferably, the inner bag includes a flange, and the diameter expansion suppression part is configured by engaging the flange with an open end of the outer shell.

Eighth Perspective

According to the present invention, a double container comprising a container body including an inner bag and an outer shell is provided. The container body includes a mouth part and a body part and a bottom part. The mouth part is a tubular portion having an open end. The body part is arranged adjacent to the mouth part on a side farther from the open end than the mouth part, and has a larger outer diameter than the mouth part. The bottom part is configured to close a lower end of the body part. The body part includes a curved part that curves to bulge outward. And when a diameter of the container body at a part where a radius of curvature at the curved part is the smallest is D and the radius of curvature is R, R/D is 0.5 or more.

In a conventional double container, a curved part with a small radius of curvature is provided in the body part of the container body, and the inner bag is strongly pressed against the outer shell in the vicinity of this curved part. Therefore, the force required to pull out the inner bag was increased. In the present embodiment, since R/D is 0.5 or more, the curved part is gentle, and the inner bag is prevented from being pressed against the outer shell in the vicinity of the curved part, the force required to pull out the inner bag is reduced.

Hereinafter, various embodiments of the present invention will be described. The embodiments described hereinafter can be combined with each other.

Preferably, the body part includes a shoulder part that increases in outer diameter as it moves away from the mouth part, and an inclination angle of the shoulder part with respect to a central axis of the mouth part is 25 degrees or less.

Preferably, when an inner diameter of the mouth part of the outer shell is D2, D/D2 is 1.8 or less.

Preferably, the body part includes a reduced diameter part that shrinks toward the bottom part on the bottom part side than the curved part.

Preferably, when a diameter of a bottom surface of a concave part provided in the bottom part is D3 and an inner diameter of the mouth part of the outer shell is D2, D3/D2 is 0.6 or less.

Ninth Perspective

According to the present invention, a double container comprising a container body including an inner bag and an outer shell is provided. The double container is configured such that the inner bag moves in a direction to escape from the outer shell by rotating the inner bag relative to the outer shell.

In a container body having an inner bag and an outer shell, if the inner bag is tightly attached to the outer shell, there is no reason to pull out the inner bag, so it is difficult to pull out the inner bag from the outer shell. In the double container of the present invention, when the inner bag is rotated relative to the outer shell, the inner bag moves in the direction to escape from the outer shell, and the inner bag rises from the outer shell by that amount. Therefore, the inner bag can be pulled out from the outer shell by using the raised portion as a trigger. Therefore, in the double container of the present invention, the inner bag can be easily pulled out from the outer shell.

Hereinafter, various embodiments of the present invention will be described. The embodiments described hereinafter can be combined with each other.

Preferably, the inner bag is configured to be able to move in the direction by a cam mechanism.

Preferably, the cam mechanism is provided on an outer peripheral surface of the inner bag and an inner peripheral surface of the outer shell.

Preferably, the double container includes a mouth part attachment member, the mouth part attachment member includes a body part and a band part, the body part and the band part are connected to each other via an easily tearable connecting part, the band part is engaged with the mouth part of the outer shell in a circumferential direction and an axial direction, the body part is engaged with the mouth part of the inner bag in a circumferential direction and an axial direction, and the band part is configured to be separable from the body part by tearing the connecting part.

Tenth Perspective

According to the present invention, a double container comprising a container body including an inner bag and an outer shell is provided. The container body is a biaxially stretched blow molded body. The inner bag includes an EVOH layer. And an EVOH included in the EVOH layer has an ethylene content of 32 to 46 mol %.

The present invention is characterized in that an EVOH layer is provided in the inner bag of the container body composed of a biaxially stretched blow molded body, and the EVOH included in this EVOH layer has a high ethylene content of 32 to 46 mol %. EVOH is generally more flexible with higher ethylene content. Therefore, according to the present invention, it is possible to improve the gas barrier properties of the inner bag while suppressing the deterioration of the pullability of the inner bag.

Hereinafter, various embodiments of the present invention will be described. The embodiments described hereinafter can be combined with each other.

Preferably, the double container includes a mouth part attachment member attached to a mouth part of the container body, the inner bag includes a projecting part projecting from an open end of the outer shell, and the mouth part attachment member engages with the projecting part.

Preferably, the inner bag is a single layer configuration of the EVOH layer.

BRIEF DESCRIPTION OF THE DRAWINGS

First to Third and Fifth to Sixth Perspectives

FIG. 4A is an enlarged perspective view of the region near mouth part 5 in FIG. 1.

FIG. 4B is an enlarged view of region B in FIG. 4A.

FIG. 10 is a perspective view showing a state in which an inner preform 14 and an outer preform 13 are separated.

Third Perspective

Figure 3A:
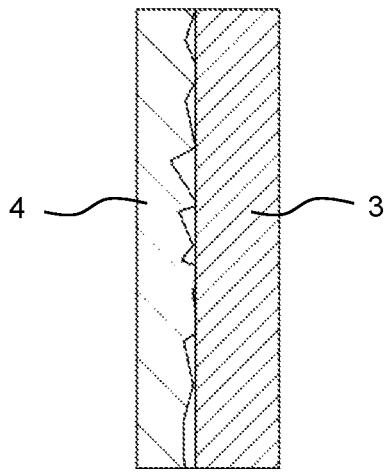
FIG. 3A is an E-E cross-sectional view in FIG. 2A.
Figure 14:
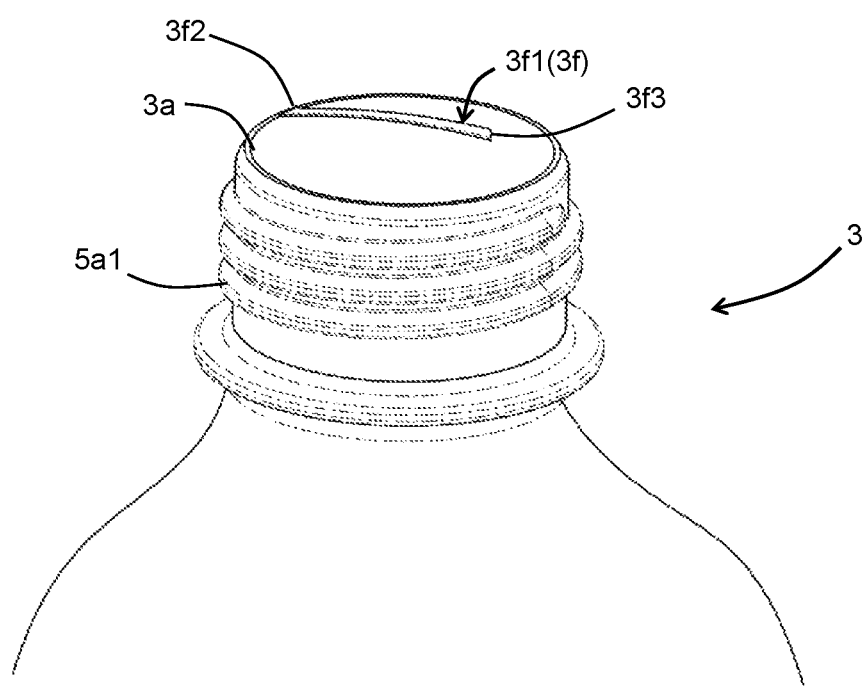

FIG. 14 is a perspective view corresponding to FIG. 3A, in which only the outer shell 3 is removed from the container body 2 in the second embodiment of the present invention.

Fourth Perspective

Figure 15:
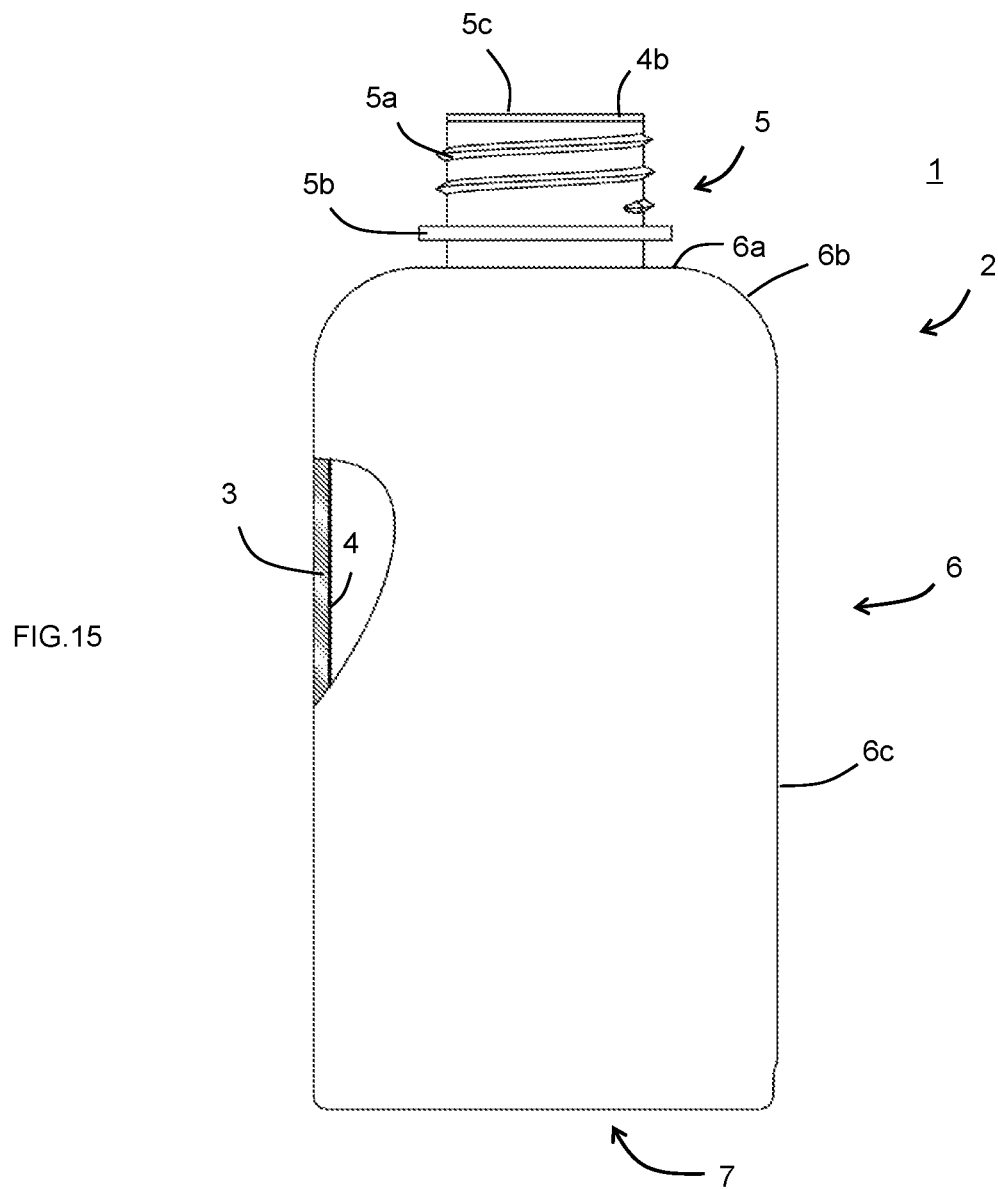

FIG. 15 shows a container body 2 of a double container 1 that can be manufactured by a method of manufacturing a double container according to an embodiment of the present invention.

FIG. 16 is a perspective view showing a state in which the inner preform 14 and the outer preform 13 are separated.

Figure 17A:
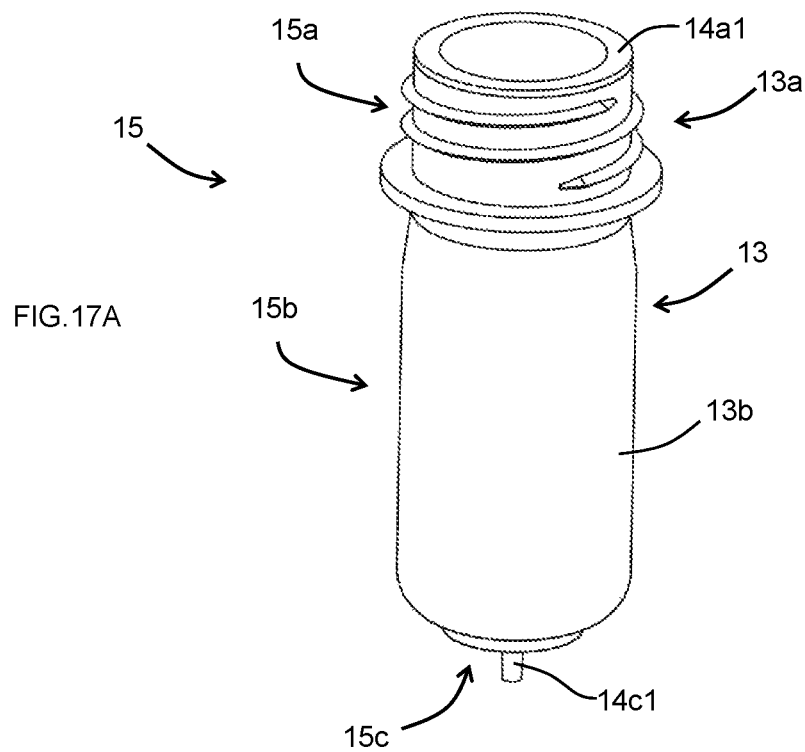

FIG. 17A is a perspective view of a preform 15 configured by covering an inner preform 14 with an outer preform 13.

Figure 17B:
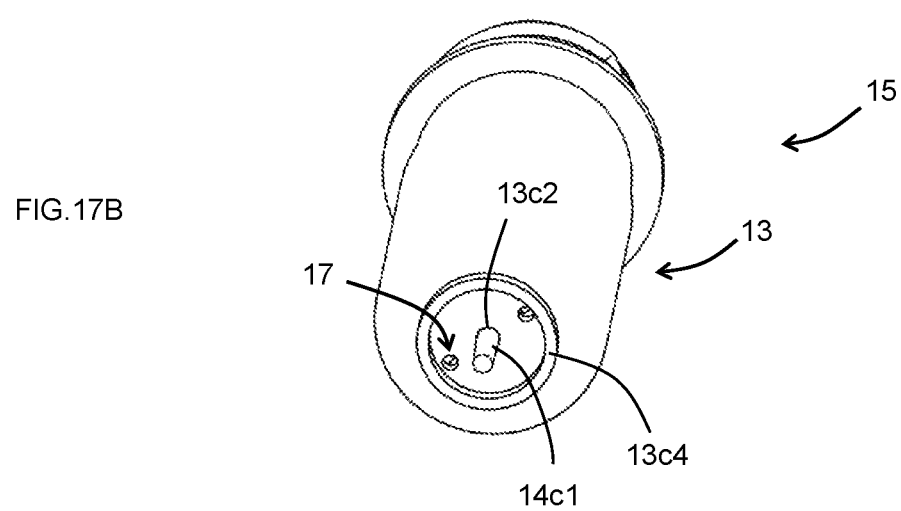

FIG. 17B is a perspective view of FIG. 17A viewed from another angle.

Figure 18A:
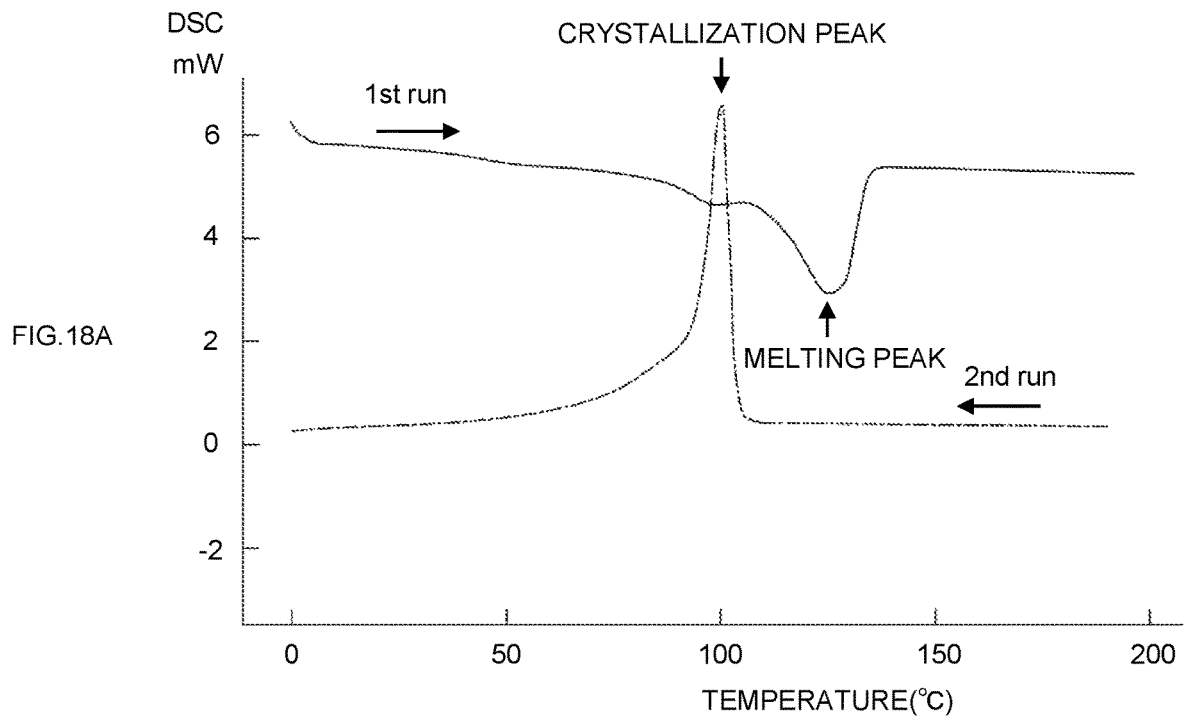

FIG. 18A is a graph showing differential scanning calorimetry results for the propylene-ethylene random copolymer in example 1.

Figure 18B:
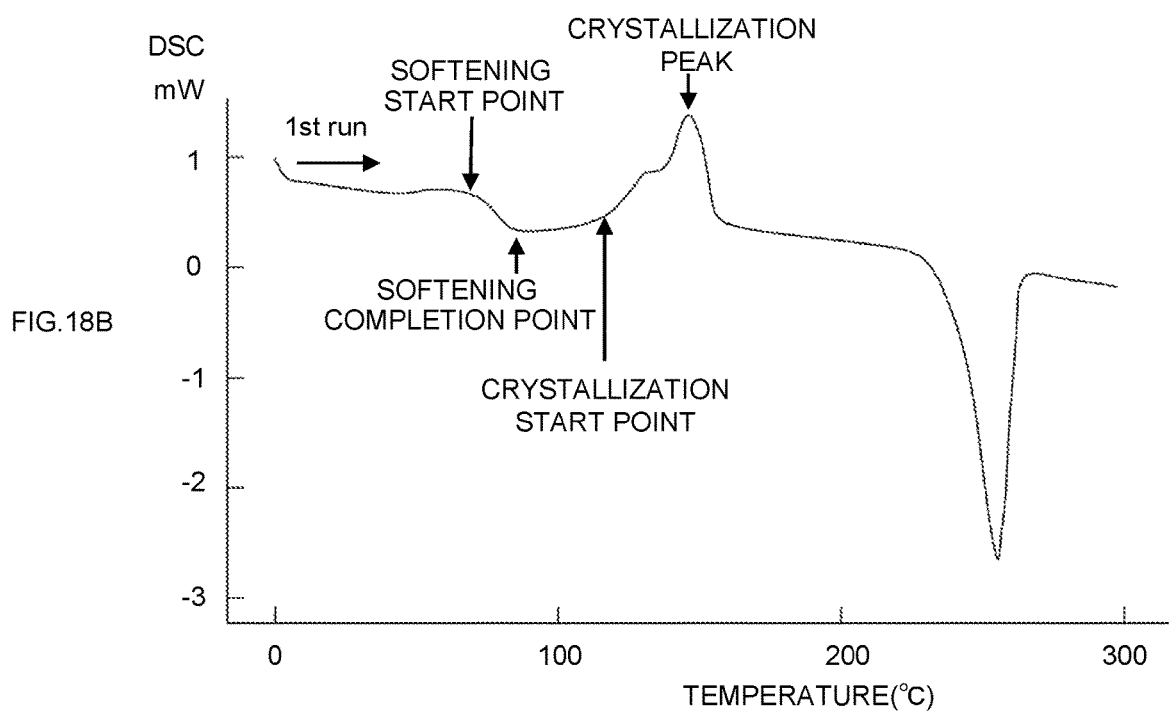

FIG. 18B is a graph showing differential scanning calorimetry result for amorphous PET in example 1.

Figure 19:
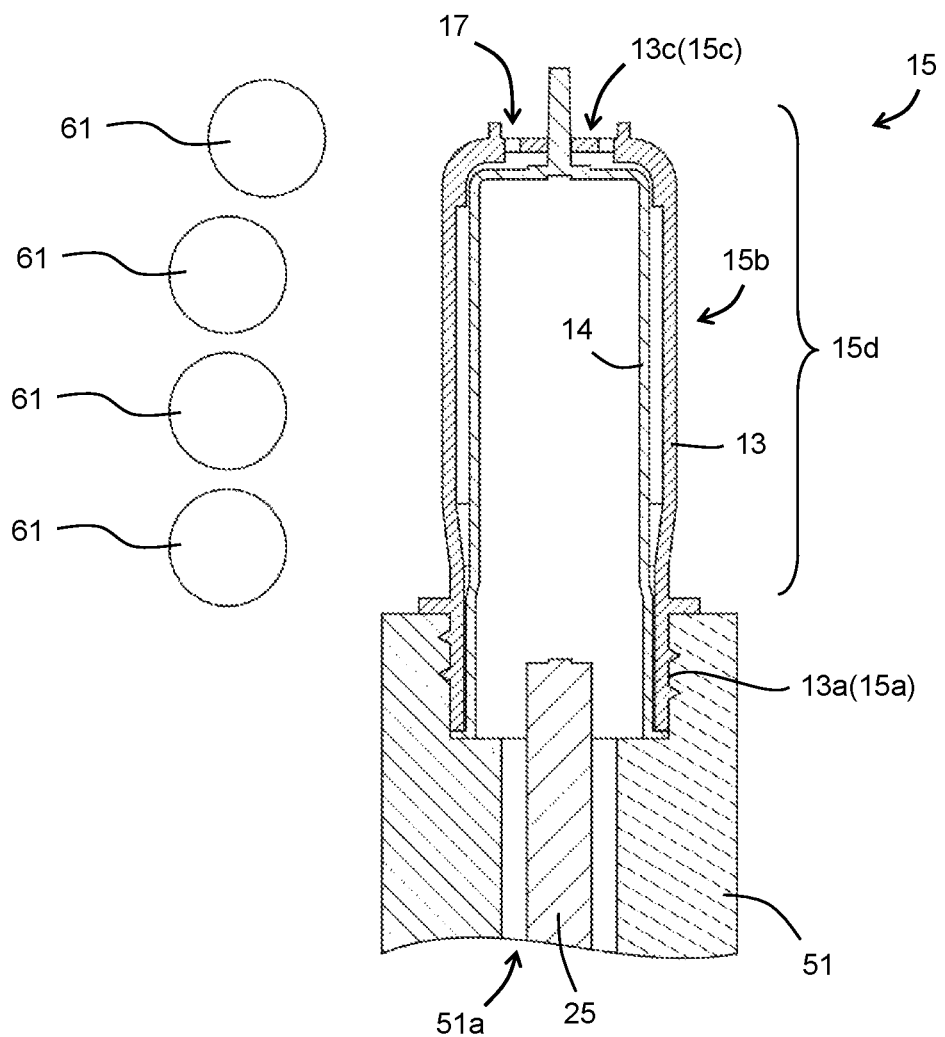

FIG. 19 is a cross-sectional view showing a state in which the preform 15 is mounted on the mouth part support mold 51 and brought close to the heater 61.

Figure 20:
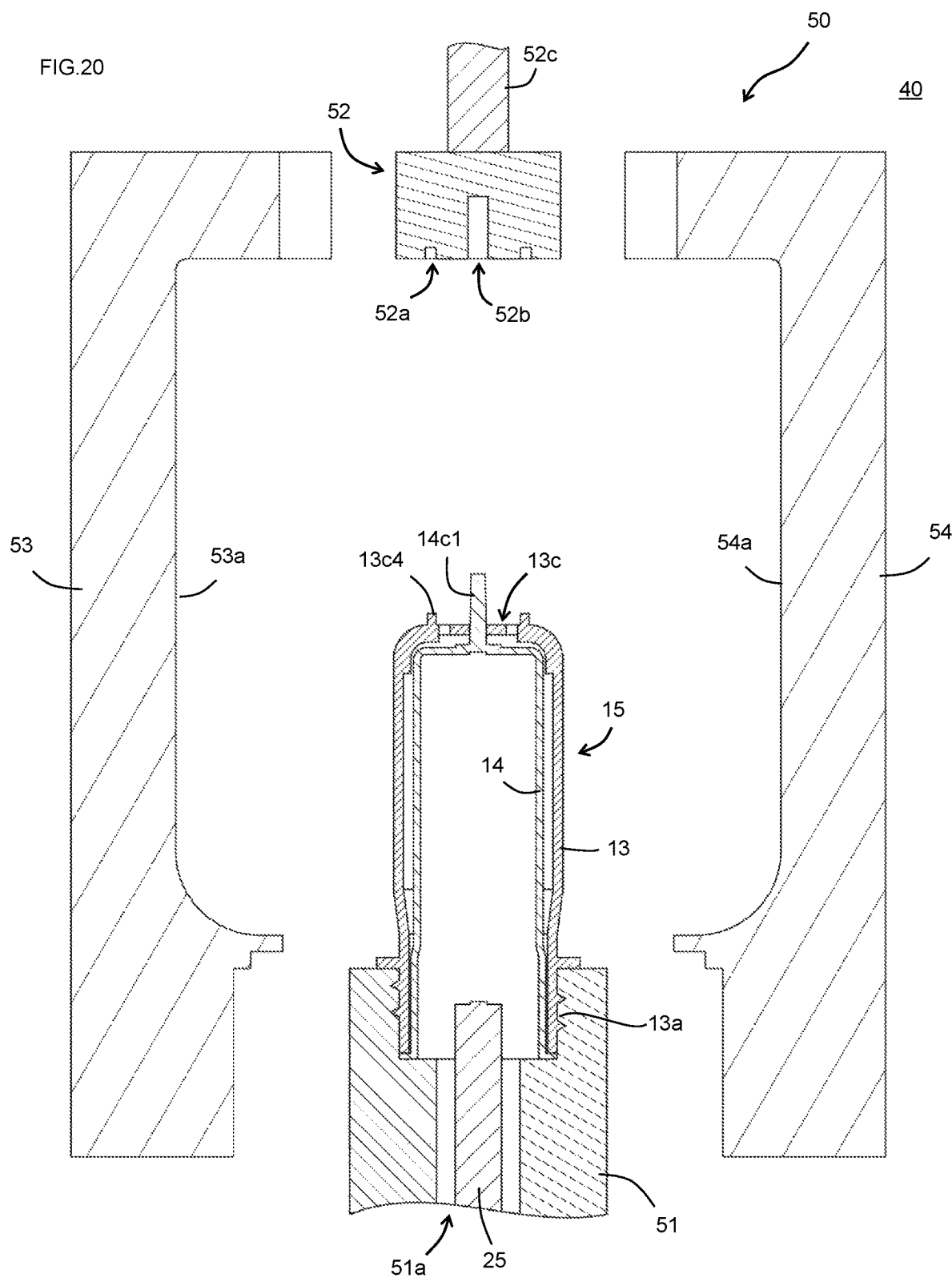

FIG. 20 is a cross-sectional view showing a state after the mouth part support mold 51 with the preform 15 mounted thereon was moved to a position between forming dies 53 and 54 from the state of FIG. 19.

Figure 21:
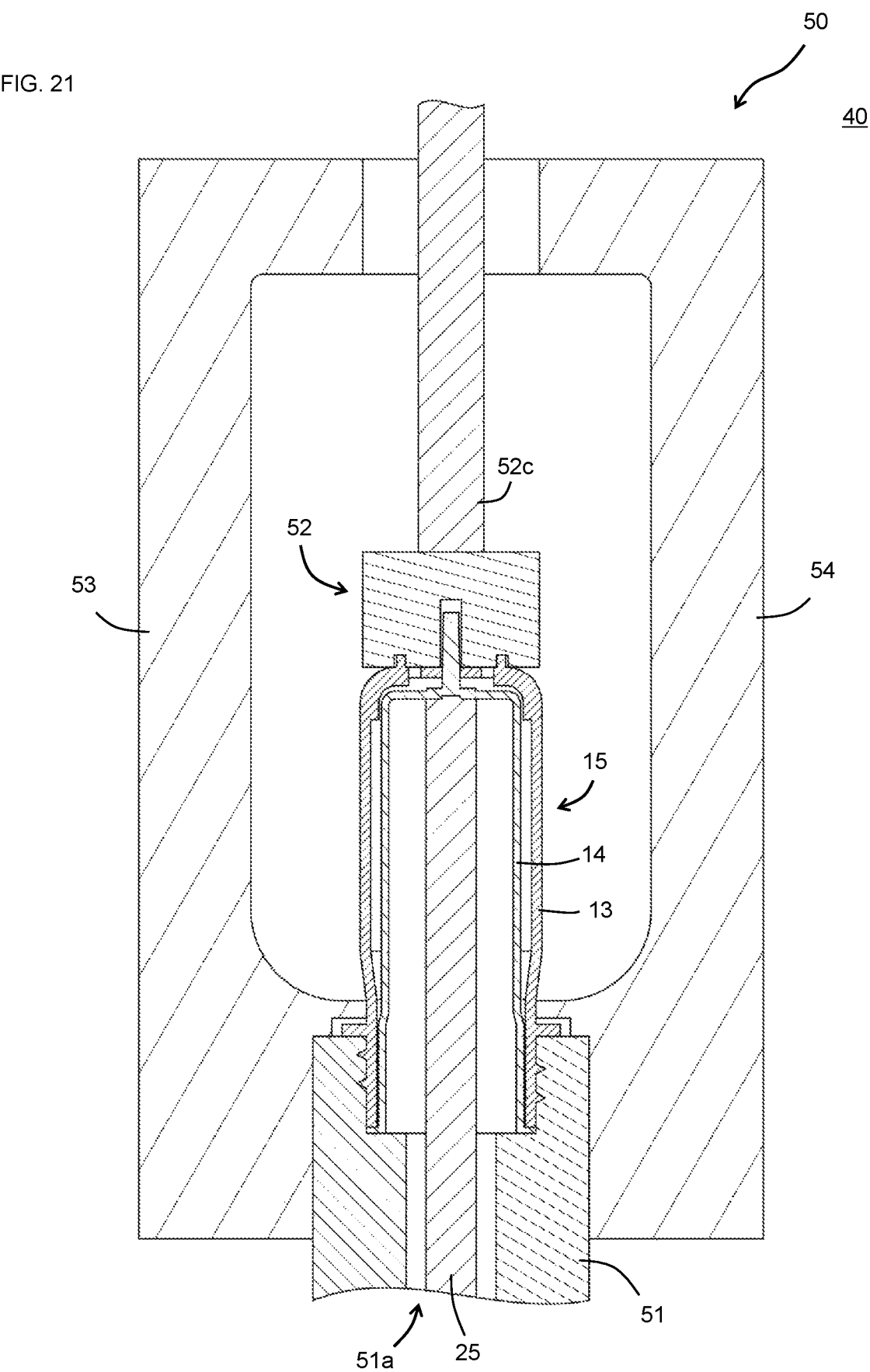

FIG. 21 is a sectional view showing a state after the forming dies 53 and 54 are closed from the state of FIG. 20 and the bottom part support mold 52 supports the bottom part 13c of the outer preform 13.

Figure 22:
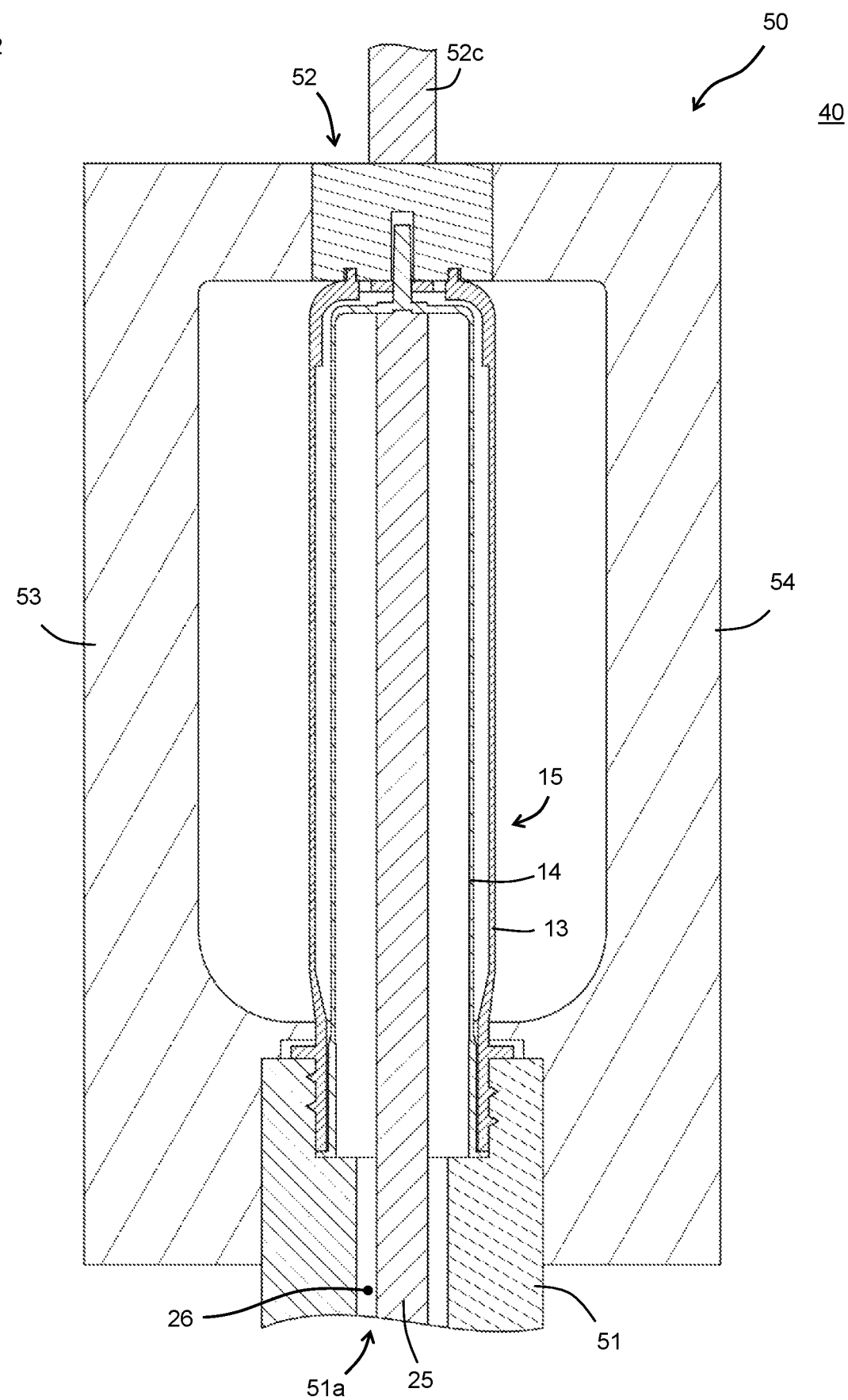

FIG. 22 is a sectional view showing a state after extending the support rod 25 and retracting the bottom part support mold 52 to longitudinally stretch the preform 15 from the state of FIG. 21.

Seventh Perspective

Figure 23:
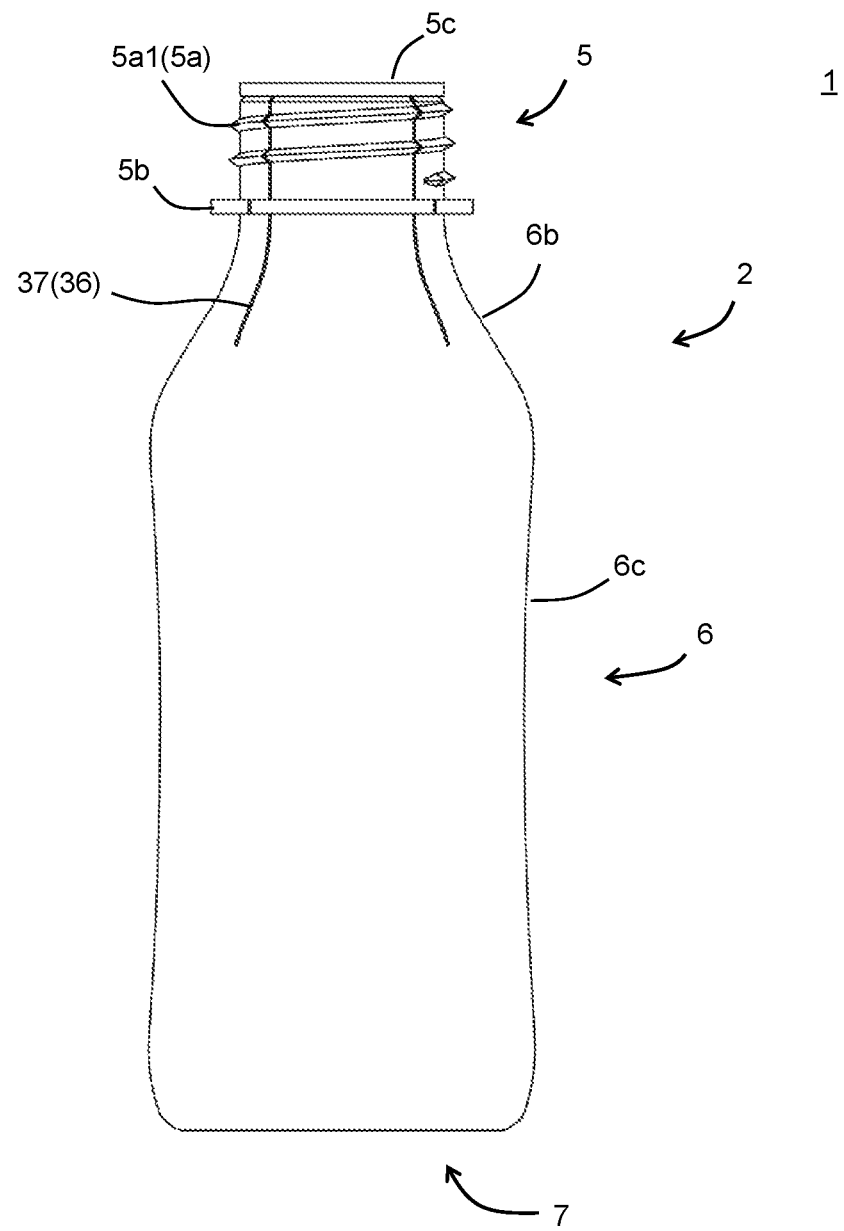

FIG. 23 is a front view of the container body 2 of the double container 1 of one embodiment of the present invention.

Figure 24:
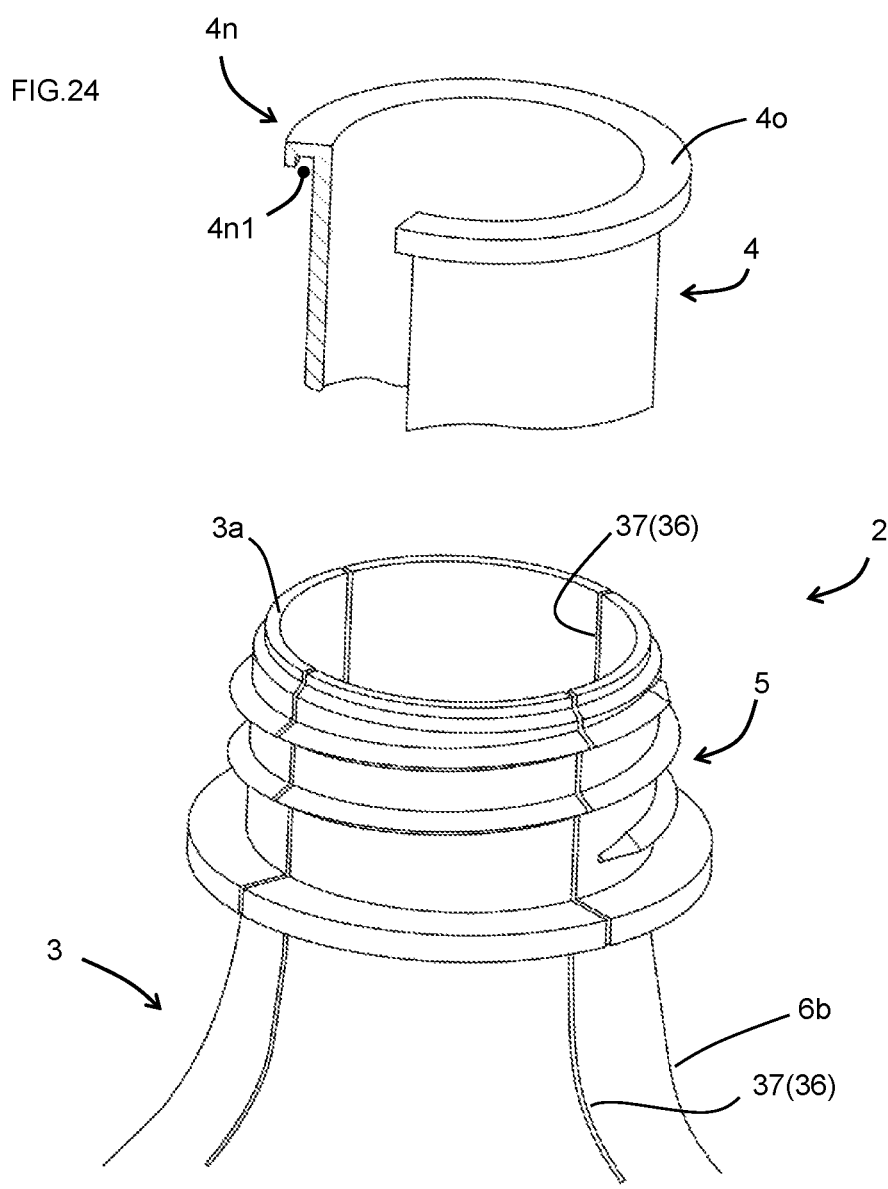

FIG. 24 is an exploded perspective view of the vicinity of the mouth part 5 of the container body 2 of FIG. 23.

FIG. 25A is a cross-sectional view of a plane that passes through the center of the mouth part 5 of the container body 2 in FIG. 23 and is parallel to the paper surface.

FIG. 25B is an enlarged view of region B in FIG. 25A.

FIG. 25C shows a state after the inner bag 4 is slightly lifted from the state of FIG. 25A.

FIG. 25D is an enlarged view of region D in FIG. 25C.

FIG. 25E shows the state after the diameter of the outer shell 3 is expanded from the state of FIG. 25C.

FIG. 26 is a perspective view of the inner preform 14 and the outer preform 13.

Figure 27A:
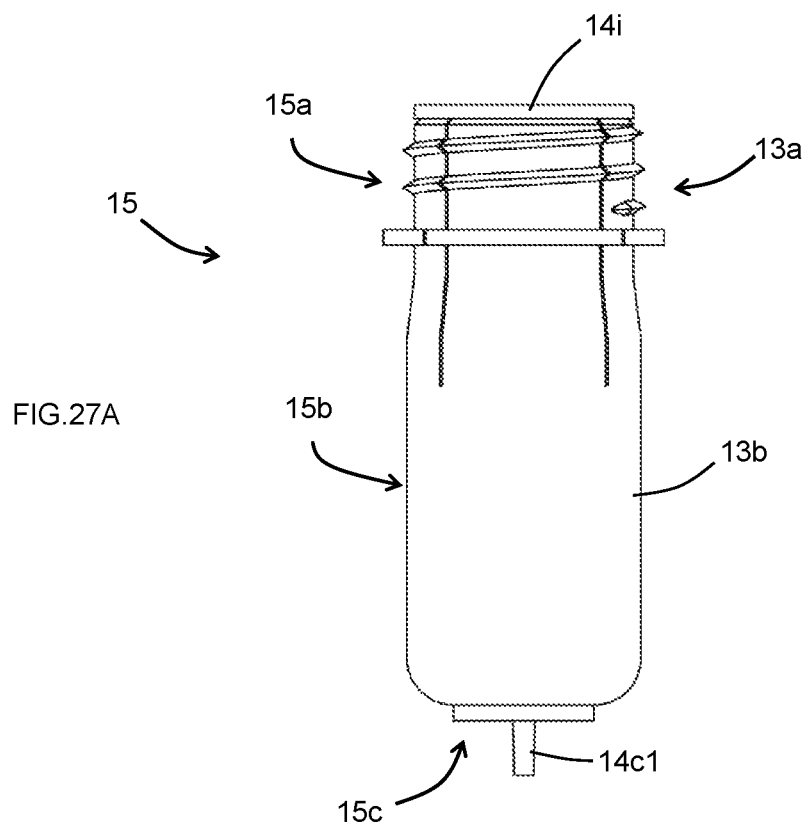

FIG. 27A is a front view of the state in which the inner preform 14 is inserted into the outer preform 13.

Figure 27B:
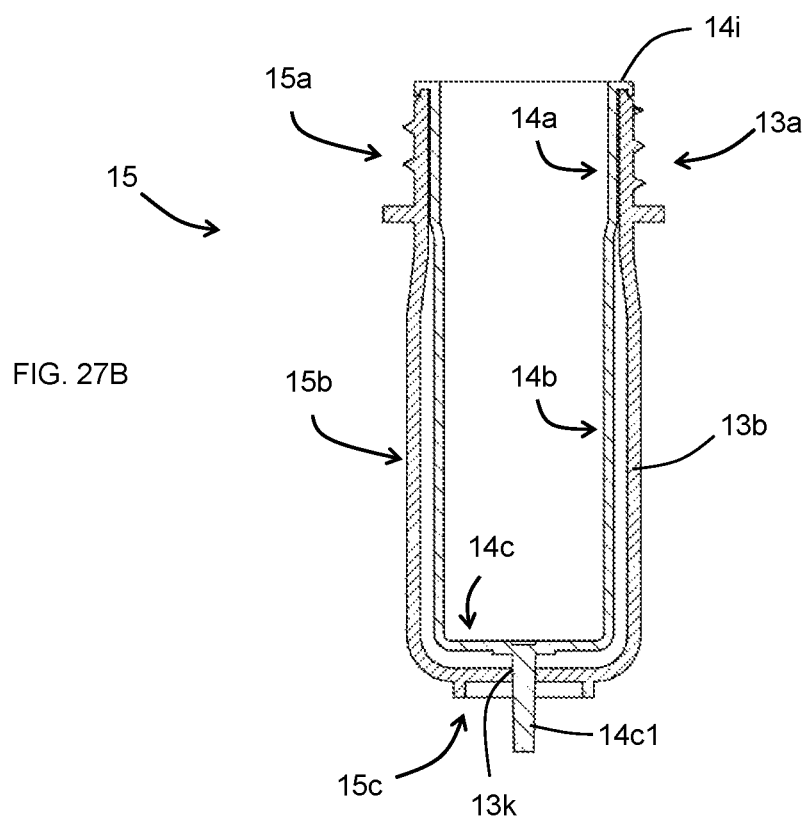

FIG. 27B is a cross-sectional view of a plane that passes through the central axis of the mouth part 15a of FIG. 27A and is parallel to the paper surface.

Eighth and Tenth Perspectives

FIG. 28A is a perspective view of the double container 1 according to the first embodiment of the present invention, showing a state in which the mouth part attachment member 8 is separated from the container body 2.

FIG. 28B is an enlarged view of region B in FIG. 28A.

Figure 29:
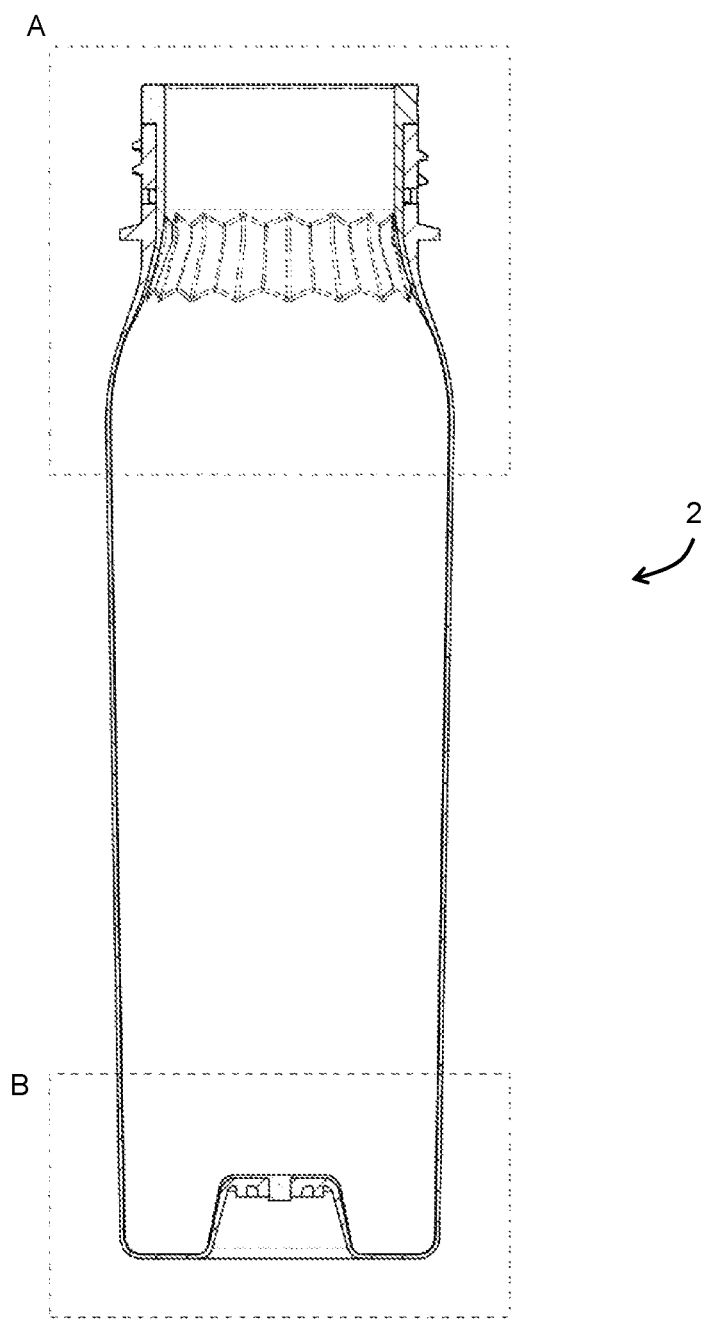

FIG. 29 is a cross-sectional view passing through the central axis C of the mouth part 5 of the container body 2 and the centers of the two concave parts 3f.

Figure 30A:
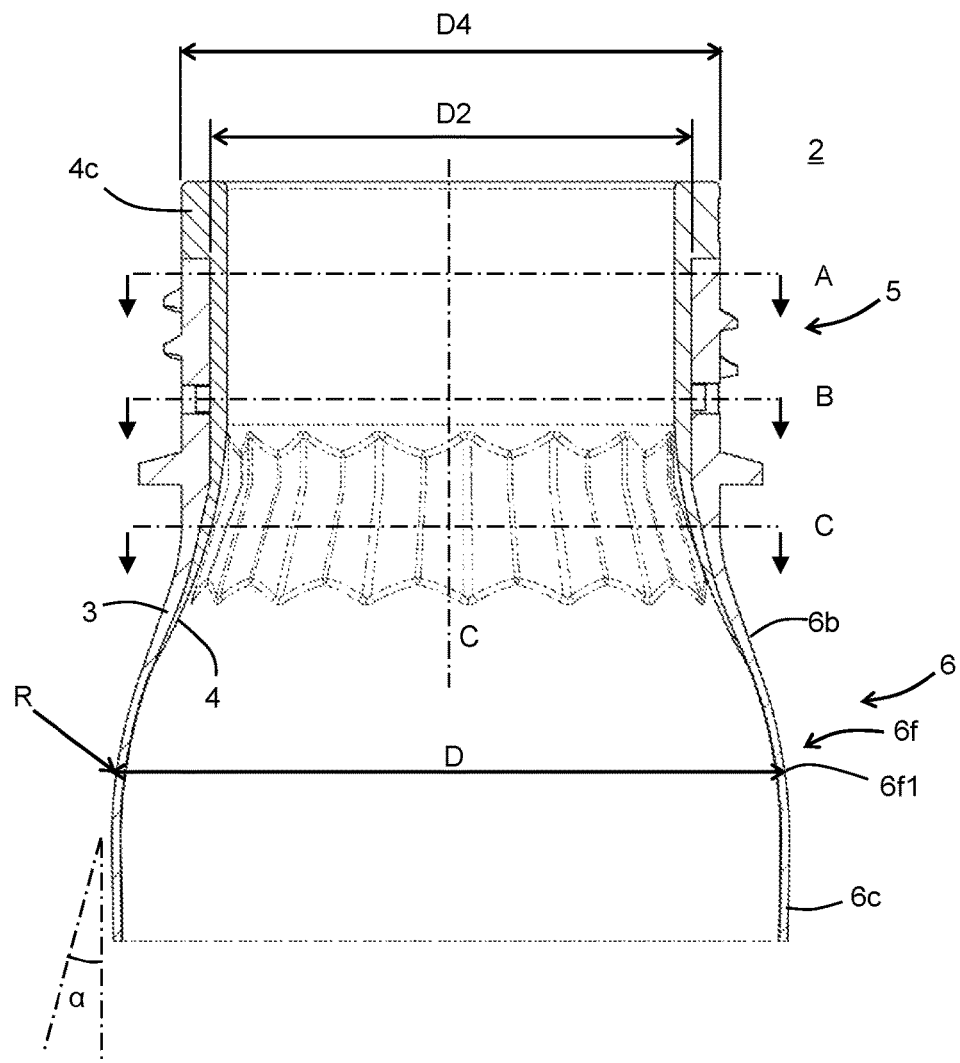

FIG. 30A is an enlarged view of region A in FIG. 29.

Figure 30B:
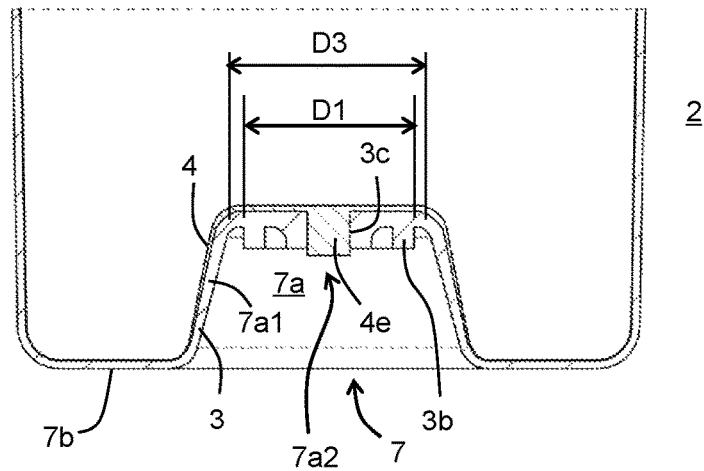

FIG. 30B is an enlarged view of region B in FIG. 29.

Figure 31A:
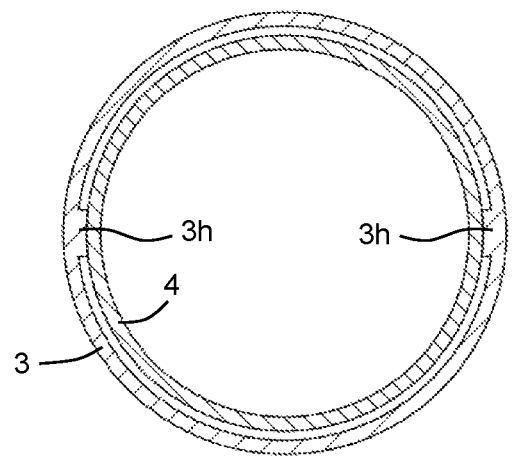
Figure 31B:
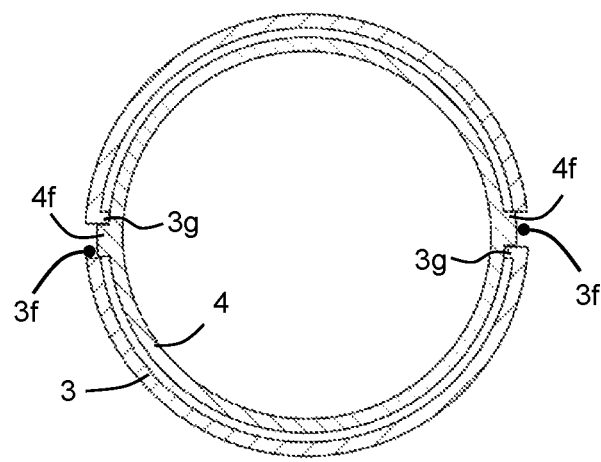
Figure 31C:
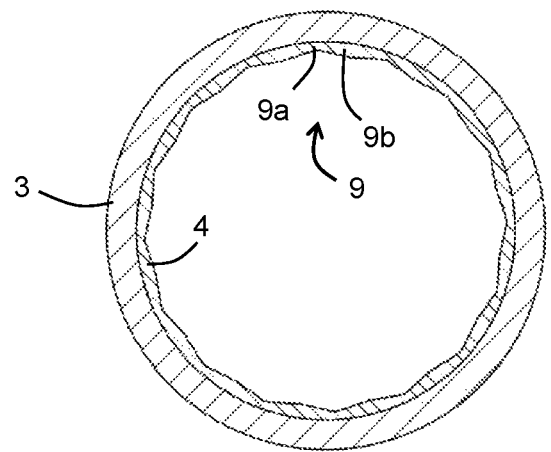
Figure 32F:
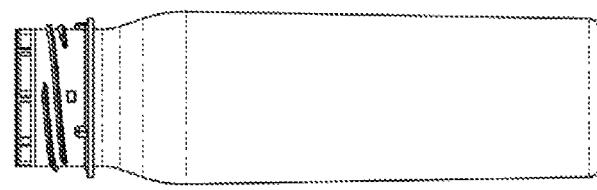
Figure 32D:
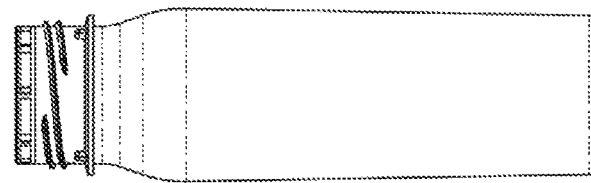
Figure 32B:
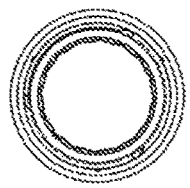
Figure 32A:
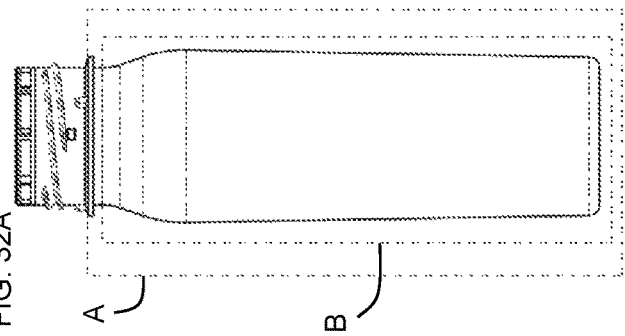
Figure 32C:
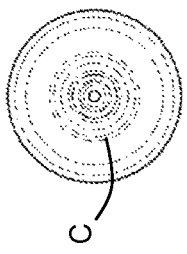
Figure 32E:
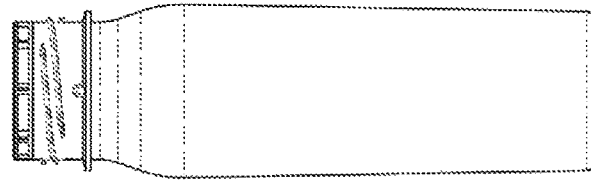

FIGS. 31A to 31C are respectively end views at planes A to C in FIG. 30A.

FIGS. 32A to 32F are respectively a front view, a plan view, a bottom view, a right side view, a left side view, and a rear view of the container body 2.

Figure 33A:
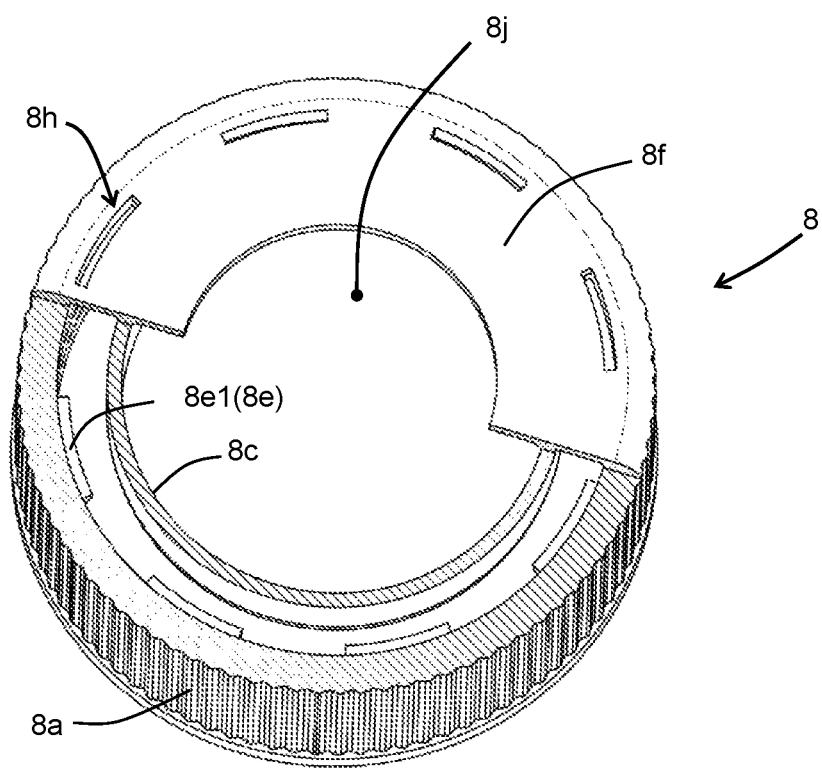

FIG. 33A is a partially cutaway perspective view of the mouth part attachment member 8.

Figure 33B:
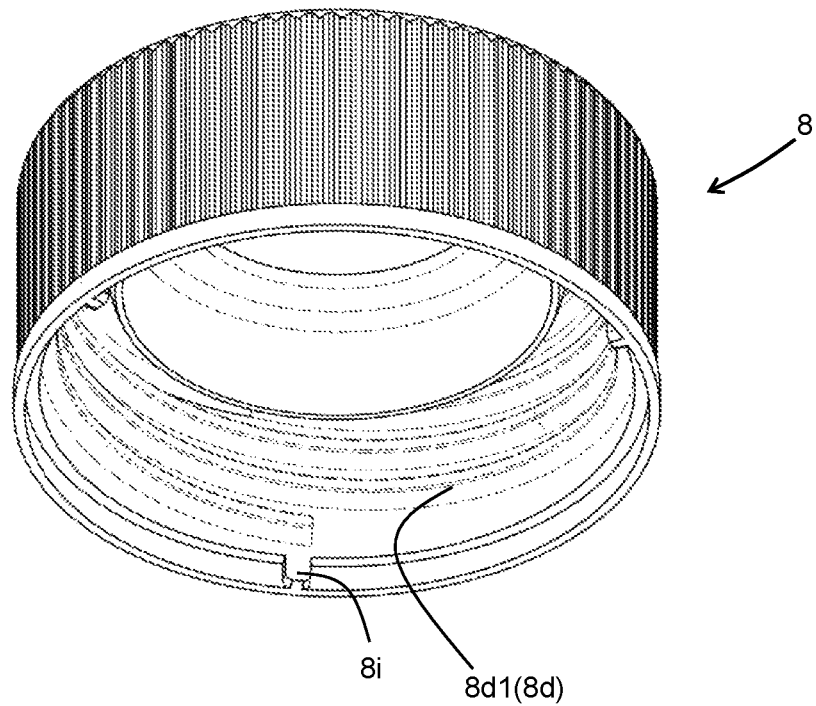

FIG. 33B is a perspective view of the mouth part attachment member 8 viewed obliquely from below.

Figure 34:
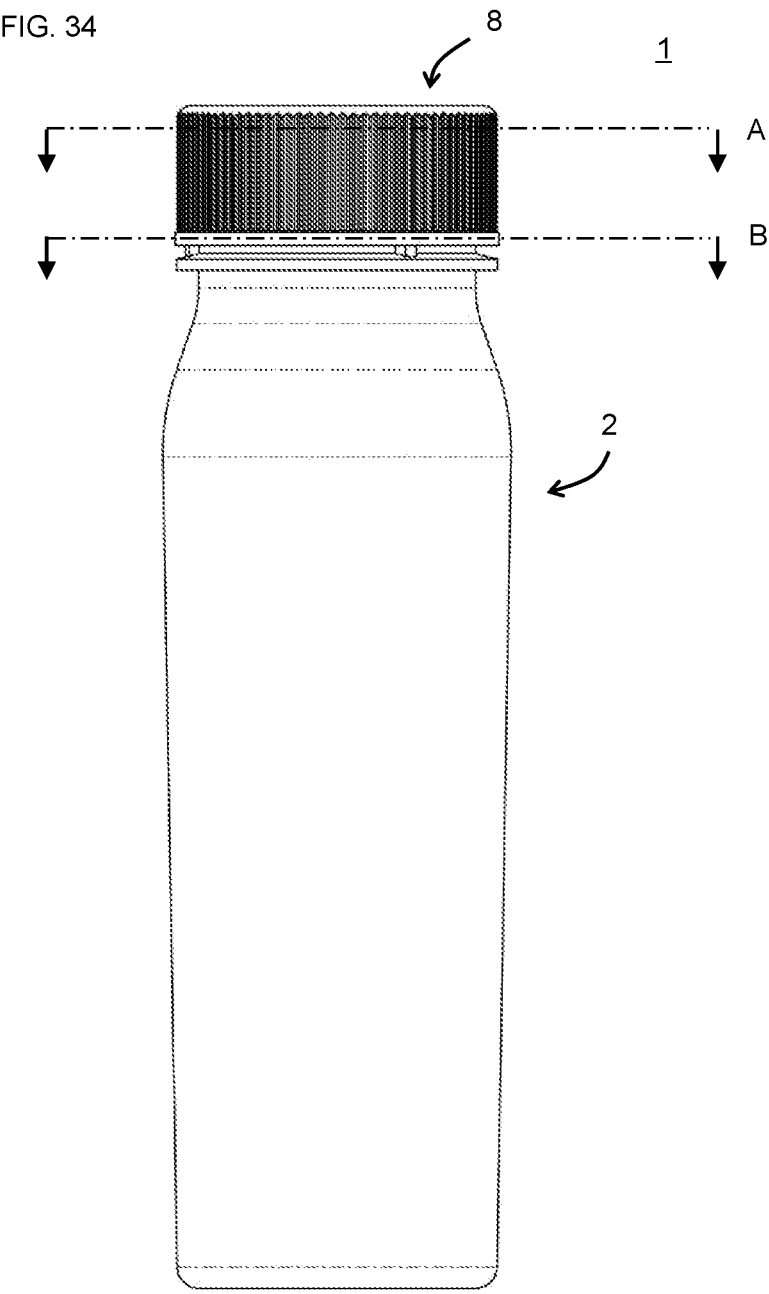

FIG. 34 is a front view of a state in which the mouth part attachment member 8 is attached to the container body 2.

Figure 35A:
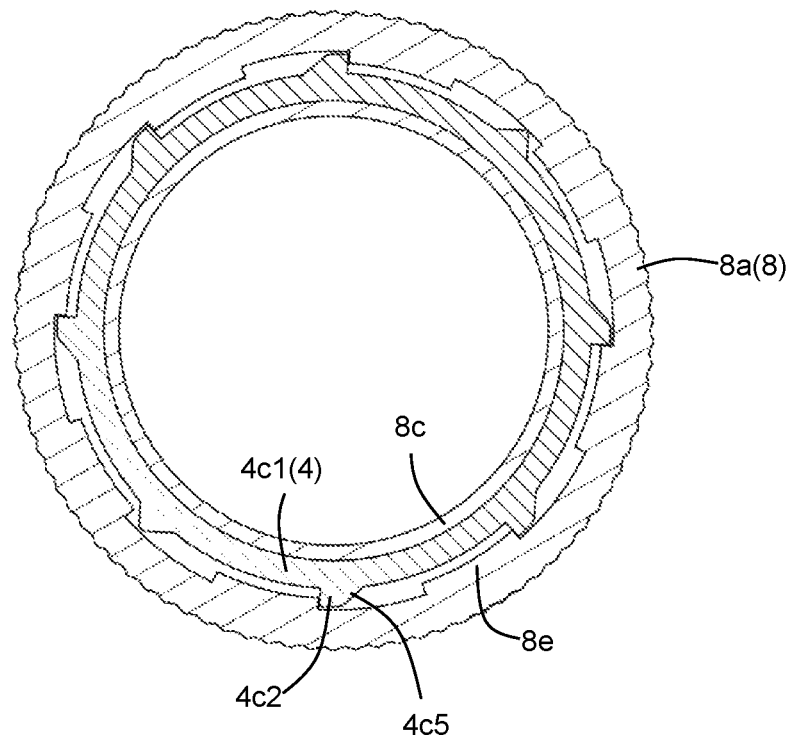
Figure 35B:
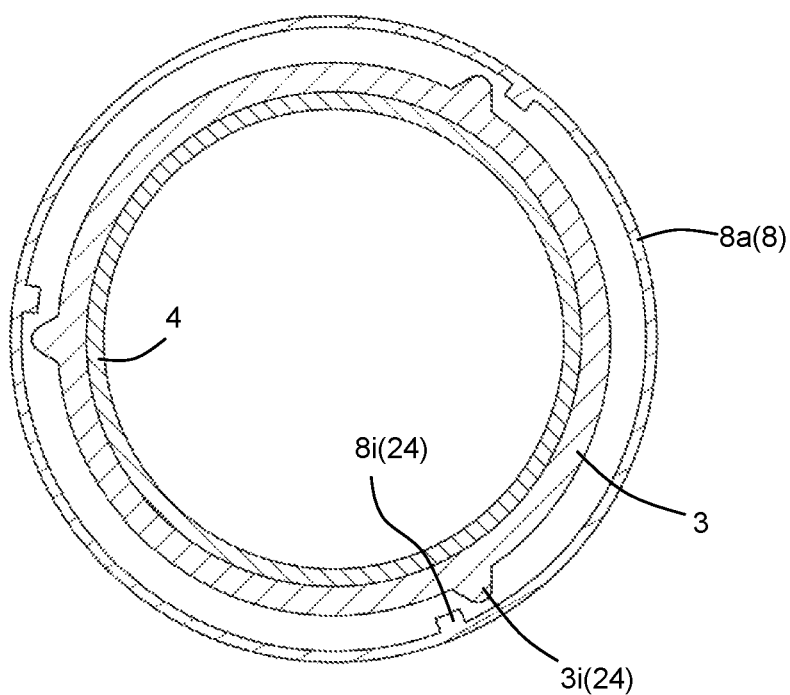

FIGS. 35A to 35B are respectively end views at planes A to B in FIG. 34.

FIG. 36 is a perspective view showing a state in which the inner preform 14 and the outer preform 13 are separated.

Figure 37:
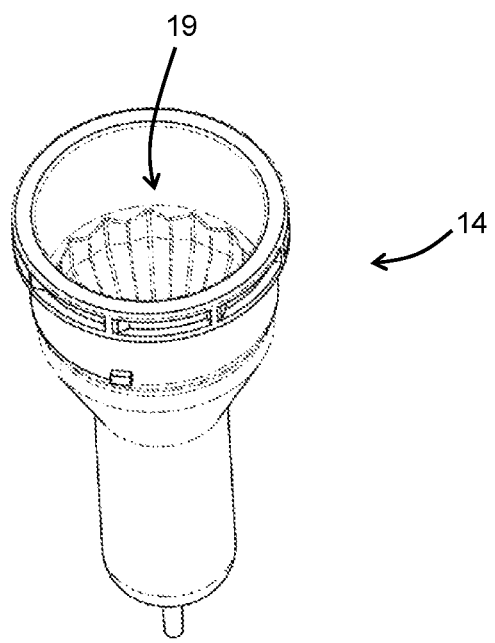

FIG. 37 is a perspective view of the inner preform 14 viewed obliquely from above.

Figure 38:
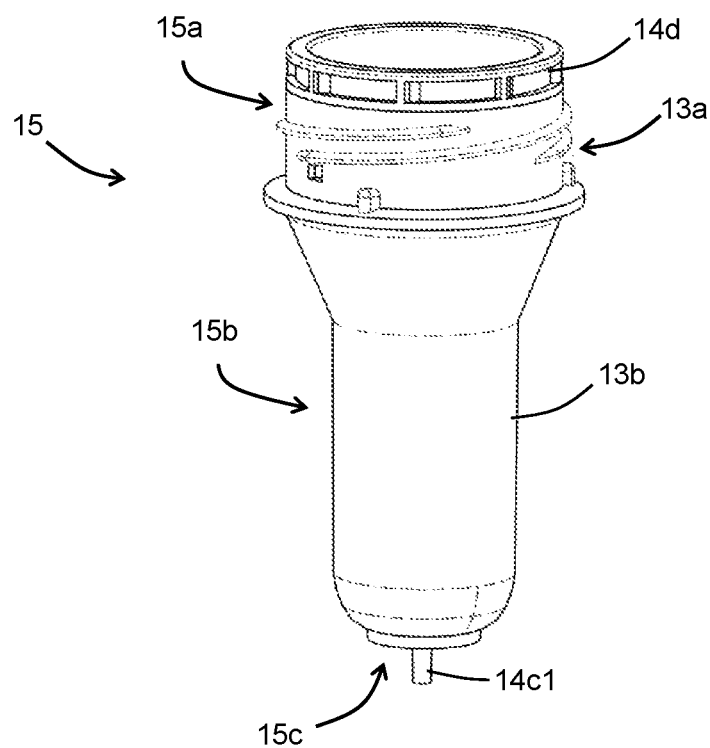

FIG. 38 is a perspective view of the preform 15 configured by covering the inner preform 14 with the outer preform 13.

Ninth Perspective

Figure 39:
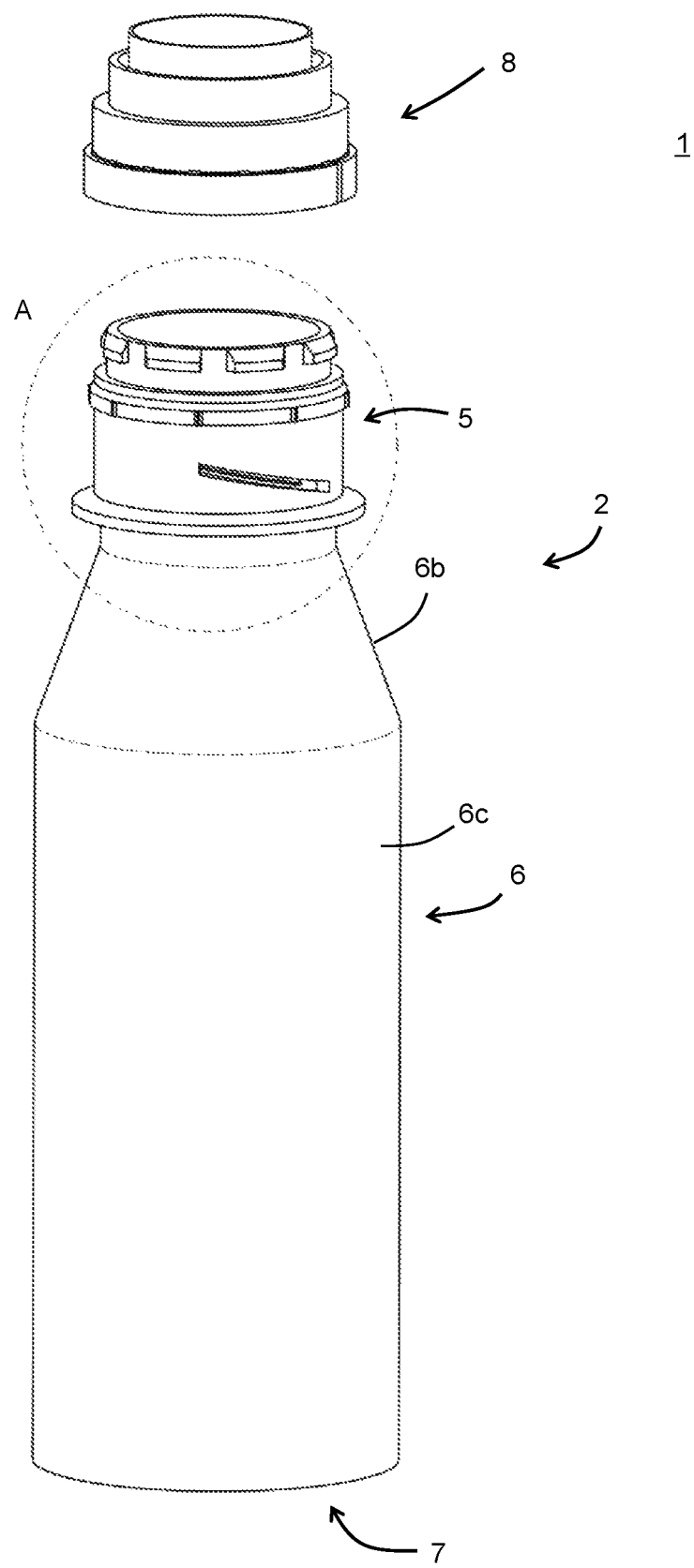

FIG. 39 is a perspective view of the double container 1 according to the first embodiment of the present invention, showing a state in which the mouth part attachment member 8 is separated from the container body 2.

Figure 40:
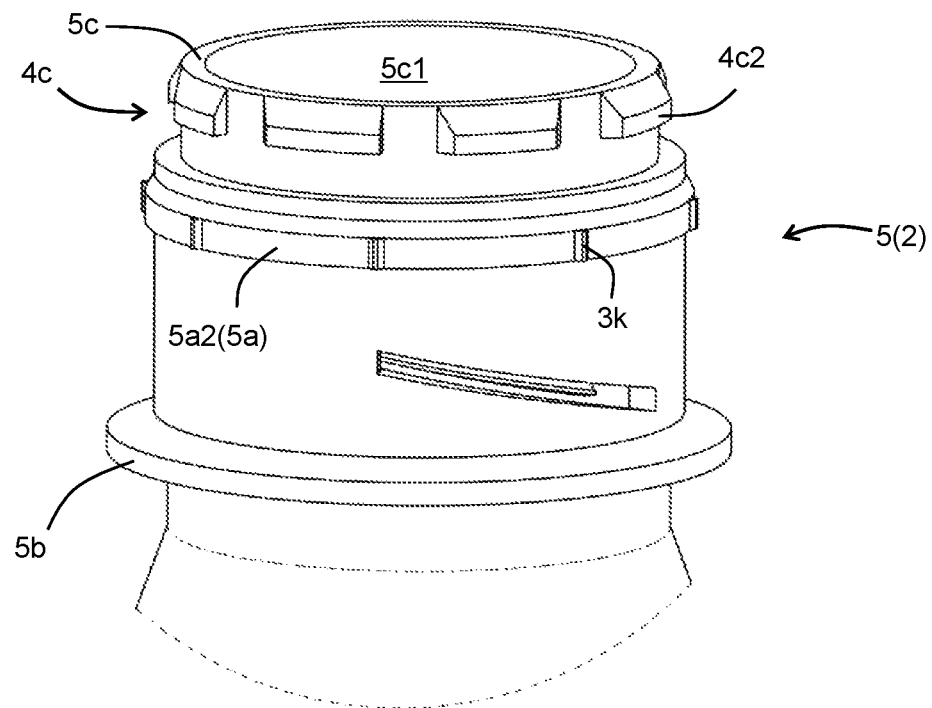

FIG. 40 is an enlarged view of region B in FIG. 39.

Figure 41:
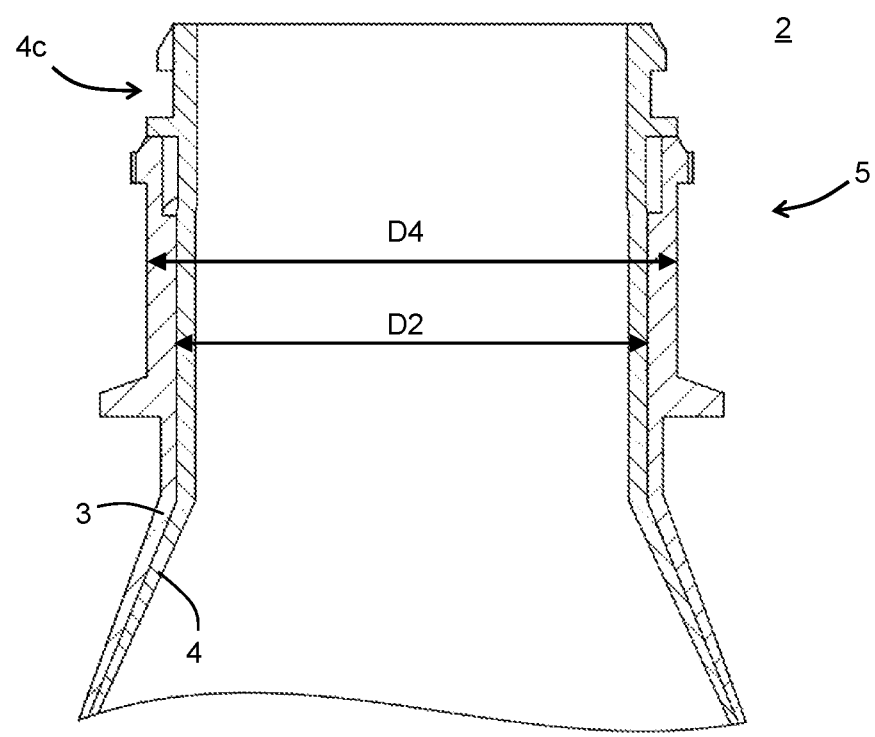

FIG. 41 is a cross-sectional view passing through the central axis of the mouth part 5 of the container body 2 and perpendicular to the open surface 5c1.

FIG. 42 is an exploded perspective view of the container body 2.

Figure 43:
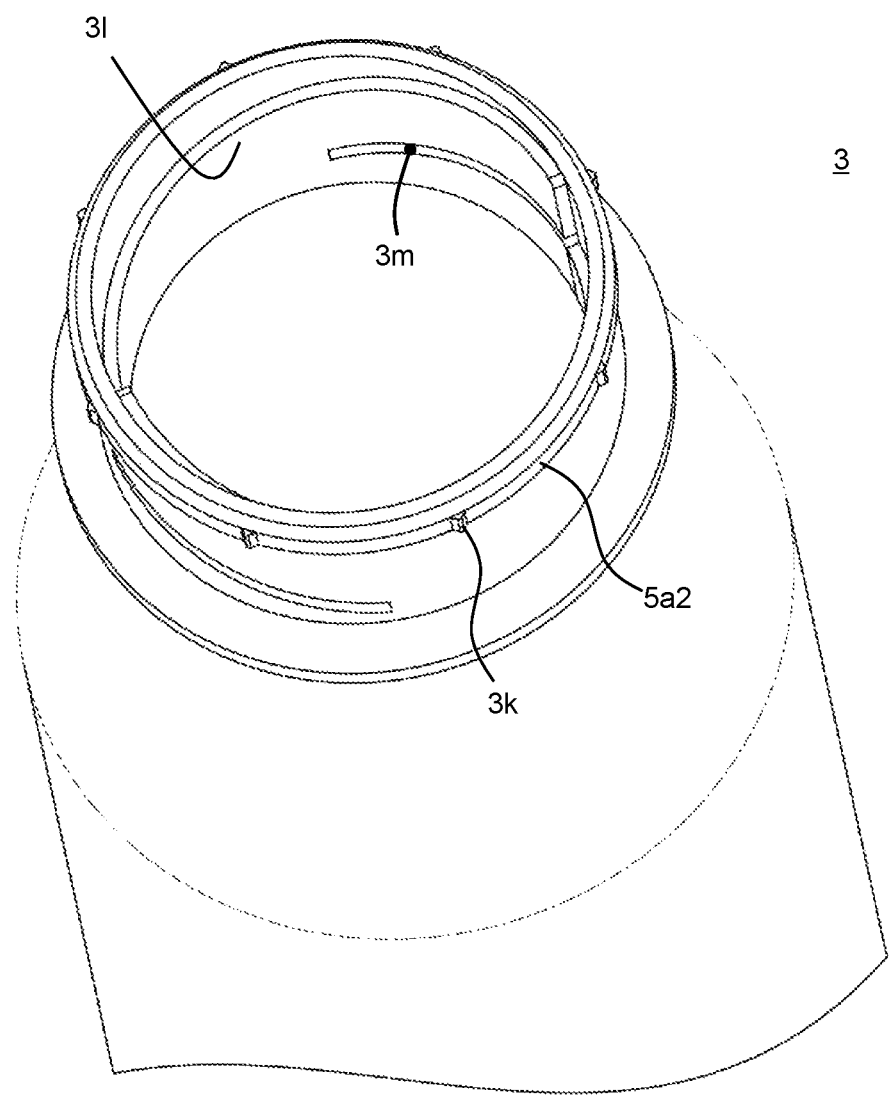

FIG. 43 is a perspective view of the outer shell 3.

Figure 44A:
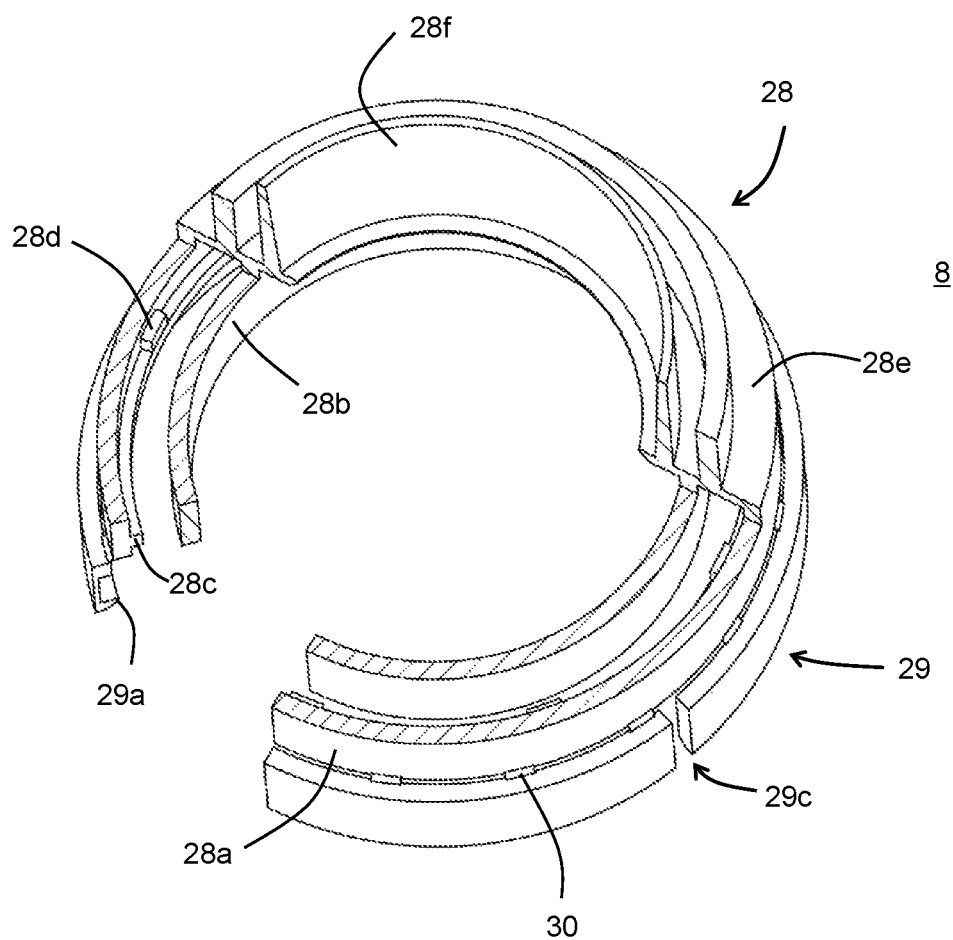

FIG. 44A is a partially cutaway perspective view of the mouth part attachment member 8.

Figure 44B:
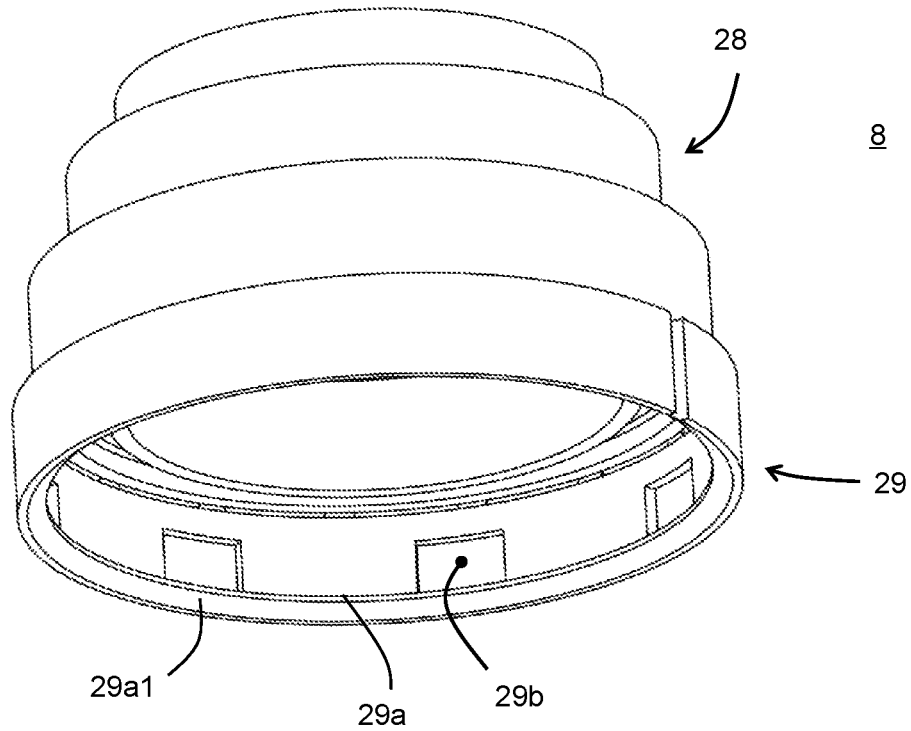

FIG. 44B is a perspective view of the mouth part attachment member 8 viewed obliquely from below.

Figure 45:
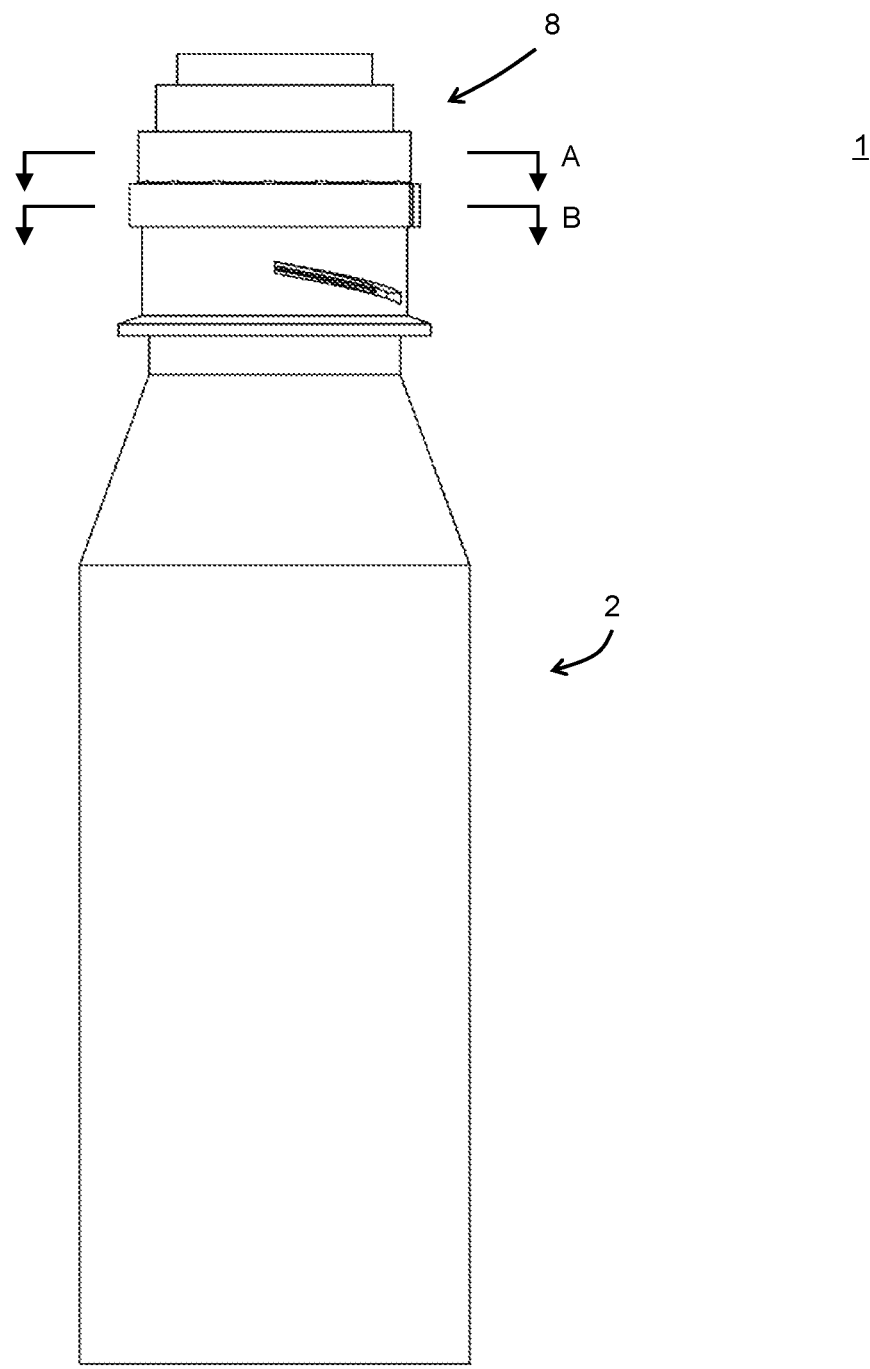

FIG. 45 is a front view of a state in which the mouth part attachment member 8 is attached to the container body 2.

Figure 46A:
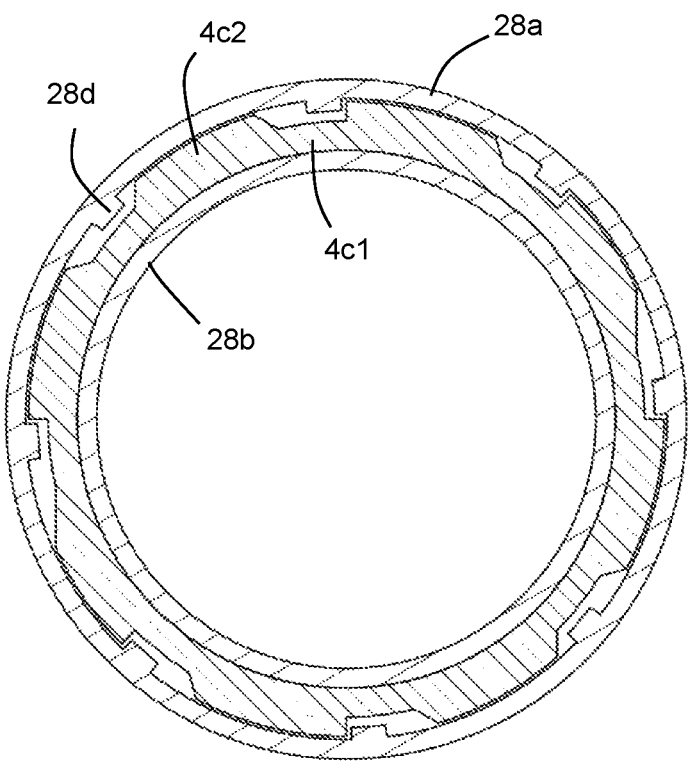
Figure 46B:
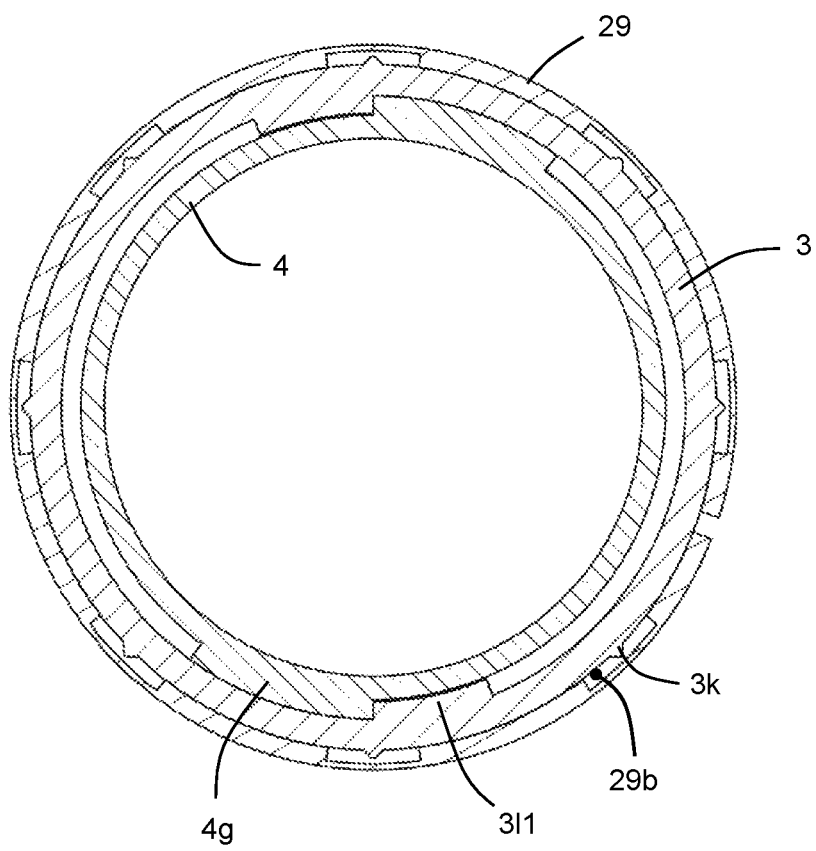

FIGS. 46A to 46B are respectively end views at planes A to B in FIG. 45.

FIG. 47 is a perspective view showing a state in which the inner preform 14 and the outer preform 13 are separated.

Figure 48:
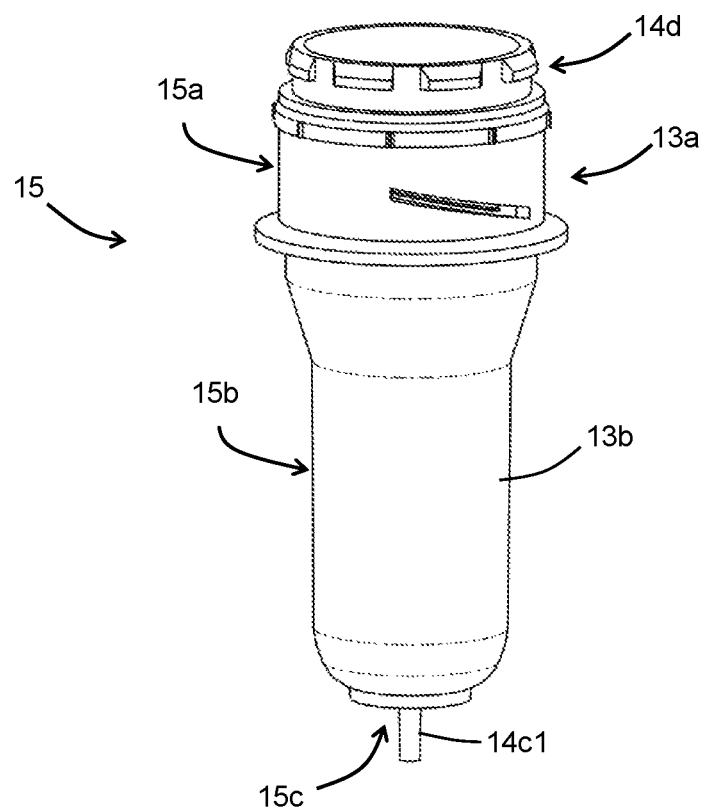

FIG. 48 is a perspective view of the preform 15 configured by covering the inner preform 14 with the outer preform 13.

DESCRIPTION OF EMBODIMENTS

Hereinafter, embodiments of the present invention will be described. Various characteristics in the embodiments described below can be combined with each other. Further, the invention is independently established for each characteristic. In the following embodiments, the matters defined in the means for solving the problems for each aspect are essential configurations for each aspect, and other configurations are optional configurations. Moreover, characteristics relating to separate aspects can be combined with each other unless contrary to their intent.

FIGS. 1 to 13 relate to the first, second, fifth and sixth perspectives of the present invention. FIGS. 1 to 14 relate to the third perspective of the present invention. FIGS. 15 to 22 relate to the fourth perspective of the present invention. FIGS. 23 to 27 relate to the seventh perspective of the present invention. FIGS. 28 to 38 relate to the eighth and tenth perspectives of the present invention. FIGS. 39 to 48 relate to the ninth perspective of the present invention.

First to Third and Fifth to Sixth Perspectives

1. First Embodiment Common to First to Third and Fifth to Sixth Perspectives 1-1. Configuration of Double Container 1
<Basic Configuration>

Figure 1:
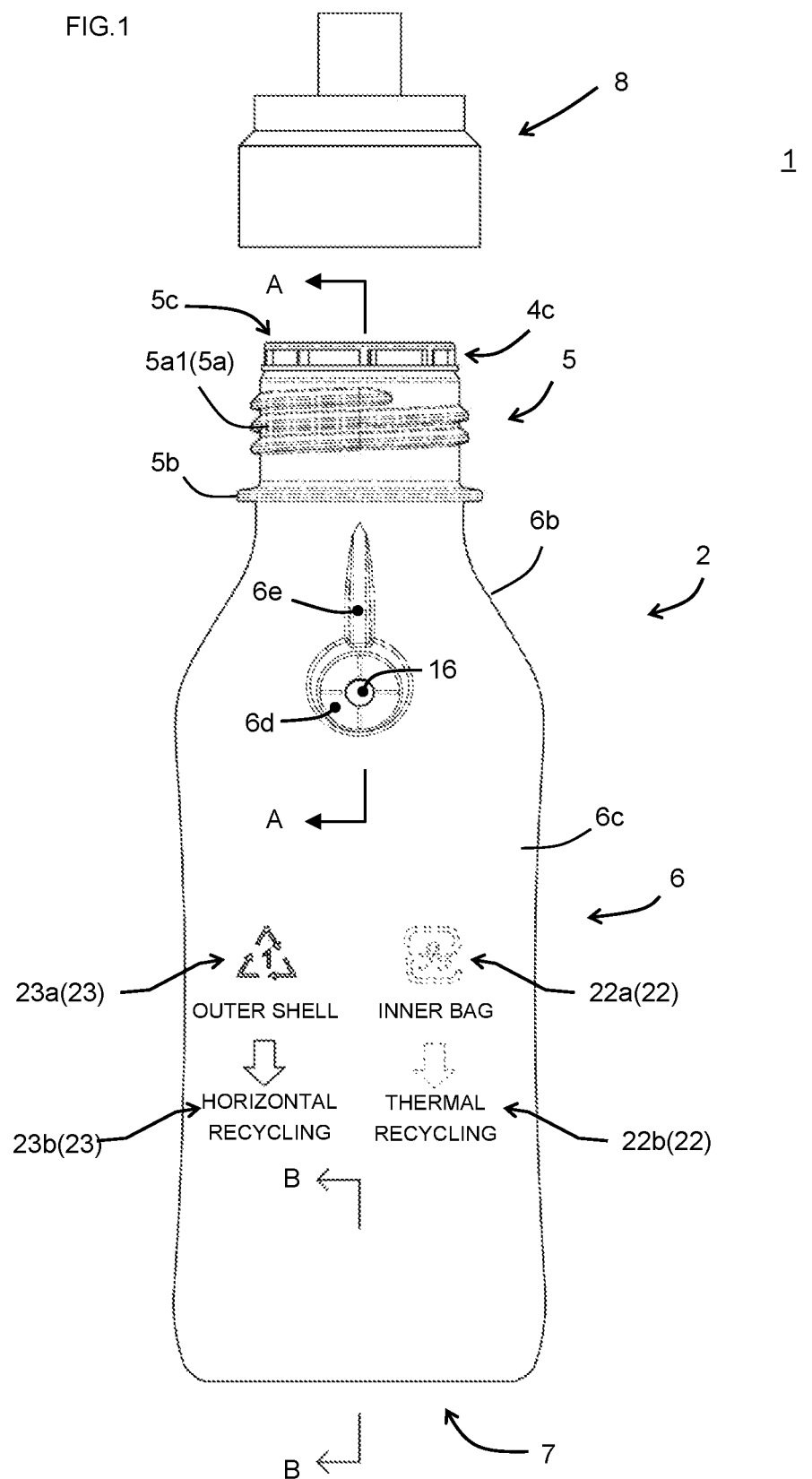
FIG. 1 is a front view of a double container 1 according to a first embodiment of the present invention, in which a mouth part attachment member 8 is separated from a container body 2. The dashed-dotted line in the drawing represents a boundary line along which the curvature of the surface forming the surface shape changes. The same applies to other figures.

As shown in FIG. 1, a double container 1 of the first embodiment of the present invention comprises a container body 2 and a mouth part attachment member 8.

As shown in FIG. 1, the container body 2 includes a mouth part 5, a body part 6 and a bottom part 7. The mouth part 5 is a tubular (preferably cylindrical) portion having an open end 5c. The mouth part 5 includes an engaging part 5a to which a mouth part attachment member 8 such as a cap or a pump can be attached. The engaging part 5a is a male threaded part 5a1 when the mouth part attachment member 8 is of a screw type, and is an annular protrusion projecting in the circumferential direction when the mouth part attachment member 8 is a plugging type. Mouth part attachment member 8 may include a check valve (not shown). In this case, the contents can be discharged through the mouth part attachment member 8, but outside air is prevented from flowing into the container body 2. A flange 5b is provided in the mouth part 5. The flange 5b can be used to support the mouth part 5 when fitting mouth part attachment member 8 to the mouth part 5.

The body part 6 is arranged adjacent to the mouth part 5 on a side farther from the open end 5c than the mouth part 5. The body part 6 has a larger outer diameter than the mouth part 5 (in this specification, the "outer diameter" means the diameter of a circumscribed circle when the cross section is not circular). The body part 6 is cylindrical, and the bottom part 7 is provided at a lower end of the body part 6 to close the lower end of the body part 6. In addition, the body part 6 has a shoulder part 6b whose outer diameter increases with increasing distance from the mouth part 5. Further, the body part 6 includes a body part body 6c having a substantially constant outer diameter on the bottom part 7 rather than the shoulder part 6b.

The diameter of the mouth part 5 excluding the engaging part 5a is, for example, 20 to 40 mm, preferably 25 to 35 mm, specifically, for example, 20, 25, 30, 35, 40 mm, and can be in the range between the two values exemplified herein. The length of the mouth part 5 is, for example, 15 to 35 mm, specifically, for example, 15, 20, 25, 30, 35 mm, and can be in the range between the two values exemplified herein.

As shown in FIG. 2, the container body 2 includes an inner bag 4 and an outer shell 3 arranged to cover the inner bag 4. The inner bag 4 is accommodated in the outer shell 3 except for the later-described projecting part 4c. In the following description, parts of the inner bag 4 corresponding to the mouth part 5, the body part 6, and the bottom part 7 of the container body 2 are referred to as the mouth part 5, the body part 6, and the bottom part 7 of the inner bag 4, respectively. The same is true for the outer shell 3.

The thickness of the outer shell 3 at the center in the height direction of the container body 2 is, for example, 0.3 to 0.8 mm, preferably 0.4 to 0.5 mm. Specifically, this thickness is, for example, 0.3, 0.4, 0.5, 0.6, 0.7, 0.8 mm, and may be in a range between any two of the numerical values exemplified herein. The thickness of the inner bag 4 at the center in the height direction of the container body 2 is, for example, 0.10 to 0.25 mm, preferably 0.15 to 0.20 mm. Specifically, this thickness is, for example, 0.10, 0.15, 0.20, 0.25 mm, and may be in a range between any two of the numerical values exemplified herein. The greater the wall thickness of the inner bag 4, the greater the force required to pull out the inner bag 4. Therefore, the application of the present invention is significant.

When a check valve is provided in the mouth part attachment member 8, the inner bag 4 shrinks as the contents of the inner bag 4 are discharged. When the check valve is not provided in the mouth part attachment member 8, the inner bag 4 does not shrink even after the contents of the inner bag 4 are discharged. Therefore, it is not easy to pull out the inner bag 4 through the mouth part 5 of the outer shell 3. In the present invention, the diameter of the inner bag 4 is reduced by twisting the inner bag 4 so that the inner bag 4 can be easily pulled out through the mouth part 5 of the outer shell 3. Therefore, when the check valve is not provided in the mouth part attachment member 8, the significance of applying the present invention is particularly significant. However, even if the check valve is provided in the mouth part attachment member 8, the diameter of the inner bag 4 may not be reduced appropriately when the inner bag 4 shrinks. Therefore, even when the check valve is provided in the mouth part attachment member 8, the significance of applying the present invention is significant.

An outside air introduction hole 16 is provided in the body part 6 or the bottom part 7. The outside air introduction hole 16 is a through hole penetrating the outer shell 3, and allows outside air to be introduced into the intermediate space between the outer shell 3 and the inner bag 4 through the outside air introduction hole 16. On the other hand, when the check valve is not provided in the mouth part attachment member 8, the inner bag 4 does not shrink, so the outside air introduction hole 16 can be omitted. When the double container 1 is a so-called squeeze container configured to discharge the contents by compressing the outer shell 3, it is preferable to provide the check valve for controlling the inflow and outflow of air through the outside air introduction hole 16. The check valve is preferably configured to close the outside air introduction hole 16 when the outer shell 3 is compressed and to open the outside air introduction hole 16 when the compressive force is removed. In this case, when the compressive force is applied to the outer shell 3, the compressive force is likely to be applied to the inner bag 4, and after the contents are discharged, outside air is quickly introduced into the intermediate space, and the shape of the outer shell 3 is quickly restored.

When the check valve is provided in the outside air introduction hole 16, the outside air introduction hole 16 is preferably arranged in the concave part 6d provided in the body part 6. In this case, it is possible to prevent the check valve from interfering with a shrink film when the body part 6 is covered with the shrink film. Moreover, it is preferable to provide a groove 6e extending from the concave part 6d toward the mouth part 5. The groove 6e extends to a position not covered with the shrink film. This makes it possible to prevent the concave part 6d from being sealed with the shrink film.

<Concave-Convex Shape 9 on Inner Surface of Mouth Part 5>

As shown in FIG. 2, it is preferable that the concave-convex shape 9 where a recessed stripe 9a and a projecting stripe 9b appear alternately in the circumferential direction of the mouth part 5 is provided on the inner surface of at least one of the mouth part 5 and the position adjacent to the mouth part 5 in the body part 6. The concave-convex shape 9 is provided on the inner surface of the inner bag 4. The number of recessed stripes 9a is, for example, 4 to 30, preferably 10 to 20. It is preferable that the recessed stripe 9a and the projecting stripe 9b extend non-parallel to the circumferential direction of the mouth part 5. The direction in which the recessed stripe 9a and the projecting stripe 9b extend is preferably 0 to 60 degrees, more preferably 0 to 30 degrees, with respect to the axial direction of the mouth part 5. Specifically, this angle is, for example, 0, 5, 10, 15, 20, 25, 30, 35, 40, 45, 50, 55, 60 degrees, and may be in a range between any two of the numerical values exemplified herein. The concave-convex shape 9 may be provided only in the mouth part 5 or may be provided in a position adjacent to the mouth part 5 in the body part 6, but may be preferably provided across the mouth part 5 and the body part 6. The concave-convex shape 9 may be formed by making the thickness of the recessed stripe 9a smaller than that of other parts of the mouth part 5 of the inner bag 4, or by making the thickness of the projecting stripe 9b larger. In addition, the concave-convex shape 9 may be formed by decreasing the thickness of the recessed stripe 9a and increasing the thickness of the projecting stripe 9b.

Since the thickness of the projecting stripe 9b is greater than the thickness of the recessed stripe 9a, when the twist applied by the mouth part 5 is transmitted to the body part 6, the force is transmitted more easily to the projecting stripe 9b than to the recessed stripe 9a. Therefore, the projecting stripe 9b rotates faster than the recessed stripe 9a, and as a result, creases are formed in the inner bag 4 along the recessed stripe 9a and their extension line, thereby the inner bag 4 is easily folded into a pleated shape. Therefore, by providing the concave-convex shape 9, the body part 6 is folded in a pleated shape, and as a result, the diameter of the body part 6 is rapidly reduced. In addition, it is preferable that the concave-convex shape is not provided on the outer surface of the inner bag 4. The reason for this is that when the concave-convex shape is provided on the outer surface of the inner bag 4, the inner bag 4 and the outer shell 3 engage with each other in the direction of rotation of the inner bag 4, and it becomes difficult for the inner bag 4 to rotate relative to the outer shell 3.

When the thickness of the inner bag 4 at the projecting stripe 9b of the mouth part 5 (the radius of the circumscribed circle of the inner bag 4—the radius of the inscribed circle passing through the vertex of the projecting stripe 9b) is T, and the depth of the recessed stripe 9a (the radius of the inscribed circle passing through the bottom of the recessed stripe 9a—the radius of the inscribed circle passing through the vertex of the projecting stripe 9b) is D, the maximum value of D/T is, for example, 0.2 to 0.8, preferably 0.3 to 0.5. Specifically, this value is, for example, 0.2, 0.3, 0.4, 0.5, 0.6, 0.7, 0.8, and may be in a range between any two of the numerical values exemplified herein. The thickness of the inner bag 4 at the part of the mouth part 5 other than the concave-convex shape 9 is, for example, 1 to 2 mm, specifically, for example, 1.0, 1.1, 1.2, 1.3, 1.4, 1.5, 1.6, 1.7, 1.8, 1.9, 2.0 mm, and may be in a range between any two of the numerical values exemplified herein. The depth of the recessed stripe 9a at the part where the depth of the recessed stripe 9a is maximum is, for example, 0.3 to 1.0 mm, specifically, for example, 0.3, 0.4, 0.5, 0.6, 0.7, 0.8, 0.9, 1.0 mm, and may be in a range between any two of the numerical values exemplified herein.

The distance from the open end 5c of the mouth part 5 to the upper end of the concave-convex shape 9 is, for example, 0 to 30 mm, specifically for example, 0, 5, 10, 15, 20, 25, 30 mm, and may be in a range between any two of the numerical values exemplified herein. The distance from the top end to the bottom end of the concave-convex shape 9 is, for example, 10 to 40 mm, specifically, for example, 10, 15, 20, 25, 30, 35, 40 mm, and may be in a range between any two of the numerical values exemplified herein.

<Structure of Bottom Part 7>

Figure 7A:
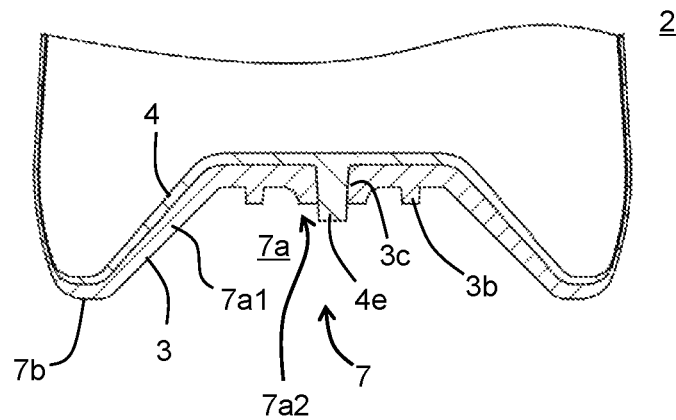
FIG. 7A is a B-B cross-sectional view of FIG. 1.
Figure 7B:
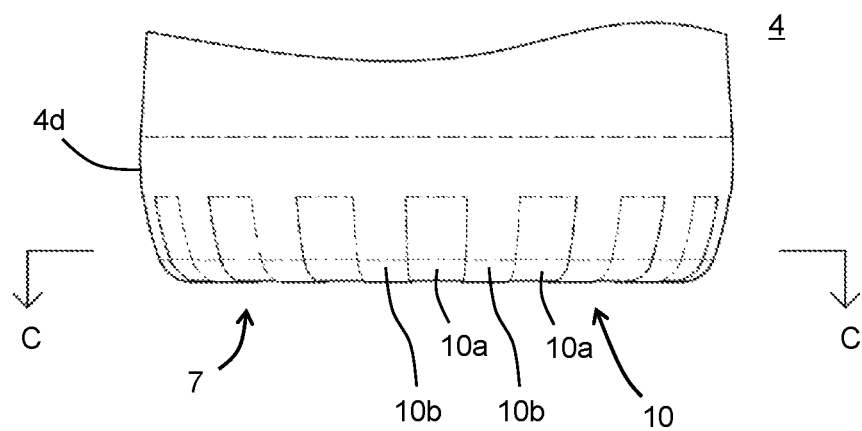
FIG. 7B is a front view of the inner bag 4 near the bottom part of the container body 2.
Figure 7C:
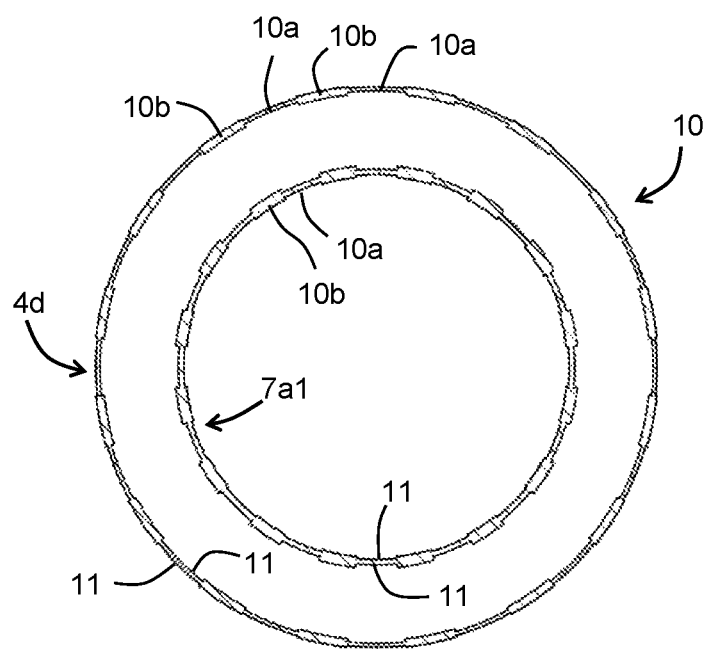
FIG. 7C is a C-C cross-sectional view of FIG. 7B.
Figure 8A:
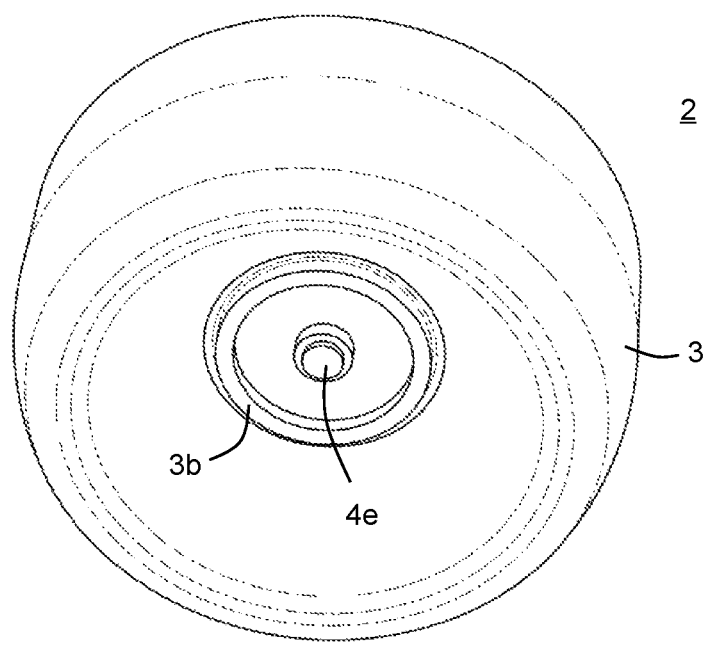
FIG. 8A is a perspective view of the vicinity of the bottom part of the container body 2 viewed obliquely from below.
Figure 8B:
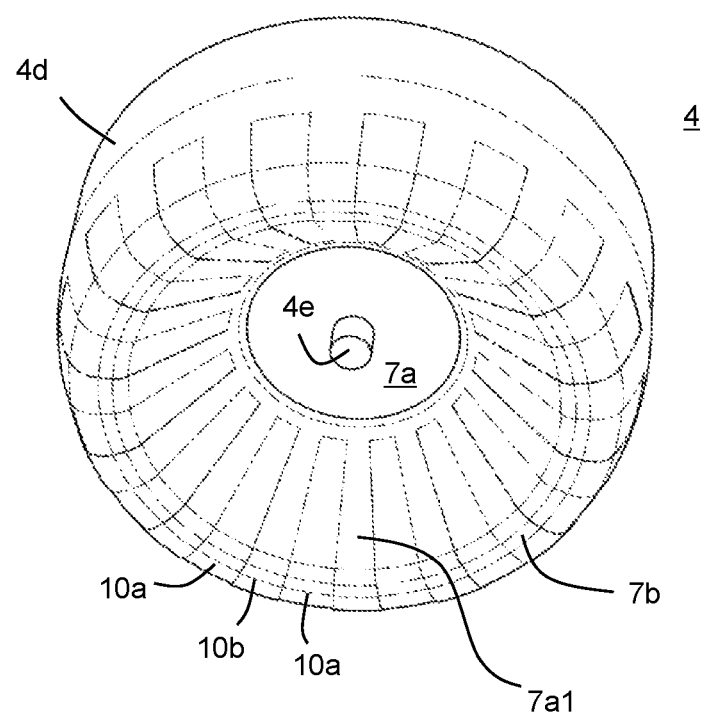
FIG. 8B is a perspective view of the inner bag 4 with the outer shell 3 removed from FIG. 8A.
Figure 9A:
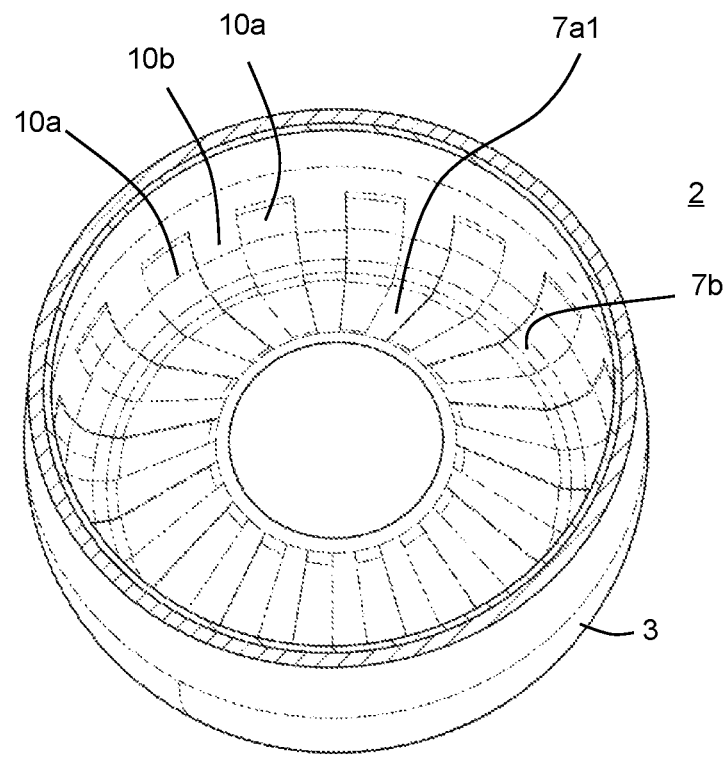
FIG. 9A is a perspective view of the vicinity of the bottom part of the container body 2 viewed obliquely from above.
Figure 9B:
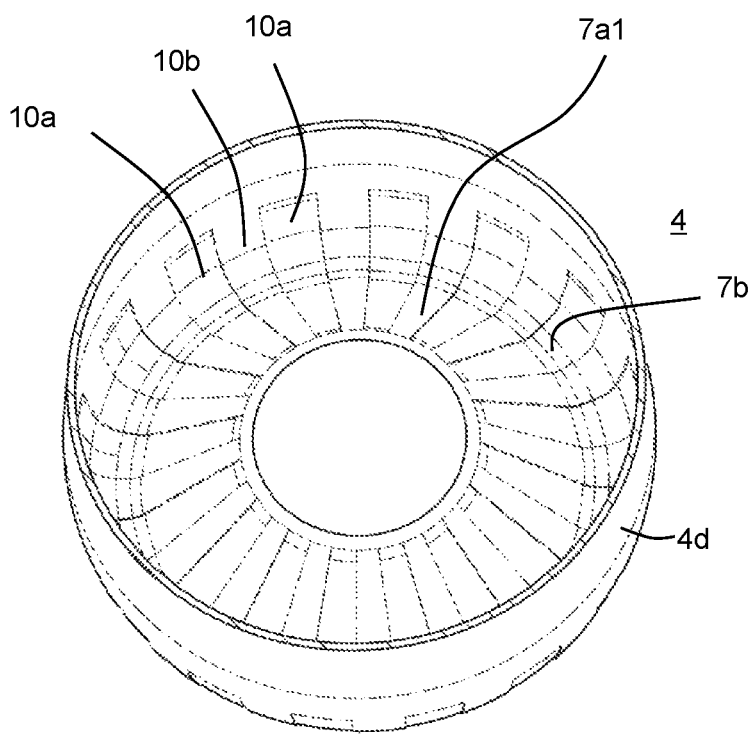
FIG. 9B is a perspective view of the inner bag 4 with the outer shell 3 removed from FIG. 9A.

As shown in FIGS. 7 to 9, a protrusion 4e is provided in the bottom part 7 of the inner bag 4. An annular convex part 3b is provided in the bottom part 7 of the outer shell 3, and a through hole 3c is provided in a region inside the annular convex part 3b. The inner bag 4 is positioned with respect to the outer shell 3 by inserting the protrusion 4e into the through hole 3c. Both the outer shell 3 and the inner bag 4 have a large wall thickness because the annular convex part 3b and its inner region are hardly stretched during the biaxial stretch blow molding. The annular convex part 3b can be omitted.

Assuming that the outer diameter of the annular convex part 3b is D1 and the inner diameter of the mouth part 5 of the outer shell 3 is D2, D1/D2 is preferably 0.9 or less, more preferably 0.6 or less. Since the wall thickness of the inner bag 4 increases in the annular convex part 3b and its inner region, the smaller the D1/D2 is, the easier it is for the diameter of the bottom part 7 of the inner bag 4 to be reduced. D1/D2 is, for example, 0.1 to 0.9, specifically, for example, 0.1, 0.2, 0.3, 0.4, 0.5, 0.6, 0.7, 0.8, 0.9, and may be in a range between any two of the numerical values exemplified herein, or may be equal to or less than any one of the values exemplified herein.

A bottom part concave region 7a and a peripheral edge region 7b surrounding the bottom part concave region 7a are provided on the bottom part 7 of the container body 2 (that is, the bottom part 7 of each of the inner bag 4 and the outer shell 3). The bottom part concave region 7a is a region where the bottom part 7 is recessed toward the inside of the container body 2. The peripheral edge region 7b serves as the ground surface of the container body 2. As shown in FIG. 7A, on the peripheral surface 7a1 of the bottom part concave region 7a, the thickness of each of the inner bag 4 and the outer shell 3 gradually decreases toward the peripheral edge region 7b. The peripheral surface 7a1 is an inclined surface that is inclined away from the center of the bottom part 7 toward the peripheral edge region 7b. In other words, the peripheral surface 7a1 constitutes a portion of a cone that collapses toward the bottom surface 7a2 of the bottom part concave region 7a. The bottom surface 7a2 of the bottom part concave region 7a is substantially flat. Therefore, the bottom part concave region 7a has a substantially truncated cone shape.

The bottom surface 7a2 of the bottom part concave region 7a is difficult to stretch during biaxial stretch blow molding, and tends to be thick. Therefore, the smaller the diameter D3 of the bottom surface 7a2 (in other words, the diameter of the region surrounded by the boundary line between the bottom surface 7a2 and the peripheral surface 7a1), the easier the diameter of the bottom part 7 of the inner bag 4 is reduced. D3/D2 is preferably 0.9 or less, more preferably 0.6 or less. D3/D2 is, for example, 0.1 to 0.9, specifically, for example, 0.1, 0.2, 0.3, 0.4, 0.5, 0.6, 0.7, 0.8, 0.9, and may be in a range between any two of the numerical values exemplified herein, or may be equal to or less than any one of the values exemplified herein.

<Alternating Wall Thickness Shape 10 Provided at Bottom Part 7>

As shown in FIGS. 7 to 9, an alternating wall thickness shape 10 in which the thin part 10a and the thick part 10b having a greater thickness than the thin part 10a appear alternately in the circumferential direction of the inner bag 4 is preferably provided in the bottom part 7 of the inner bag 4. By providing the alternating wall thickness shape 10 in the bottom part 7, the thin part 10a is bent when the inner bag 4 is twisted, so that the bottom part 7 is deformed into a bellows shape and the diameter of the bottom part 7 is easily reduced.

As shown in FIG. 7C, the peripheral surface 7a1 is thicker than the side surface 4d of the inner bag 4 near the bottom part 7. Therefore, in order to facilitate the diameter reduction of the bottom part 7, it is particularly important to provide the alternating wall thickness shape 10 on the peripheral surface 7a1. In addition, the peripheral edge region 7b is less likely to deform than the side surface 4d of the inner bag 4 near the bottom part 7. Therefore, it is particularly important to provide the alternating wall thickness shape 10 in the peripheral edge region 7b. Therefore, the alternating wall thickness shape 10 is preferably provided on at least one of the peripheral surface 7a1 of the bottom part concave region 7a and the peripheral edge region 7b, and more preferably provided so as to extend over the peripheral surface 7a1 and the peripheral edge region 7b. Also, the alternating wall thickness shape 10 is preferably provided so as to extend over the peripheral edge region 7b and the side surface 4d of the inner bag 4. By providing the alternating wall thickness shape 10 in this way, the diameter of the bottom part 7 can be more easily reduced.

As shown in FIG. 8B, the thin part 10a and the thick part 10b are preferably provided so as to radially extend from the center of the bottom part 7. Further, the number of the thin parts 10a is, for example, 4 to 30, preferably 10 to 20.

The thin part 10a can be formed by providing a recessed stripe 11 on one or both of the inner surface and the outer surface of the inner bag 4. The recessed stripe 11 on the inner surface and the recessed stripe 11 on the outer surface of the inner bag 4 face each other. A portion between two adjacent recessed stripes 11 is the thick part 10b.

When the thickness of the inner bag 4 in the thin part 10a is T1 and the thickness of the inner bag 4 in the thick part 10b is T2 in a cross section perpendicular to the height direction of the inner bag 4 (a cross section like FIG. 7C), the minimum value of T1/T2 is preferably 0.8 or less. The minimum value of T1/T2 is the minimum value when the position of the cross section is moved along the height direction of the inner bag 4 and T1/T2 is calculated at each height position. As T1/T2 becomes smaller, the thickness of the thin part 10a becomes smaller than that of the thick part 10b, and the bottom part 7 is easily deformed into a bellows shape. This value is preferably 0.1 or more. When this value is too small, the thickness of the thin part 10a becomes too small, and pinholes tend to occur. This value is, for example, 0.1 to 0.8, specifically, for example, 0.1, 0.2, 0.3, 0.4, 0.5, 0.6, 0.7, 0.8, and may be in a range between any two of the numerical values exemplified herein.

<Engagement Structure Between Mouth Part Attachment Member 8 and Inner Bag 4, and Engagement Structure Between Inner Bag 4 and Mouth Part 5 of Outer Shell 3>

The mouth part attachment member 8 is configured to be attachable to the mouth part 5 and is preferably configured such that the inner bag 4 rotates as the mouth part attachment member 8 rotates (here, relative rotation to the outer shell 3). With such a configuration, the inner bag 4 can be twisted by rotating the mouth part attachment member 8. Since the body part 6 of the container body 2 has a larger outer diameter than the mouth part 5, it is not easy to pull out the inner bag 4 through the mouth part 5 of the outer shell 3 simply by pulling the inner bag 4. However, by twisting the inner bag 4 to reduce the diameter of the body part 6 of the inner bag 4, the body part 6 of the inner bag 4 can easily pass through the mouth part 5 of the outer shell 3, and the inner bag 4 can be easily pulled out from the outer shell 3. The engagement structure between the mouth part attachment member 8 and the inner bag 4 will be described in more detail below.

As shown in FIGS. 2 and 4, the inner bag 4 includes a projecting part 4c projecting from the open end 3a of the outer shell 3. The projecting port 4c includes a projecting cylinder 4c1, an engagement protrusion 4c2, an engagement flange 4c3, and an abutting flange 4c4.

The engagement protrusion 4c2 protrudes radially outward from the peripheral surface of the projecting cylinder 4c1. The engagement flange 4c3 is an annular portion arranged at a position farther from the open end 3a than the engagement protrusion 4c2 and having a larger diameter than the projecting cylinder 4c1. The abutting flange 4c4 is an annular portion disposed at a position abutting against the open end 3a and having a diameter larger than that of the projecting cylinder 4c1. The inner bag 4 is prevented from falling out into the outer shell 3 by the abutment of the abutting flange 4c4 against the open end 3a. On the other hand, the inner bag 4 may be avoided from falling out into the outer shell 3 by having the engagement protrusion 4c2 contact the open end 3a without the abutting flange 4c4.

Figure 5A:
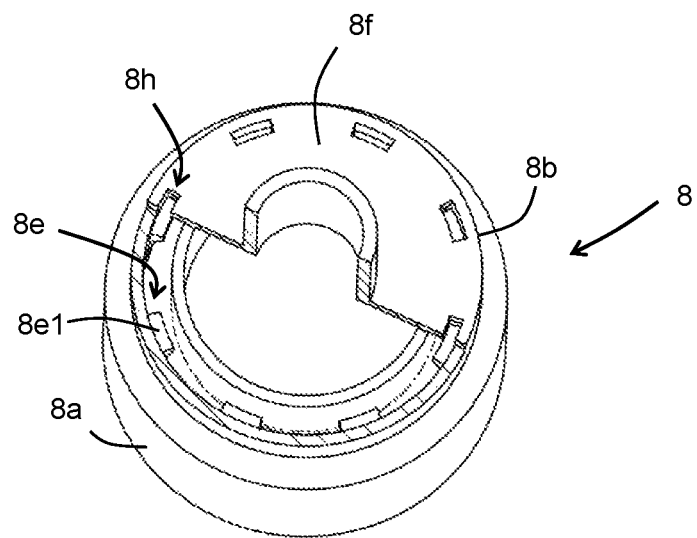
FIG. 5A is a partially cut-out view of the mouth part attachment member 8.
Figure 5B:
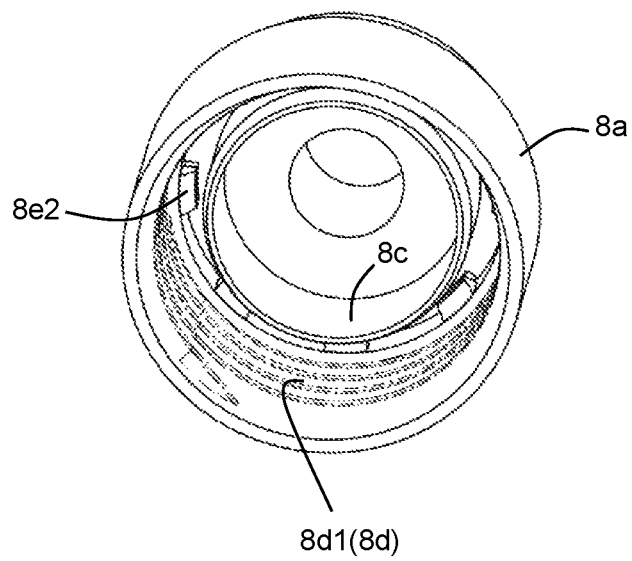
FIG. 5B is a perspective view of the mouth part attachment member 8 viewed obliquely from below.
Figure 6A:
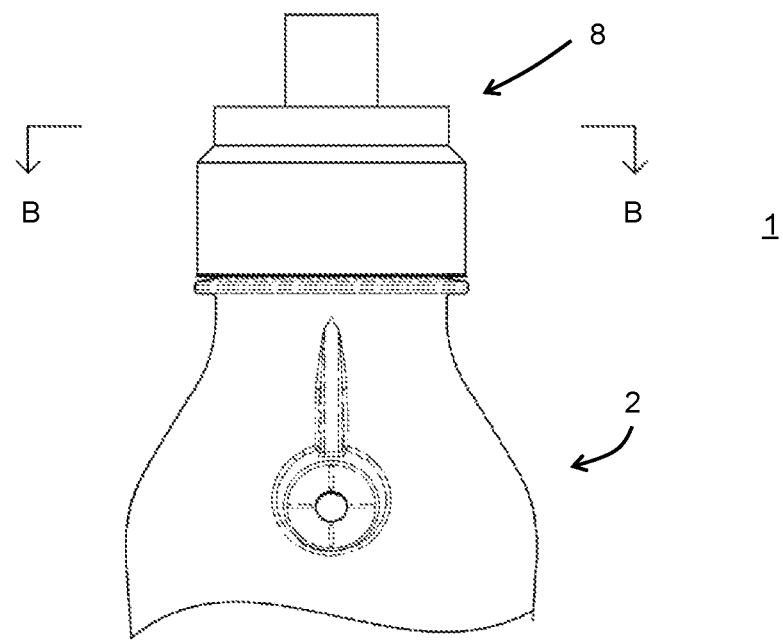
FIG. 6A is a front view of the mouth part attachment member 8 attached to the container body 2.

As shown in FIGS. 4 to 6, the mouth part attachment member 8 includes an outer cylinder 8a, an intermediate cylinder 8b, an inner cylinder 8c, an engaging part 8d, a claw part 8e, a top plate 8f, and a nozzle 8g.

An engaging part 8d is provided on the inner surface of the outer cylinder 8a. The engaging part 8d is an engaging part that engages with the engaging part 5a of the mouth part 5, by engaging the engaging part 8d with the engaging part 5a, the mouth part attachment member 8 is attached to the mouth part 5.

The intermediate cylinder 8b has a smaller diameter than the outer cylinder 8a and is arranged above the outer cylinder 8a. The inner cylinder 8c is a so-called inner ring that has a smaller diameter than the intermediate cylinder 8*b* and is arranged inside the outer cylinder 8*a* and the intermediate cylinder 8*b*. The upper surface of the intermediate cylinder 8*b* is covered with a top plate 8*f*. A nozzle 8*g* is provided on the top plate 8*f*.

A claw part 8*e* is provided on the inner surface of the intermediate cylinder 8*b*. A plurality of (eight in this embodiment) claw parts 8*e* are provided space apart in the circumferential direction. The number of claw parts 8*e* is, for example, 1 to 20, preferably 4 to 12. The claw part 8*e* includes an upper surface 8*e*1 and a lower inclined surface 8*e*2. A through hole 8*h* is provided in the top plate 8*f* at a position facing the claw part 8*e*.

The mouth part attachment member 8 having such a shape can be manufactured using a split mold that opens and closes in the vertical direction. Since the through hole 8*h* and the upper surface 8*e*1 can be formed using the protrusion provided on the upper mold, the claw part 8*e* can be formed without forcibly removing the lower mold. Therefore, it is not necessary to set the protrusion amount of the claw part 8*e* to a protrusion amount that allows forcible removal, and it is possible to set the protrusion amount of the claw part 8*e* to the protrusion amount (for example, 1 mm or more) suitable for engagement with the inner bag 4.

In this embodiment, the engaging part 5*a* is a male threaded part 5*a*1, and the engaging part 8*d* is a female threaded part 8*d*1 that can be screwed onto the male threaded part 5*a*1. Therefore, by rotating the mouth part attachment member 8 relative to the mouth part 5 in the tightening direction (usually clockwise when viewed from above) (hereinafter, relative rotation with respect to the mouth part 5 is also simply referred to as "rotation"), it is possible to attach the mouth part attachment member 8 to the mouth part 5. When the mouth part attachment member 8 is rotated in the tightening direction, the female threaded part 8*d*1 is screwed into the male threaded portion 5*a*1 while the outer peripheral surface of the inner cylinder 8*c* shown in FIG. 5B is in close contact with the inner peripheral surface of the inner bag 4. At this time, when the mouth part 5 of the inner bag 4 rotates together with the mouth part attachment member 8 due to friction between the outer peripheral surface of the inner cylinder 8*c* and the inner peripheral surface of the inner bag 4, the inner bag 4 is twisted. The content is filled in the inner bag 4 before the mouth part attachment member 8 is attached and when the inner bag 4 is twisted, a problem that the contents in the inner bag 4 overflow occurs. In order to prevent such problem from occurring, the inner bag 4 and the outer shell 3 should be tightly fitted so that the inner bag 4 does not rotate relative to the outer shell 3 at the mouth part 5. However, when they are simply tightly fitted, a new problem that it becomes difficult to pull out the inner bag 4 from the outer shell 3 occurs.

Therefore, in the present embodiment, a configuration where the first resistance to relative rotation of the inner bag 4 with respect to the outer shell 3 in one direction at the mouth part 5 is greater than the second resistance to relative rotation in the other direction. is adopted. For example, when the male threaded part 5*a*1 is a right-handed thread, the one direction and the other direction are the clockwise direction and the counterclockwise direction, respectively, when viewed from above the container body 2. In other words, the one direction is the tightening direction of the mouth part attachment member 8 and the other direction is the loosening direction of the mouth part attachment member 8. According to such a configuration, when the mouth part attachment member 8 is attached, the inner bag 4 is less likely to rotate relative to the outer shell 3, so that the occurrence of the problem that the inner bag 4 is twisted when the mouth part attachment member 8 is attached is suppressed. In addition, since the second resistance against relative rotation in the other direction is relatively small, when the inner bag 4 is separated from the outer shell 3 after use, by rotating the mouth part 5 of the inner bag 4 in the other direction relative to the outer shell 3, the inner bag 4 can be easily twisted and reduced in diameter. Therefore, it is easy to pull out the inner bag 4 from the outer shell 3.

Figure 2A:
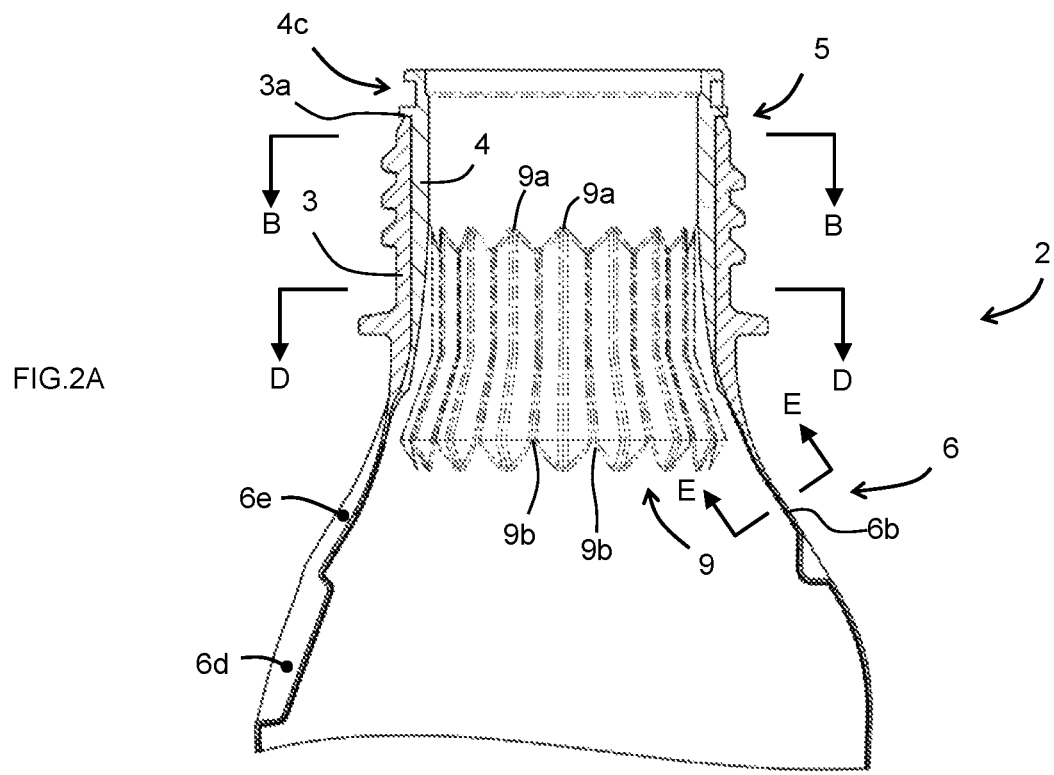
FIG. 2A is a A-A cross-sectional view in FIG. 1.
Figure 2B:
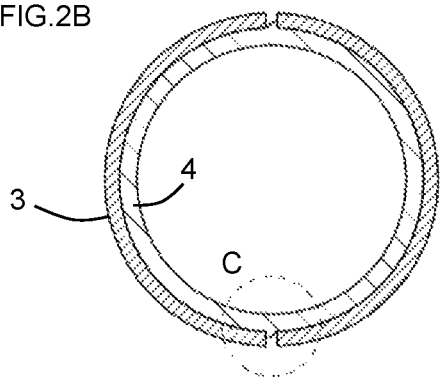
FIG. 2B is an end view of a B-B cross section in FIG. 2A.
Figure 2C:
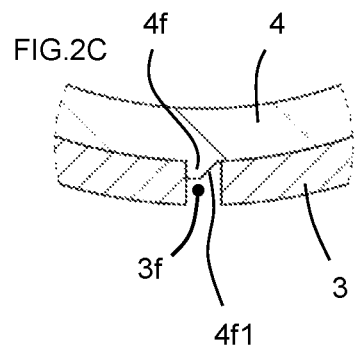
FIG. 2C is an enlarged view of region C in FIG. 2B.
Figure 2D:
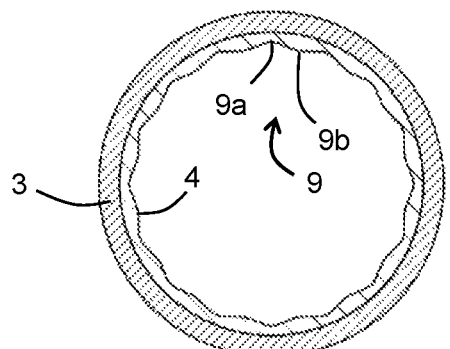
FIG. 2D is an end view of a D-D cross section in FIG. 2A.

Specifically, the inner bag 4 and the outer shell 3 are in concave-convex engagement in the mouth part 5, and this concave-convex engagement is configured such that the first resistance is greater than the second resistance. More specifically, as shown in FIGS. 2C and 4B, the concave-convex engagement is engagement between the convex part 4*f* provided on the outer peripheral surface of the inner bag 4 and the concave part 3*f* provided on the inner peripheral surface of the outer shell 3. As shown in FIG. 2C, a tapered surface 4*f*1 for reducing the second resistance is provided on the right side (on the loosening direction side) of the convex part 4*f*. On the other hand, a tapered surface is not provided on the left side (on the tightening direction side) of the convex part 4*f*. Therefore, in the mouth part 5, the resistance (the first resistance) for rotating the inner bag 4 relative to the outer shell 3 in the tightening direction is higher than the resistance (the second resistance) for relatively rotating in the loosening direction. In the present embodiment, two sets of the convex part 4*f* and the concave part 3*f* are provided at intervals of 180 degrees, but the number of sets of the convex part 4*f* and the concave part 3*f* may be one or three or more.

It is noted that the second resistance may be reduced by providing a tapered surface in the concave part 3*f* instead of providing the tapered surface 4*f*1 or in addition to providing the tapered surface 4*f*1. Furthermore, the concave-convex engagement may be engagement between a concave part provided on the outer peripheral surface of the inner bag 4 and a convex part provided on the inner peripheral surface of the outer shell 3. Moreover, although the concave part 3*f* is configured by a through hole penetrating the outer shell 3, the concave part 3*f* may not penetrate the outer shell 3 as long as the concave part 3*f* can be engaged with the convex part 4*f*.

Figure 6B:
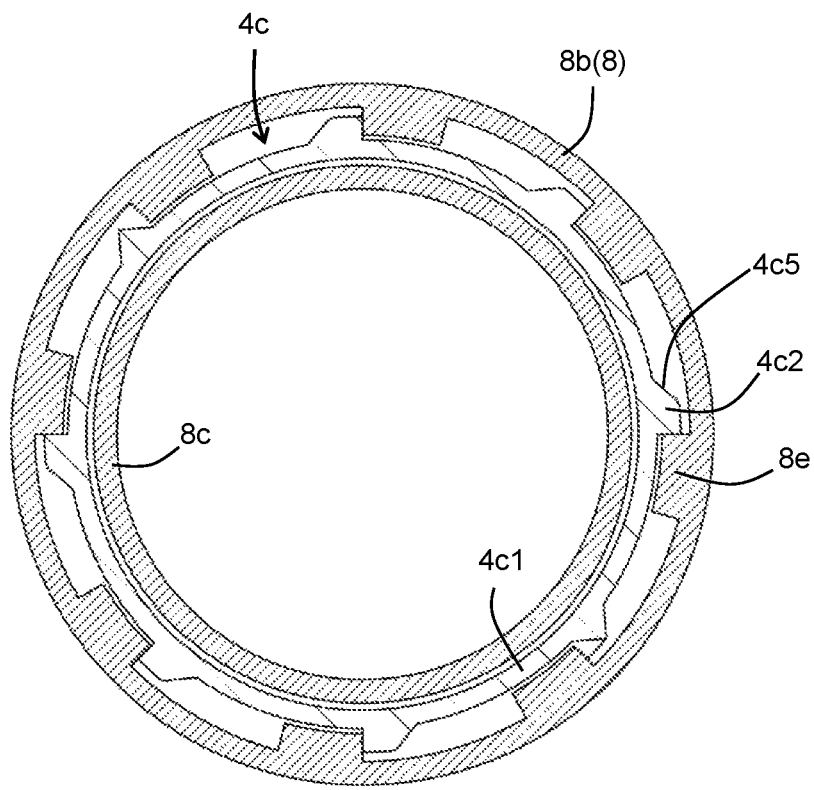
FIG. 6B is a B-B cross-sectional view of FIG. 6A.

When the mouth part attachment member 8 is further rotated in the tightening direction, the claw part 8*e* gradually approaches the projecting part 4*c* while the female threaded part 8*d*1 is screwed into the male threaded part 5*a*1, and at a certain point the lower inclined surface 8*e*2 abuts on the engagement flange 4*c*3. In this state, when the mouth part attachment member 8 is further rotated in the tightening direction, the claw part 8*e* climbs over the engagement flange 4*c*3 to enter the state shown in FIG. 6. In this state, the claw part 8*e* is arranged between the engagement flange 4*c*3 and the abutting flange 4*c*4. The engagement flange 4*c*3 is accommodated in the gap between the claw part &*e* and the top plate 8*f*. As shown in FIG. 6B, the projecting cylinder 4*c*1 is arranged between the claw part 8*e* and the inner cylinder 8*c*. At this point, when the male threaded part 5*a*1 and the female threaded part 8*d*1 are not completely tightened, the claw part 8*e* is guided by a circumferential inclined surface 4*c*5 provided on the engagement protrusion 4*c*2, and the claw part 8*e* climbs over the engagement protrusion 4*c*2. Thereby, the mouth part attachment member 8 can be rotatable further in the tightening direction. After the male threaded part 5*a*1 and the female threaded part 8*d*1 are completely tightened, the mouth part attachment member 8 cannot rotate in the tightening direction and cannot move in the axial direction of the mouth part 5.

In this state, the engagement protrusion 4$c$2 is engaged with the claw part &$e$ of the mouth part attachment member 8 in the rotational direction of the mouth part attachment member 8, and the engagement flange 4$c$3 is engaged with the claw part 8$e$ of the mouth part attachment member 8 in the axial direction of the mouth part 5. That is, the claw part Se is engaged with the engagement protrusion 4$c$2 and the engagement flange 4$c$3.

For this reason, after the contents in the inner bag 4 were used up, when the mouth part attachment member 8 is rotated in the loosening direction (usually counterclockwise when viewed from above), the inner bag 4 rotates as the mouth part attachment member 8 rotates. As a result, the inner bag 4 is twisted and reduced in diameter.

When the mouth part attachment member 8 is further rotated in the loosening direction to unscrew the female threaded part 8$dl$ and the male threaded part 5$a$1, the mouth part attachment member 8 becomes movable in the direction away from the open end 3$a$ (that is, in the axial direction of the mouth part 5). Since the engagement flange 4$c$3 is engaged with the mouth part attachment member 8 in the axial direction of the mouth part 5, when the mouth part attachment member 8 is moved in the axial direction of the mouth part 5, the inner bag 4 is also moved together with the mouth part attachment member 8, and the inner bag 4 is pulled out from the outer shell 3.

As described above, according to the configuration of the present embodiment, the inner bag 4 is twisted and reduced in diameter, and then pulled out from the outer shell 3 simply by rotating the mouth part attachment member 8 in the loosening direction. Therefore, the inner bag 4 and the outer shell 3 can be smoothly separated by a simple operation.

<Concave-Convex Shape on the Outer Surface of the Inner Bag 4 or the Inner Surface of the Outer Shell 3 at the Shoulder Part 6$b$>

Figure 3B:
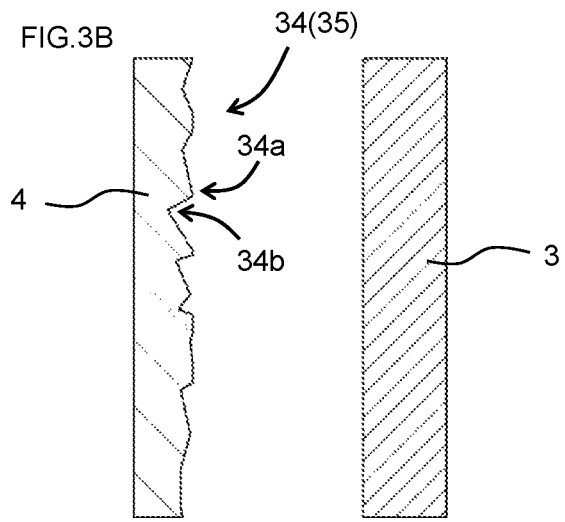
FIG. 3B is an exploded view of FIG. 3A.
Figure 3C:
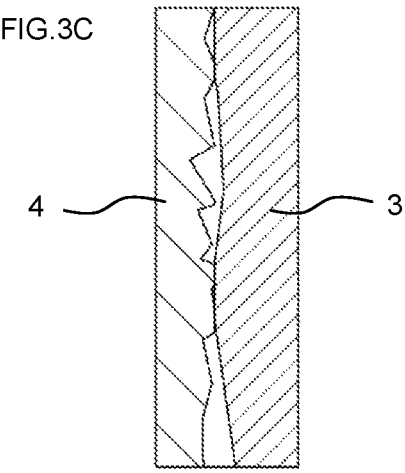
FIG. 3C is a cross-sectional view corresponding to FIG. 3A.
Figure 3D:
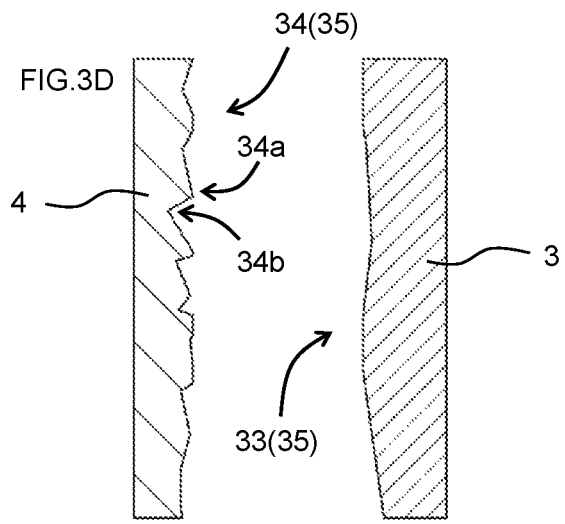
FIG. 3D is an exploded view of FIG. 3C, for a variation of the first embodiment.

The shoulder part 6$b$ is a portion whose outer diameter increases as it moves away from the mouth part 5. Therefore, when the inner bag 4 is pulled out from the outer shell 3, the outer surface of the inner bag 4 is particularly strongly pressed against the inner surface of the outer shell 3 at the shoulder part 6$b$. Therefore, by reducing the frictional resistance between the inner bag 4 and the outer shell 3 at the shoulder part 6$b$, the force required to pull out the inner bag 4 can be effectively reduced. Therefore, in this embodiment, as shown in FIGS. 3A and 3B, at least one of the outer surface of the inner bag 4 and the inner surface of the outer shell 3 at the shoulder part 6$b$ of the container body 2, a concave-convex shape 35 is provided to reduce the contact area between the outer surface of the inner bag 4 and the inner surface of the outer shell 3.

The concave-convex shape 35 may be provided only on the outer surface of the inner bag 4, may be provided only on the inner surface of the outer shell 3, or may be provided on both the outer surface of the inner bag 4 and the inner surface of the outer shell 3. In this embodiment, as shown in FIGS. 3A and 3B, the concave-convex shape 34 is provided on the outer surface of the inner bag 4, and the concave-convex shape is not provided on the inner surface of the outer shell 3. In this case, the outer surface of the inner bag 4 and the inner surface of the outer shell 3 contact each other at the convex part 34$a$ of the concave-convex shape 34 and do not contact each other at the concave part 34$b$, thereby reducing the contact area. As in the modification shown in FIGS. 3C and 3D, a concave-convex shape 33 that is not complementary shape to the concave-convex shape 34 may be provided on the inner surface of the outer shell 3. Also in this case, the contact area between the outer surface of the inner bag 4 and the inner surface of the outer shell 3 is reduced.

Figure 3E:
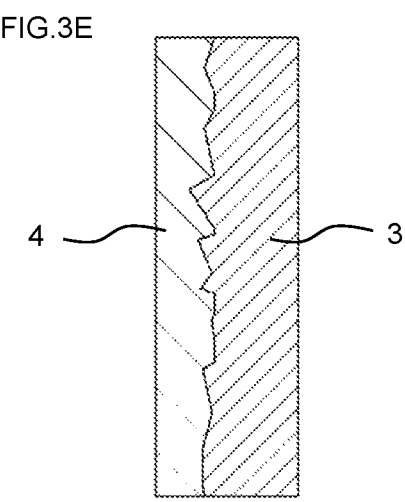
FIG. 3E is a cross-sectional view corresponding to FIG. 3A.
Figure 3F:
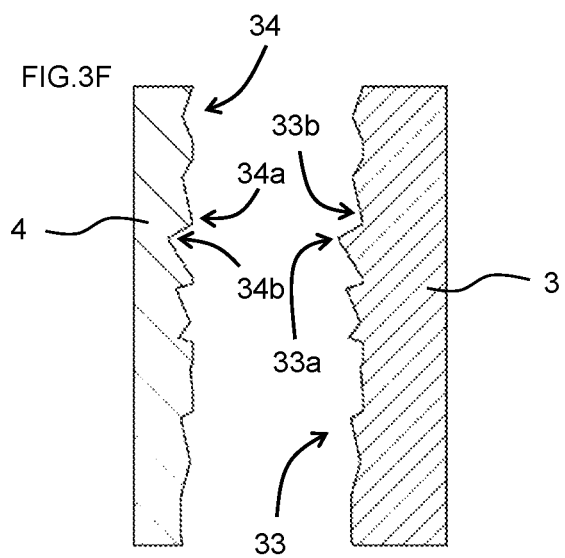
FIG. 3F is an exploded view of FIG. 3E, for a comparative example.

On the other hand, as in the comparative example shown in FIGS. 3E to 3F, when the concave-convex shapes 34 and 33 that are complementary shapes are provided on the outer surface of the inner bag 4 and the inner surface of the outer shell 3, the convex part 34$a$ of the concave-convex shape 34 of the inner bag 4 enter the concave part 33$b$ of the concave-convex shape 33 of the outer shell 3, the concave part 34$b$ of the concave-convex shape 34 of the inner bag 4 enter the convex part 33$a$ of the concave-convex shape 33 of the outer shell 3. Therefore, the contact area between the outer surface of the inner bag 4 and the inner surface of the outer shell 3 rather increases. Such a concave-convex shape is not "the concave-convex shape 35 that reduces the contact area between the outer surface of the inner bag 4 and the inner surface of the outer shell 3".

The ratio of the depth of the concave part 34$b$ seen from the highest part to the thickness of the inner bag 4 at the highest part of the convex part 34$a$ of the concave-convex shape 34 is, for example, 0.01 to 0.5. is, for example, 0.01, 0.05, 0.1, 0.2, 0.3, 0.4, 0.5, and may be in a range between any two of the numerical values exemplified herein. When this ratio is too small, the effect of reducing the frictional resistance may not be sufficient, and when the ratio is too large, pinholes are likely to be formed in the inner bag 4 in some cases.

The concave-convex shape 35 may be a shape in which the convex part and the concave part are regularly arranged or may be a shape in which the convex part and the concave part are arranged irregularly. The inner bag 4 having the concave-convex shape 34 on the outer surface can be formed by biaxially stretching blow molding the inner preform 14 having the concave-convex shape on the outer surface. The outer shell 3 having the concave-convex shape 33 on the inner surface can be formed by biaxially stretch blow molding the outer preform 13 having the concave-convex shape on the inner surface.

The concave-convex shape 35 may be formed in a portion including the shoulder part 6$b$, but is preferably formed in a portion including the shoulder part 6$b$ and the bottom part 7. This is because the frictional resistance between the outer surface of the inner bag 4 and the inner surface of the outer shell 3 tends to increase in the bottom part 7 as well.

<Laser Marking>

By the way, as a method for handling the inner bag 4 after separation, horizontal recycling, cascade recycling, thermal recycling, etc. can be considered. However, when there is no indication on the inner bag 4, it is not easy for the user to determine how the separated inner bag 4 should be handled. In the case of a container where the outer shell 3 and the inner bag 4 are not separated, it is easy to form an imprint of the recycle mark on the container by providing a predetermined shape of the recycle mark shape on the mold for molding. On the other hand, when the outer shell 3 and the inner bag 4 are separated from each other as in the present embodiment, it is necessary to attach a recycling mark different from that of the outer shell 3 to the inner bag 4. However, it is impossible to form the imprint of the recycle mark only on the inner bag 4 using the mold for molding. It is also conceivable to provide the recycle mark on the inner preform 14 which will be described later. However, when biaxially stretch blow molding the inner preform 14, there is a problem that in addition to the difficulty of accurately controlling which part of the inner preform 14 is stretched and how much, the recycle mark is also stretched and becomes unclear when the inner preform 14 is stretched. Therefore, it is not easy to attach a clear recycle mark only on the inner bag 4.

In this embodiment, as shown in FIG. 1, an information transmission display 22 is printed on the inner bag 4 by irradiation with laser light. Printing by irradiation with laser light is performed by altering properties (oxidation, peeling, color development, discoloration, etc.) of an object by irradiation with laser light. Irradiation with laser light can be performed using a laser marker. The laser marker is a device that can scan and irradiate a laser light in at least two-dimensional direction, and is a device that can print a preset shape by moving the laser light spot along a preset path. The laser marker used for printing on the inner bag 4 is preferably a fiber laser marker.

Since printing on the inner bag 4 is performed through the outer shell 3, it is preferable that the laser light has a wavelength that is not easily absorbed by the outer shell 3. The wavelength of the laser light is preferably 500 to 1150 nm, preferably 950 to 1150 nm, preferably 1000 to 1100 nm, more preferably 1064 nm. Specifically, this wavelength is, for example, 500, 950, 1000, 1010, 1020, 1030, 1040, 1050, 1060, 1064, 1070, 1080, 1090, 1100, 1150 nm, and may be in a range between any two of the numerical values exemplified herein. Since this laser light is not easily absorbed by PET, it is possible to print on the inner bag 4 through the outer shell 3 when the outer shell 3 is made of PET.

However, since this laser light is not easily absorbed by polyolefins (for example, polypropylene and polyethylene), it is preferable to blend a laser marking agent into the inner bag 4. The laser marking agent is a substance that absorbs laser light more easily than the resin that forms the inner bag 4 and/or is more susceptible to discoloration due to laser light absorption than the resin that forms the inner bag 4. By blending a laser marking agent into the inner bag 4, printing on the inner bag 4 is facilitated. Specific examples of laser marking agents include antimony-doped tin oxide, antimony or its compounds, associative basic dye precursors (2,2-bis{4-[6'-(cyclohexyl-N-methylamino)-3'-methylspiro[phthalid-3,9'-xanthene]-2'-ylamino]phenyl}propane), phthalide dye precursors, fluoran dye precursors, spiropyran dye precursors, lactam dye precursors, etc. preferable. The laser marking agent is preferably in a form suitable for molding and processing, for example, as a masterbatch (resin material containing a laser marking agent at a predetermined concentration), pellets, particles, paste, or the like.

The information transmission display 22 is a display for transmitting information on how to handle the inner bag 4, and may be composed only of patterns, may be composed only of letters, or may be composed of a combination of both. In one example, the information transmission display 22 is consisted of a recycle mark 22a and a message 22b. In the example of FIG. 1, the recycle mark 22a indicates that the inner bag 4 is made of general plastic, and the message 22b indicates that the recommended recycling method is thermal recycling. Since the information transmission display 22 is printed on the inner bag 4, it remains attached to the inner bag 4 even after the inner bag 4 is separated from the outer shell 3. Therefore, it becomes easy for the user to determine how to handle the inner bag 4.

A gap (air layer) is preferably provided between the inner bag 4 and the outer shell 3 at the portion where the information transmission display 22 is printed. When there is a gap between them, smoke is generated when the information transmission display 22 is printed, and fine particles contained in the smoke adhere to the inner surface of the outer shell 3 or the outer surface of the inner bag 4. The fine particles function as a lubricant to reduce the resistance force when the inner bag 4 is pulled out from the outer shell 3.

The information transmission display 22 is preferably printed only on the inner bag 4, but may also be printed on the outer shell 3 depending on the irradiation conditions of the laser light. In this case, the information transmission display 22 printed on the outer shell 3 is preferably thinner (lower visibility) than the information transmission display 22 printed on the inner bag 4. Further, it is preferable that a concave-convex shape due to printing of the information transmission display 22 is not formed in the outer shell 3, and it is preferable that the surface of the outer shell 3 is smooth.

An information transmission display 23 is provided on the outer shell 3. The information transmission display 23 is a display for transmitting information on how to handle the outer shell 3, and may be consisted only of patterns, may be consisted of letters only, or may be consisted of a combination of both. In the example, the information transmission display 23 consists of a recycle mark 23a and a message 23b. In the example of FIG. 1, the recycle mark 23a indicates that the outer shell 3 is made of PET and the message 23b indicates that the recommended recycling method is horizontal recycling. The method of attaching the information transmission display 23 is not particularly limited, but the method of attaching a sticker or printing with ink adversely affects the recyclability of the outer shell 3. Therefore, it is preferable that the information transmission display 23 is printed by irradiation with laser light.

When the outer shell 3 is PET, the wavelength of the laser light is preferably 8.0 to 12 μm, more preferably 9.0 to 11 μm. Specifically, the wavelength is, for example, 8.0, 8.5, 9.0, 9.1, 9.2, 9.3, 9.4, 9.5, 9.6, 9.7, 9.8, 9.9, 10.0, 10.1, 10.2, 10.3, 10.4, 10.5, 10.6, 10.7, 10.8, 10.9, 11.0, 11.5, 12.0 μm, and may be in a range between any two of the numerical values exemplified herein. A laser light with such a wavelength is easily absorbed by the outer shell 3 and is therefore suitable for printing the information transmission display 23 on the outer shell 3. The laser marker used for marking the outer shell 3 is preferably a CO2 laser marker capable of emitting laser light of the above wavelength.

The information transmission display 23 is preferably printed only on the outer shell 3, but may also be printed on the inner bag 4 depending on the irradiation conditions of the laser light. In this case, the information transmission display 23 printed on the inner bag 4 is preferably thinner (lower visibility) than the information transmission display 23 printed on the outer shell 3. The information transmission display 23 is preferably provided so as not to overlap with the information transmission display 22.

Further, a covering region that makes the information transmission display 22 invisible may be provided in the outer shell 3. The method of providing the covering region is not particularly limited, but the method of attaching a seal or printing with ink adversely affects the recyclability of the outer shell 3. Therefore, it is preferable that the covering region is printed by irradiation with the laser light. In this case, the information transmission display 22 can be visually recognized for the first time by pulling out the inner bag 4. Therefore, it is possible to prevent user's confusion caused by visually recognizing both the information transmission display 22 and the information transmission display 23 on the container body 2 before the inner bag 4 is pulled out. Further, when the information transmission display 22 is a display having a taste such as a lottery or fortune-telling, providing the covering region can give motivation to pull out the inner bag 4.

1-2. Method for Manufacturing Double Container 1

As shown in FIGS. 10 to 13, the container body 2 can be formed by heating the preform 15 and biaxially stretching blow molding it. In one example, the preform 15 can be configured by covering an inner preform 14 that serves as the inner bag 4 with an outer preform 13 that serves as the outer shell 3.

<Configuration of Inner Preform 14, Outer Preform 13 and Preform 15>

As shown in FIG. 10, the inner preform 14 has a cylindrical shape with a bottom, and includes a mouth part 14a, a body part 14b, and a bottom part 14c. A projecting part 14d is provided at the open end of the mouth part 14a. The projecting part 14d becomes the projecting part 4c in its original shape without being deformed during molding. Therefore, what was been said about the projecting part 4c also applies to the projecting part 14d. The bottom part 14c is provided to close the lower end of the body part 14b. A positioning pin 14c1 is provided on the bottom part 14c.

As shown in FIG. 11, a concave-convex shape 19 is provided on the inner surface of the inner preform 14. The concave-convex shape 19 becomes the concave-convex shape 9 of the container body 2, either by its original shape or by being stretched during molding. The description of the concave-convex shape 9 also applies to the concave-convex shape 19 as long as it does not contradict the intent of the description.

As shown in FIGS. 10 to 11, an alternating wall thickness shape 20 where a thin part 20a and a thick part 20b thicker than the thin part 20a appear alternately in the circumferential direction is provided near the bottom part 14c of the inner preform 14. The alternating wall thickness shape 20 is stretched during biaxial stretch blow molding to become the alternating wall thickness shape 10. The number of the thin part 20a is, for example, 4 to 30, preferably 10 to 20. The thin part 20a is preferably provided along the longitudinal direction of the inner preform 14.

The thin part 20a can be formed by providing a recessed stripe 21 on one or both of the inner surface and the outer surface of the inner preform 14. When the recessed stripe 21 is provided on the inner surface of the inner preform 14, the recessed stripe 11 is formed on the inner surface of the inner bag 4 after molding. When the recessed stripe 21 is provided on the outer surface of the inner preform 14, the recessed stripe 11 is formed on the outer surface of the inner bag 4 after molding, and the recessed stripe 11 is also formed on the inner surface of the inner bag 4 at a position facing the recessed stripe 11 on the outer surface. This is because the resin at the position facing the recessed stripe 11 is pressed outward by the air pressure during blowing.

Figure 11A:
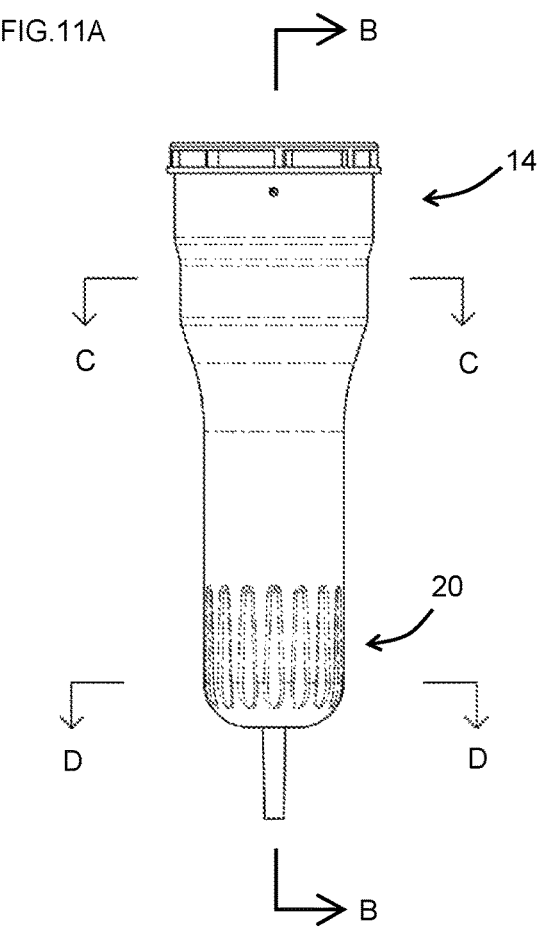
FIG. 11A is a front view of the inner preform 14.
Figure 11B:
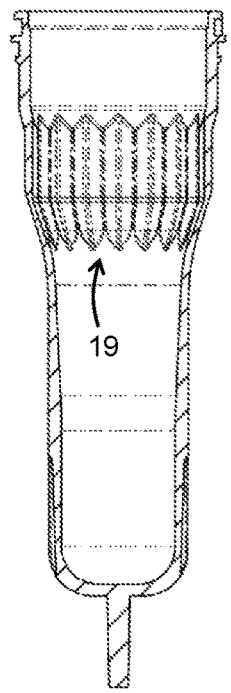
FIGS. 11B to 11C are respectively B-B cross-sectional view and CC cross-sectional view in FIG. 11A.
Figure 11C:
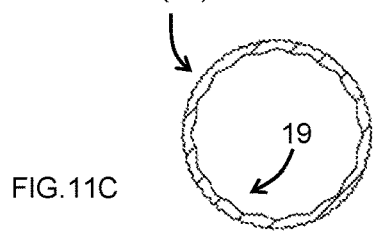
Figure 11D:
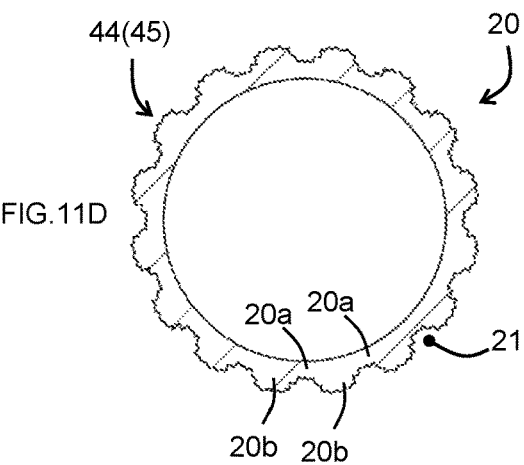
FIG. 11D is an enlarged view of the D-D section in FIG. 11A.
Figure 11E:
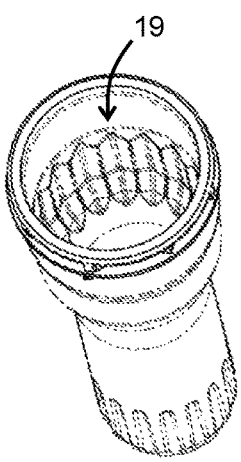
FIG. 11E is a perspective view of the inner preform 14 viewed obliquely from above.
Figure 12A:
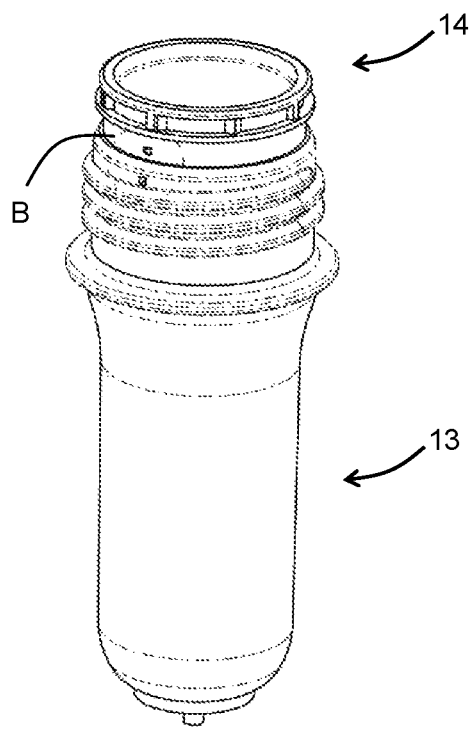
FIG. 12A is a perspective view showing a state in the middle of covering the inner preform 14 with the outer preform 13.
Figure 12B:
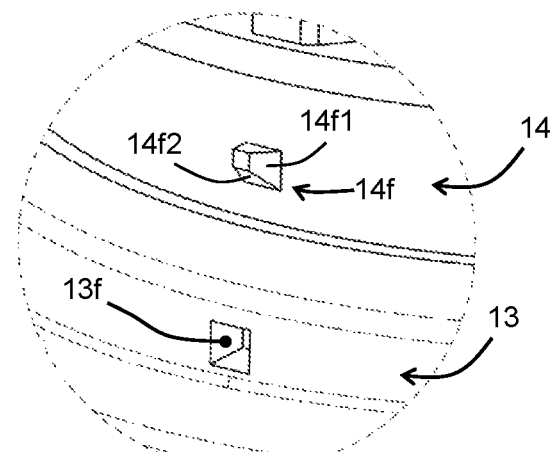
FIG. 12B is an enlarged view of region B in FIG. 12A.
Figure 12C:
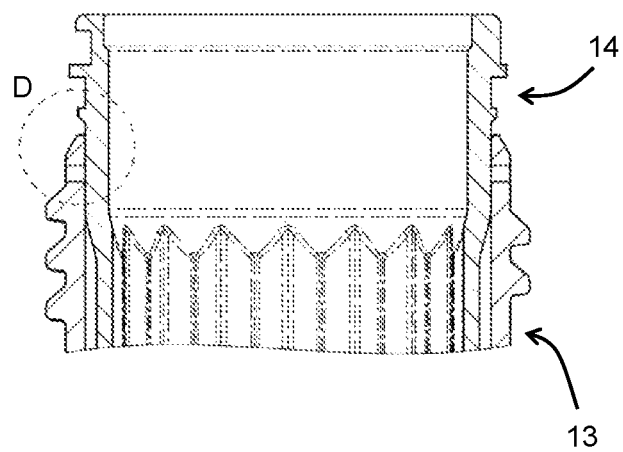
FIG. 12C is an end view of a cross section passing through the center of the convex part 14f and the center of the inner preform 14 in FIG. 12A.
Figure 12D:
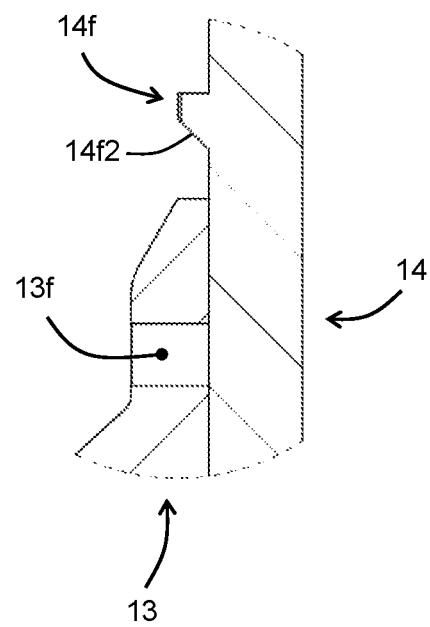
FIG. 12D is an enlarged view of region D in FIG. 12C.
Figure 13:
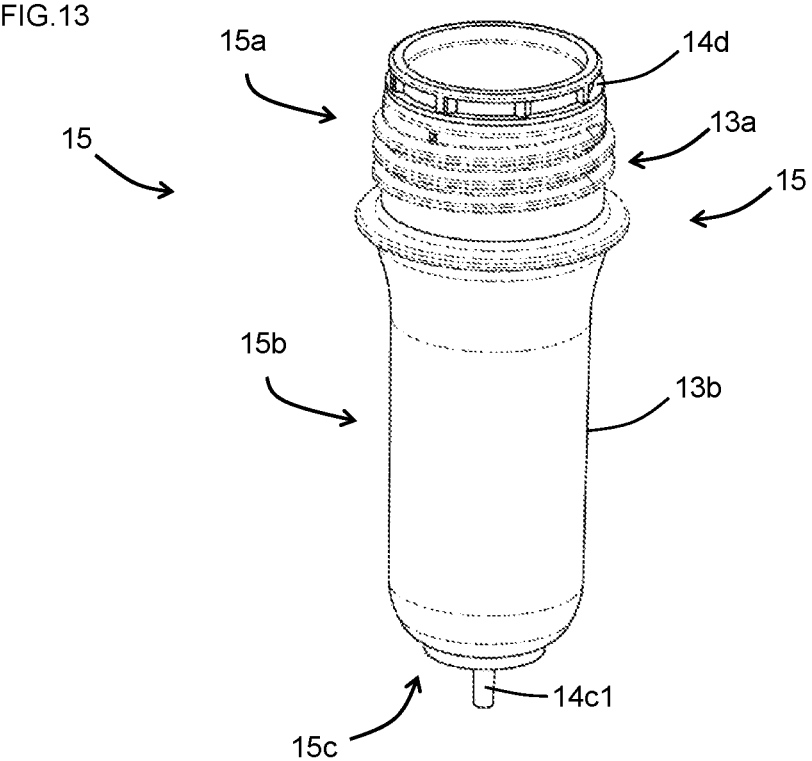
FIG. 13 is a perspective view of a preform 15 configured by covering an inner preform 14 with an outer preform 13.

When the thickness of the inner bag 4 at the thin part 20a is t1, and the thickness of the inner preform 14 at the thick part 20b is t2 in a cross section perpendicular to the height direction of the inner preform 14 (a cross section as shown in FIG. 11D), the minimum value of T1/T2 is preferably 0.8 or less. The minimum value of t1/t2 is the minimum value when the position of the cross section is moved along the height direction of the inner preform 14 and t1/t2 is calculated at each height position. The value of t1/t2 is correlated to T1/T2, and T1/T2 can be decreased by decreasing t1/t2. The value of t1/t2 is preferably 0.1 or more. This value is, for example, 0.1 to 0.8, specifically, for example, 0.1, 0.2, 0.3, 0.4, 0.5, 0.6, 0.7, 0.8, and may be in a range between any two of the numerical values exemplified herein.

As shown in FIG. 10, the outer preform 13 has a cylindrical shape with a bottom, and includes a mouth part 13a, a body part 13b, and a bottom part 13c. The bottom part 13c is provided to close the lower end of the body part 13b. An annular convex part 13d and a positioning hole (not shown) are provided in the bottom part 13c.

As shown in FIG. 12, when forming the preform 15, the projecting part 14d is abutted on the open end of the mouth part 13a, and the positioning pin 14c1 is inserted into the positioning hole. Thereby, the inner preform 14 and the outer preform 13 are positioned relative to each other. In this state, the mouth part 14a and the mouth part 13a face each other, and the body part 14b and the body part 13b face each other.

The mouth parts 13a, 14a become the mouth part 15a of the preform 15, the body parts 13b, 14b become the body part 15b of the preform 15, and the bottom parts 13c, 14c become the bottom part 15c of the preform 15. The body part 15b and the bottom part 15c are mainly stretched in biaxial stretch blow molding. However, since the biaxial stretch blow molding is performed in a state where the annular convex part 13d is supported, the annular convex part 13d and its inner region are hardly stretched during the biaxial stretch blow molding. The annular convex part 13d becomes the annular convex part 3b after molding.

As shown in FIGS. 11C and 11D, a concave-convex shape 45a is provided at least one of the outer surface of the inner preform 14 and the inner surface of the outer preform 13, at a portion that become the shoulder part 6b of the container body 2 after biaxial stretch blow molding. The concave-convex shape 45 may be provided at a portion including a portion that become the shoulder part 6b, and is preferably provided at a portion including a portion that become the shoulder part 6b and the bottom part 7. Further, the concave-convex shape 45 is preferably a finer concave-convex shape than the alternating wall thickness shape 20. In this embodiment, the concave-convex shape 45 is configured by the concave-convex shape 44 provided on the outer surface of the inner preform 14. The concave-convex shape 44 is preferably provided in a portion including the mouth part 14a, the body part 13b and the bottom part 13c. The concave-convex shape is not provided on the inner surface of the outer preform 13, but the concave-convex shape may be provided on the inner surface of the outer preform 13 as well.

The concave-convex shape 45 is preferably formed by transferring the concave-convex shape formed in the mold to the inner preform 14 or the outer preform 13. The inverted shape of the concave-convex shape of the mold becomes the concave-convex shape transferred to the inner preform 14 or the outer preform 13. The inner preform 14 or the outer preform 13 is preferably formed by injection molding. This is because, in this case, the concave-convex shape of the mold is easily transferred to the inner preform 14 or the outer preform 13 with high accuracy. The concave-convex shape of the mold is preferably formed by blasting. As a result, fine concave-convex shape can be formed in the mold. The concave-convex shape 45 may be formed by directly processing (for example, blasting) the surface of the inner preform 14 or the outer preform 13.

<Concave-Convex Engagement at Mouth Part 15a of Inner Preform 14 and Outer Preform 13>

By the way, when the preform 15 is heated for biaxial stretch blow molding, the inner surface side of the preform 15 (that is, the inner surface side of the inner preform 14) is usually supported. As a method for transporting the preform 15, there are upright transport with the bottom part 15c facing downward and inverted transport with the bottom part 15c facing upward. The upright transport is common and preferred. On the other hand, there is a possibility that such a problem that when the preform 15 is transported by the upright transport, the outer preform 13 come off the inner preform 14 and fall off may occur. When the outer preform 13 and the inner preform 14 are tightly fitted in the mouth part 15a, it is possible to prevent the outer preform 13 from coming off. However, in this case, a new problem that the inner bag 4 is difficult to separate from the outer shell 3 in the container body 2 obtained by molding occurs.

Therefore, the inner preform 14 and outer preform 13 are in concave-convex engagement at the mouth part 15a in order to prevent the outer preform 13 from falling and allow the inner bag 4 to be easily pulled out of the outer shell 3 after use in this embodiment.

In this embodiment, as shown in FIG. 12, the concave-convex engagement is engagement between a convex part 14f provided on the outer peripheral surface of the mouth part 14a of the inner preform 14 and a concave part 13f provided on the inner peripheral surface of the mouth part 13a of the outer preform 13. The convex part 14f and the concave part 13f become the convex part 4f and the concave part 3f, respectively. A tapered surface 14f1 that becomes the tapered surface 4f1 is provided in the convex part 14f. Therefore, the description of the convex part 14f and the concave part 13f also applies to the convex part 4f and the concave part 3f unless it contradicts the gist of the description, the description of the convex part 4f and the concave part 3f also applies to the convex part 14f and the concave part 13f unless it contradicts the gist of the description.

As shown in FIG. 12, when inserting the inner preform 14 into the outer preform 13, the convex part 14f is inserted into the outer preform 13 while expanding the open edge of the outer preform 13, and is engaged with the concave part 13f. A tapered surface 14f2 is provided on the lower side of the convex part 14f (the side facing the outer preform 13) in order to reduce resistance during such engagement. On the other hand, the tapered surface is not provided on the upper side of the convex part 14f. Therefore, after the convex part 14f is engaged with the concave part 13f, the engagement is difficult to be released.

Instead of providing the tapered surface 14f2, or in addition to providing the tapered surface 14f1, a tapered surface may be provided on the open edge of the outer preform 13 so that the resistance when engaging the convex part 14f with the concave part 13f is reduced. Furthermore, the concave-convex engagement may be engagement between the concave part provided on the outer peripheral surface of the inner preform 14 and the convex part provided on the inner peripheral surface of the outer preform 13. Further, although the concave part 13f is configured by a through hole penetrating the outer preform 13, the concave part 13f does not need to penetrate the outer preform 13 as long as it can be engaged with the convex part 14f.

<Material and Manufacturing Method of Inner Preform 14 and Outer Preform 13>

The inner preform 14 and the outer preform 13 can be formed by direct blow molding or injection molding of thermoplastic resin such as polyester (for example, PET) or polyolefin (for example, polypropylene, polyethylene). It is preferable that the inner preform is configured by a material having a higher mold shrinkage rate than the outer preform. In this case, a gap is formed between the outer shell 3 and the inner bag 4 due to mold shrinkage, and outside air can be easily introduced into the intermediate space between the outer shell 3 and the inner bag 4.

In one example, the inner preform 14 is made of polyolefin (for example, polypropylene) and the outer preform 13 is made of PET. Since polyolefin has a higher mold shrinkage rate than PET, a gap is likely to be formed between the outer shell 3 and the inner bag 4 by using such a resin composition. In addition, by making the inner preform 14 and the outer preform 13 of different materials, welding to each other during blow molding is suppressed.

The laser marking agent is preferably blended into the material configuring the inner preform 14. In this case, the laser marking agent is also blended into the inner bag 4 formed by molding the inner preform 14.

Further, when the mouth part 14a of the inner preform 14 is made of polyolefin and the mouth part 13a of the outer preform 13 is made of amorphous PET, in the biaxial stretch blow molding, the mouth part 13a is heated to promote crystallization of the amorphous PET, thereby reducing the size of the mouth part 13a. On the other hand, the mouth part 14a is also heated, but since polyolefin is a crystalline resin and is already crystallized to some extent before biaxial stretch blow molding, the dimensional change upon heating for biaxial stretch blow molding is less than amorphous PET. For this reason, the shrinkage of the mouth part 13a becomes more pronounced than the shrinkage of the mouth part 14a, and a gap is formed between the projecting part 14d of the inner preform 14 and the open end of the outer preform 13, and there may be a problem in sandwiching the preform 15 between the pair of split molds. Further, regarding the container body 2 obtained after molding, a gap may be formed between the projecting part 4c of the inner bag 4 shown in FIG. 4A and the open end 3a of the outer shell 3, which may deteriorate the appearance. However, in this embodiment, since the inner preform 14 and the outer preform 13 are in concave-convex engagement in the mouth part 15a, the inner bag 4 and the outer shell 3 are also engaged with each other in the mouth part 5, and the occurrence of the gap is suppressed.

The inner preform 14 is preferably formed by direct blow molding. According to direct blow molding (blow molding using a tubular parison in a molten state), the inner preform 14 of the laminated structure can be easily formed. The outer preform 13 is preferably formed by injection molding. The preform 15 may be formed by forming the inner preform 14 and the outer preform 13 separately and then combining them, or may be formed by two-color molding.

After the preform 15 is biaxially stretched and blow-molded, the container body 2 shown in FIG. 1 can be obtained by forming the outside air introduction hole 16 in the outer shell 3.

Next, information transmission indications 22 and 23 are printed on the container body 2 using a laser marker. After that, after filling the contents in the inner bag 4, the double container 1 can be obtained by attaching the mouth part attachment member 8 to the mouth part 5.

2. Other Embodiments

In the above-described embodiment, the outside air introduction hole 16 is formed after the biaxial stretch blow molding is performed, but a through hole serving as the air introduction hole may be formed in the outer preform 13 in advance.

The outside air introduction hole 16 may be formed in the bottom part of the outer shell 3.

From another point of view, the present invention can be understood as an invention whose object is to provide a double container 1 including an inner bag 4 that is likely to be reduced in diameter by twisting. From this point of view, since the configuration for twisting the inner bag 4 is not particularly limited, the inner bag 4 may not be configured to rotate with the rotation of the mouth part attachment member 8. In this case, for example, the inner bag 4 may be rotated by pinching the inner bag 4 with fingers. Therefore, a cap or a pump that does not have a structure that engages with the inner bag 4 may be used as the mouth part attachment member 8. Further, the container body 2 may not have the projecting part 4c. For example, instead of the projecting part 4c, a flange is provided at the open end of the inner bag 4, and this flange is abutted on the open end of the outer shell 3. Thereby, it is possible to prevent the inner bag 4 from falling out in the outer shell 3.

In the above embodiment, the alternating wall thickness shapes 10 and 20 are realized by forming the recessed stripes 11 and 21. However, the alternating wall thickness shapes 10 and 20 may be formed by forming projecting stripe on one or both of the inner and outer surfaces of the inner bag 4 or the inner preform 14 to form thick part. Even in this case, since the thin part is selectively bent as the inner bag 4 is twisted, the bottom part 7 is easily deformed into a bellows shape and reduced in diameter.

The container body 2 may be formed by a method other than biaxial stretch blow molding, for example, the container body 2 can be formed by direct blow molding that molds a laminated parison in a molten state.

3. Matters Specific to Each Perspective

Third Perspective (1) Second Embodiment

A second embodiment of the present invention will be described using FIG. 14. This embodiment is similar to the first embodiment, and the differences will be mainly described below.

In this embodiment, as shown in FIG. 14, the concave part 3f is formed by a groove 3f1. The groove 3f1 extends between an end part 3f2 on the open end 3a side of the outer shell 3 and an end part 3f3 on the inside of the outer shell 3. The convex part 4f shown in FIG. 2C is arranged in the groove 3f1, and by moving the convex part 4f toward the end part 3f2 along the groove 3f1, the concave-convex engagement between the convex part 4f and the concave part 3f can be released. With such a configuration, the second resistance becomes very small. Further, when the convex part 4f reaches the end part 3f2, the convex part 4f cannot be moved further toward the inside of the outer shell 3 along the groove 3f1, so the first resistance becomes very large.

The inclination angle of the groove 3f1 preferably matches the inclination angle of the thread of the male threaded part 5a1. In this case, when rotating the mouth part attachment member 8 and the inner bag 4 together in the loosening direction, the convex part 4f can be smoothly moved along the groove 3f1.

The concave part 3f formed by the groove 3f1 can be obtained by configuring the concave part 13f of the outer preform 13 by a groove. In this case, by moving the convex part 14f of the inner preform 14 along the groove, the convex part 14f and the concave part 13f can be engaged with each other, so that the resistance at the time of the concave-convex engagement is greatly reduced. When the groove of the outer preform 13 extends in the direction where the central axis of the mouth part 13a of the outer preform 13 extends, the outer preform 13 is likely to fall off the inner preform 14. Therefore, it is preferable that the groove forming the concave part 13f extends in a direction inclined with respect to the central axis of the mouth part 13a of the outer preform 13.

Here, the case where the outer shell 3 or outer preform 13 has a concave part is used as an example. However, even if the inner bag 4 or inner preform 14 has a concave part, it is possible to use this concave part as a groove and achieve the same effect as above.

(2) Invention from Different Perspective

The following inventions are extracted from the perspective of preventing the outer preform 13 from falling out even if the preform 15 is transported upright during the biaxial stretch-blow molding process, and from the perspective of preventing a gap from occurring between the projecting part 14d of the inner preform 14 and the outer preform 13.

A method of manufacturing a double container comprising biaxial stretch blow molding step, wherein
    in the biaxial stretch blow molding step, a container body is formed by heating a preform configured by covering an inner preform with an outer preform and performing biaxial stretch blow molding, and
    the inner preform and the outer preform are in concave-convex engagement in the mouth part of the preform.

In the container body 2 obtained by the method of this perspective, it is not essential that the first resistance to rotation of the inner bag 4 relative to the outer shell 3 in one direction at the mouth part 5 is greater than the second resistance to rotation in the other direction.

Example of Fifth Perspective

1. Manufacture of Container Body 2

According to the method described above, the container body 2 (inner capacity: 300 mL) shown in FIG. 1 was manufactured by carrying out biaxial stretch blow molding on the preform 15 shown in FIGS. 10 to 13. The inner preform 14 was manufactured by injection molding the composition where 5% by mass of a laser marking agent (antimony-doped tin oxide/mica-containing grade, manufactured by Toyocolor Co., Ltd.) is blended with a propylene-ethylene random copolymer (type: Wintech, manufactured by Nippon Polypro Corporation). The outer preform 13 was manufactured by injection molding PET (type: titanium catalyst grade, manufactured by Teijin Ltd.) at 300° C. into the shape of the outer preform and then rapidly cooling it to 20° C. The molten PET was made amorphous by rapidly cooling.

The container body 2 was obtained by heating the preform 15 to 110° C. (the temperature at the center in the longitudinal direction of the preform 15) and then carrying out biaxial stretch blow molding.

2. Printing of Information Transmission Displays 22 and 23

The information transmission display 22 was printed on the container body 2 using a fiber laser marker (laser light wavelength 1064 nm, model: LM-3200F, manufactured by Brother Industries, Ltd.). The laser light irradiation conditions were an output of 20 W (30%) and a scanning speed of 1500 mm/s.

Next, the information transmission display 23 was printed on the container body 2 using a CO2 laser marker.

3. Evaluation

The information transmission display 22 was clearly printed on the inner bag 4, but not printed on the outer shell 3. On the other hand, the information transmission display 23 was clearly printed on the outer shell 3 but not printed on the inner bag 4.

Example of Sixth Perspective

1. Example 1

According to the method described above, the container body 2 (inner capacity: 300 mL) shown in FIG. 1 was manufactured by carrying out biaxial stretch blow molding on the preform 15 shown in FIGS. 10 to 13. The inner preform 14 was manufactured by injection molding a propylene-ethylene random copolymer (type: Wintech, manufactured by Nippon Polypropylene Corporation). The outer preform 13 was manufactured by injection molding PET (type: titanium catalyst grade, manufactured by Teijin Ltd.) at 300° C. into the shape of the outer preform and then rapidly cooling it to 20° C. The molten PET was made amorphous by rapidly cooling. In the mold forming the inner preform 14, a concave-convex shape was formed by blasting the surface corresponding to the outer surface of the inner preform 14. The blasting was performed using white alumina #80 (WA #80).

The container body 2 was obtained by heating the preform 15 to 110° C. (the temperature at the center in the longitudinal direction of the preform 15) and then carrying out biaxial stretch blow molding.

A test piece (10 mm×75 mm) where the inner bag 4 and the outer shell 3 overlap was cut out from the obtained container body 2, and this test piece was set in a friction coefficient measuring device (model: HEIDON-10, Sintokagaku Co., Ltd.). More specifically, the inner bag 4 was fixed to the lifting plate, and the outer shell 3 was fitted with a flat indenter of 150 g. Next, the lifting plate was tilted and the angle where the outer shell 3 starts to slide relative to the inner bag 4 was measured. The average angle obtained by measuring three samples was 18.8 degrees.

2. Comparative Example 1

As a mold for forming the inner preform 14, except that the surface corresponding to the outer surface of the inner preform 14 was mirror-polished, the angle where the outer shell 3 started to slide relative to the inner bag 4 was measured in the same manner as in Example 1. The outer shell 3 did not slide relative to the inner bag 4 in any of the three samples, even at the instrument's measurement limit of 57.5 degrees.

Fourth Perspective

An embodiment of the fourth perspective of the present invention will be described with reference to FIGS. 15 to 22.
1. Double Container 1 and Preform 15

First, the double container 1 that can be manufactured by the method for manufacturing a double container according to one embodiment of the present invention will be described. As shown in FIG. 15, the double container 1 that can be manufactured by the method of the invention includes the container body 2. The description of the container body 2 is the same as that described in "1. First Embodiment common to First to Third and Fifth to Sixth Perspectives" except for the points described below. The container body 2 preferably includes the outer shell 3 and the inner bag 4, and is configured such that the inner bag 4 shrinks as the contents decrease.

The container body 2 includes the inner bag 4 and the outer shell 3 arranged to cover the inner bag 4. The inner bag 4 is accommodated inside the outer shell 3 except for a portion other than the flange 4*b*. The inner bag 4 is prevented from slipping down into the outer shell 3 by abutting the flange 4*b* against the open end of the outer shell 3.

An outside air introduction hole (not shown) is preferably provided in the outer shell 3. The outside air introduction hole is a through hole penetrating the outer shell 3. The outside air introduction hole allows the inner bag 4 to shrink without shrinking the outer shell 3 by introducing outside air into the intermediate space between the outer shell 3 and inner bag 4 through the outside air introduction hole as the inner bag 4 shrinks. The outside air introduction hole may be provided in any of the mouth part 5, the body part 6 and the bottom part 7.

As shown in FIGS. 16 to 22, in the state of the preform 15 where the inner preform 14 that becomes the inner bag 4 is covered with the outer preform 13 that becomes the outer shell 3 can be formed by heating the inner preform 14 and the outer preform 13 and carrying out biaxial stretch blow molding.

As shown in FIG. 16, the inner preform 14 has a cylindrical shape with a bottom, and includes a mouth part 14*a*, a body part 14*b* and a bottom part 14*c*. A flange 14*a*1 is provided at the open end of the mouth part 14*a*. A positioning pin 14*c*1 is provided on the bottom part 14*c*.

As shown in FIG. 16, the outer preform 13 has a cylindrical shape with a bottom, and includes a mouth part 13*a*, a body part 13*b* and a bottom part 13*c*. A positioning hole 13*c*2 and a through hole 17 are provided in the bottom part 13*c*. As shown in FIG. 17B, an annular convex part 13*c*4 is provided on the outer surface of the bottom part 13*c*. The positioning hole 13*c*2 and the through hole 17 are arranged in a region inside the annular convex part 13*c*4. The outer preform 13 has a size that allows the inner preform 14 to be inserted therein. The through hole 17 serves as an outside air introduction hole of the container body 2.

As shown in FIG. 17, when forming the preform 15, the flange 14*a*1 is abutted on the open end of the mouth part 13*a*, and the positioning pin 14*c*1 is inserted into the positioning hole 13*c*2. Thereby, the inner preform 14 and the outer preform 13 are positioned relative to each other. In this state, the mouth part 14*a* and the mouth part 13*a* face each other, and the body part 14*b* and the body part 13*b* face each other.

The mouth parts 13*a*, 14*a* become the mouth part 15*a* of the preform 15, the body parts 13*b*, 14*b* become the body part 15*b* of the preform 15, and the bottom parts 13*c*, 14*c* become the bottom part 15*c* of the preform 15. Further, as shown in FIG. 19, the body part 15*b* and the bottom part 150 serve as a stretched part 15*d* that is stretched in a molding process to be described later.

The inner preform 14 and the outer preform 13 can be formed by direct blow molding or injection molding of thermoplastic resin, etc.

The inner preform 14 includes a polyolefin layer composed of a polyolefin-based resin containing polyolefin. The polyolefin content in the polyolefin-based resin is, for example, 60 to 100% by mass, specifically, for example, 60, 70, 80, 90, 100% by mass, and may be in a range between any two of the numerical values exemplified herein. Polyolefins include low density polyethylene (LDPE), linear low density polyethylene (LLDPE), high density polyethylene (HDPE), homopolypropylene (PP), propylene copolymers, cyclic polyolefins (COP) and mixtures thereof, etc.

The propylene copolymer is a copolymer between propylene and another monomer, and may be a random copolymer or a block copolymer, preferably a random copolymer. The propylene copolymer can be obtained by copolymerizing a monomer mixture. The content of propylene in the monomer mixture is, for example, 60 to 99.5 mol %, specifically for example 60, 65, 70, 75, 80, 85, 90, 95, 96, 97, 98, 99, 99.5 mol %, and may be in a range between any two of the numerical values exemplified herein. Ethylene is particularly preferred as a monomer to be copolymerized with propylene.

The inner preform 14 may have a single layer configuration or a multi layer configuration. In the case of the single layer configuration, the inner preform 14 includes only the polyolefin layer described above. In the case of a multi layer configuration, the inner preform 14 includes a laminated configuration of the above polyolefin layer and another layer. Another layer includes a gas barrier resin layer and an adhesive resin layer. The adhesive resin layer is used to improve the adhesion between the polyolefin layer and the gas barrier resin layer.

The gas barrier resin layer is a layer composed of a gas-barrier resin. In this specification, the gas barrier resin means a resin having an oxygen permeability of less than 50 cc/($m^2$·24 hours·atm) in an environment of 20° C./65% RH when formed into a film having a thickness of 20 μm. The oxygen permeability is, for example, 0 to 49 cc/($m^2$·24 hours·atm), specifically, for example, 0.01, 0.1, 0.2, 0.5, 1, 2, 5, 10, 15, 20, 25, 30, 35, 40, 45, 49 cc/($m^2$·24 hours·atm), and may be in the range between the two values exemplified herein, or may be equal to or less than any one of the values exemplified herein.

The gas barrier resin may be composed only of a resin with high gas barrier properties such as EVOH or polyamide, or may be a mixed resin of the above resin and another resin.

The adhesive resin layer is a layer made of an adhesive resin. Examples of the adhesive resin include acid modified polyolefin resins (for example, maleic anhydride modified polyethylene, maleic anhydride modified polypropylene), etc.

At the center of the inner preform 14 in the longitudinal direction, the ratio of the thickness of the polyolefin layer to the entire wall thickness of the inner preform 14 is, for example, 50 to 100%, specifically, for example, 50, 55, 60, 65, 70, 75, 80, 85, 90, 95, 100%, and may be in a range between any two of the numerical values exemplified herein.

The outer preform 13 includes an amorphous PET layer composed of an amorphous PET based resin containing amorphous PET. Amorphous PET is solidified without being crystallized by rapid cooling molten PET (polyethylene terephthalate). The PET configuring the outer preform 13 can be made amorphous by molding the outer preform 13 at a temperature (about 270 to 280° C.) higher than the melting peak temperature by injection molding or the like and then rapid cooling. The content of amorphous PET in the amorphous PET resin is, for example, 60 to 100% by mass, specifically, for example, 60, 70, 80, 90, 100% by mass, and may be in a range between any two of the numerical values exemplified herein.

The outer preform 13 may have a single layer configuration or a multi layer configuration. In the case of single layer configuration, the outer preform 13 includes only the amorphous PET layer described above. In the case of a multi layer configuration, the outer preform 13 includes a laminated configuration of the amorphous PET layer and another layer. Another layer includes the gas barrier resin layer and the adhesive resin layer described above.

In the present embodiment, the temperature range between the crystallization peak temperature and the melting peak temperature of the polyolefin resin is the first temperature range and the temperature range between the softening completion temperature and the crystallization start temperature of the amorphous PET resin is the second temperature range, an overlapping temperature range of the first temperature range and the second temperature range is 2° C. or higher.

FIG. 18A shows an example of a graph obtained by performing differential scanning calorimetry (DSC) on a polyolefin resin (graph obtained in Example 1). DSC can be performed according to JIS K 7121:2012. The horizontal axis of this graph indicates the temperature, and the vertical axis indicates the endothermic or exothermic amount. In the first run, the measurement is performed while the temperature of the sample is increased. A polyolefin resin is in a crystalline state at low temperatures, and a melting peak is observed when the temperature rises. The temperature of this melting peak is the "peak melting temperature".

When the melting peak temperature is exceeded, the polyolefin resin becomes a liquid with a very low viscosity. Next, in the second run, the temperature of the liquid polyolefin resin is gradually lowered. At this time, a crystallization peak is observed. The temperature of this crystallization peak is the "crystallization peak temperature". Polyolefin resin tends to be excessively softened at temperatures higher than the melting peak temperature, and tends to be insufficiently softened at temperatures lower than the crystallization peak temperature. Therefore, in the temperature range between the crystallization peak temperature and the melting peak temperature, the polyolefin resin is in a softened state suitable for molding. This temperature range is the first temperature range.

The crystallization peak temperature of the polyolefin resin is, for example, 80 to 117° C., preferably 90 to 110° C. Specifically, this temperature is, for example, 80, 85, 90, 95, 100, 105, 110, 115, 116, 117° C., and may be in a range between any two of the numerical values exemplified herein. The melting peak temperature of the polyolefin resin is, for example, 90 to 145° C., preferably 115 to 135° C. Specifically, this temperature is, for example, 90, 100, 110, 115, 120, 125, 130, 135, 140, 145° C., and may be in a range between any two of the numerical values exemplified herein. The first temperature range is, for example, 5 to 50° C., specifically, for example, 5, 10, 15, 20, 25, 30, 35, 40, 45, and 50° C., and may be in a range between any two of the numerical values exemplified herein.

The crystallization peak temperature and melting peak temperature of the polyolefin resin can be adjusted by changing the composition of the polyolefin resin. For example, a propylene-ethylene random copolymer has a lower crystallization peak temperature and a lower melting peak temperature than homopolypropylene. Therefore, the crystallization peak temperature and the melting peak temperature can be lowered by increasing the content of the propylene-ethylene random copolymer contained in the polyolefin resin.

When the polyolefin-based resin is a mixture of a plurality of polyolefins, the crystallization peak temperature and melting peak temperature of the polyolefin-based resin are values reflecting the crystallization peak temperature and the melting peak temperature of each of a plurality of polyolefins. So, for example, when the polyolefin resin contains a polyolefin having a low crystallization peak temperature and a low melting peak temperature, such as LLDPE and LDPE, and homopolypropylene, the crystallization peak temperature and melting peak temperature are lower than those of homopolypropylene.

FIG. 18B shows an example of a graph obtained by performing DSC on an amorphous PET-based resin (graph obtained in Example 1). The DSC and graph descriptions are the same as in FIG. 18A.

Amorphous PET resins are in an amorphous state at low temperatures, and when the temperature rises, a softening start point, a softening completion point, a crystallization start point, and a crystallization peak appear in this order. The temperatures where the softening start point, the softening completion point, the crystallization start point and the crystallization peak appear are "softening start temperature", "softening completion temperature", "crystallization start temperature", and "crystallization peak temperature", respectively.

The softening starting point appears at a temperature corresponding to the glass transition temperature (Tg), and the amount of heat absorbed increases beyond the softening starting point (the negative slope of the DSC curve increases). The softening completion point appears at the temperature where the amount of heat absorbed stops increasing (that is, the temperature where the slope of the DSC curve changes from negative to zero). The amorphous PET resin is gradually softened between the softening start point and the softening completion point. At the softening completion temperature, the amorphous PET resin is in a sufficiently softened state.

When the amorphous PET-based resin is further heated, the crystallization starting point and the crystallization peak appear. The crystallization starting point appears at the temperature where the amorphous PET resin starts to crystallize, and the slope of the DSC curve increases from the crystallization starting point. The crystallization peak appears at a temperature where crystallization of the amorphous PET-based resin is completed. When the temperature is higher than the crystallization start temperature, the amorphous PET-based resin tends to lose its flexibility due to the increase in crystallinity, resulting in insufficient softening of the amorphous PET-based resin. Therefore, in the temperature range between the softening completion temperature and the crystallization start temperature, the amorphous PET resin is in a softened state suitable for molding. This temperature range is the second temperature range.

The softening completion temperature of the amorphous PET resin is, for example, 70 to 90° C., preferably 75 to 85° C. Specifically, this temperature is, for example, 70, 75, 80, 85, 90° C., and may be in a range between any two of the numerical values exemplified herein. The crystallization start temperature of the amorphous PET resin is, for example, 110 to 130° C., preferably 115 to 125° C. Specifically, this temperature is, for example, 110, 115, 120, 125, 130° C., and may be in a range between any two of the numerical values exemplified herein. The second temperature range is, for example, 30 to 50° C., preferably 35 to 45° C. Specifically, the second temperature range is, for example, 30, 35, 40, 45, and 50° C., and may be in a range between any two of the numerical values exemplified herein.

In the reference example, the polyolefin-based resin is composed of homopolypropylene, and the amorphous PET-based resin is composed of amorphous PET. In one example, homopolypropylene has a crystallization peak temperature of about 119° C. and a melting peak temperature of about 149° C., so the first temperature range is 119 to 149° C. In one example, amorphous PET has a softening completion temperature of about 81° C. and a crystallization start temperature of about 120° C., so the second temperature range is 81 to 120° C. The overlapping temperature range of the first temperature range and the second temperature range is approximately 1° C.

Within the overlapping temperature range, both the polyolefin-based resin and the amorphous PET-based resin are in a softened state suitable for molding, so it is desirable to carry out molding within the overlapping temperature range. However, homopolypropylene and amorphous PET have a very narrow overlapping temperature range of about 1° C., so molding at a temperature suitable for both is not easy.

The reason why the overlapping temperature range is narrow is that the first temperature range exists on the higher temperature side than the second temperature range, the overlapping temperature range can be widened by shifting the first temperature range to the lower temperature side. As described above, the propylene-ethylene random copolymer has a lower crystallization peak temperature and a lower melting peak temperature than homopolypropylene. Therefore, by including the propylene-ethylene random copolymer in the polyolefin-based resin, the first temperature range can be shifted to the lower temperature side, and the overlapping temperature range can be widened. Also, the first temperature range may be shifted to the lower temperature side by adding a polyolefin such as LLDPE or LDPE having a low crystallization peak temperature and a low melting peak temperature.

In the preform 15 of this embodiment, the polyolefin-based resin is selected so that the overlapping temperature range is 2° C. or higher (preferably 10° C.). For this reason, compared to the above-described reference example, it is easier to mold at a molding temperature where both the polyolefin-based resin and the amorphous PET resin are in a softened state suitable for molding. As a result, it is possible to suppress the shrinkage of the inner bag 4 during cooling after molding.

The overlapping temperature range is, for example, 2 to 40° C., preferably 4 to 40° C. Specifically, this overlapping temperature range is, for example, 2, 4, 5, 10, 15, 20, 25, 30, 35, 40° C., and may be in a range between any two of the numerical values exemplified herein, or may be equal to or more than any one of the values exemplified herein.

2. Manufacturing Apparatus 40

Next, a manufacturing apparatus 40 that can be used in the method for manufacturing the double container 1 according to one embodiment of the present invention will be described.

As shown in FIGS. 19 to 22, the manufacturing apparatus 40 includes a mold unit 50 and a plurality of heaters 61.

The plurality of heaters 61 are arranged to line up along the longitudinal direction of the preform 15 at a position adjacent to the side surfaces of the preform 15 when the preform 15 is close to the heater 61. The outputs of the plurality of heaters 61 can be controlled independently of each other. Each heater 61 preferably has a bar shape extending in the direction perpendicular to the paper surface of FIG. 19.

The mold unit 50 includes a mouth part support mold 51, a bottom part support mold 52 and forming dies 53 and 54.

The mouth part support mold 51 is configured to be capable of supporting the mouth part 13a of the outer preform 13. An insertion hole 51a is provided in the mouth part support mold 51, and the support rod 25 is inserted through the insertion hole 51a. The support rod 25 can be extended and contracted by a driving mechanism (not shown).

The mouth part support mold 51 is configured to be movable between a position A close to the heater 61 as shown in FIG. 19 and a position B between the forming dies 53 and 54 as shown in FIG. 20. Therefore, it is possible to perform the molding process of molding the preform 15 at the position B after performing the heating process of heating the preform 15 at the position A. The mouth part support mold 51 is capable of rotating the preform 15 around the central axis of the mouth part 13a. By bringing the preform 15 close to the heater 61 while rotating the preform 15, it is possible to uniformly heat the entire circumference of the preform 15. It is noted that the heater 61 may be moved instead of moving the mouth part support mold 51.

The bottom part support mold 52 is configured to be movable in the longitudinal stretch direction (vertical direction in FIGS. 20 to 22) by being driven by a drive mechanism 52c. Molds 53 and 54 can be opened and closed, and have cavity surfaces 53a and 54a, respectively. A cavity having a shape corresponding to the outer shape of the container body 2 is formed by combining the cavity surfaces 53a and 54a.

3. Method for Manufacturing Double Container 1

The manufacturing method of the double container 1 of one embodiment of the present invention includes a heating process and a molding process. The molding process includes a bottom part supporting process, a stretching process and a blow molding process.

<Heating Process>

In the heating process, the preform 15 is heated and softened into a softened state. The heating process can be performed by heating the preform 15 with the plurality of heaters 61 while rotating the preform 15.

In one example, the preform 15 can be heated by bringing the preform 15 close to the heater 61 while the preform 15 is attached to the mouth part support mold 51 as shown in FIG. 19. Since the mouth part 15a of the preform 15 is covered with the mouth part support mold 51, the body part 15b and the bottom part 15c (that is, the stretched part 15d) are heated. It is noted that the tip of the support rod 25 may be abut on the inner bottom surface of the inner preform 14 before the heating process. This suppresses shaking of the softened preform 15.

The heating temperature of the preform 15 is preferably within the above-described overlapping temperature range. As a result, both the outer preform 13 and the inner preform 14 can be brought into a softened state suitable for molding.

<Bottom Part Supporting Process>

In the bottom supporting process, as shown in FIGS. 20 to 21, the bottom part support mold 52 moves toward the bottom part 13c of the outer preform 13 and the bottom part support mold 52 supports the bottom part 13c of the outer preform 13. A concave part 52a capable of accommodating the annular convex 13c4 is provided in the bottom part support mold 52, and the bottom part support mold 52 preferably supports the bottom part 13c so that the annular convex 13c4 is accommodated within the concave part 52a. As a result, the annular convex 13c4 and its inner region are prevented from being stretched during the blow molding process. The concave part 52a preferably has an annular shape. Also, the bottom part support mold 52 preferably has a concave part 52b capable of accommodating the positioning pin 14c1, and supports the bottom part 13c so as to accommodate the positioning pin 14c1 in the concave part 52b. This prevents the positioning pin 14c1 from interfering with the bottom part support mold 52. Although FIG. 21 shows a state where the forming dies 53 and 54 are closed, since the forming dies 53 and 54 may be closed at any time before the blow molding process, they may be closed after the longitudinal stretching process.

<Longitudinal Stretching Process>

In the longitudinal stretching process, as shown in FIGS. 21 to 22, the preform 15 is stretched in the longitudinal direction (vertical direction in FIG. 22) by pressing the support rod 25 against the inner bottom surface of the inner preform 14 and stretching it. At this time, it is preferable to retract the bottom part support mold 52 in synchronism with the extension of the support rod 25. Thereby, the preform 15 can be stretched stably. It is noted that since the longitudinal stretching process can be performed in a state where the bottom part 13c is not supported by the bottom part support mold 52, the bottom supporting process may be performed after the longitudinal stretching process. Further, the support rod may be easily fixed to the inner preform 14 by providing the concave part where the support rod are fitted on the inner bottom surface of the inner preform 14.

<Blow Molding Process>

In the blow molding process, air is blown into the inner preform 14 from the state shown in FIG. 22 to extend (that is, expand) the preform 15 in the lateral direction and shape it into the shape of the cavity surfaces 53a and 54a. Air can be blown through an air passage 26 between the mouth part support mold 51 and the support rod 25. For example, air may be blown out from the side surface of the support rod 25 by providing the air passage in the support rod 25.

In the present embodiment, the air is blown in a state where the bottom part 13c of the outer preform 13 is supported by the bottom part support mold 52, so the extension of the bottom part 13c of the outer preform 13 is suppressed.

It is noted that the blow molding process can also be performed simultaneously with the longitudinal stretching process. That is, air may be blown into the inner preform 14 while stretching the preform 15 in the longitudinal direction. Alternatively, the longitudinal stretching process may be omitted, and air may be blown without longitudinally stretching the preform 15 after the bottom part supporting process.

By blow molding, the preform 15 is expanded to obtain the container body 2 shown in FIG. 15. The mouth parts 13a, 14a serve as the mouth part 5, the body parts 13b, 14b serve as the body part 6, and the bottom parts 13c, 14c serve as the bottom part 7. During blow molding, the mouth parts 13a, 14a, the annular convex part 13c4, and the region inside thereof are hardly deformed, and the other parts are mainly deformed. The flange 14a1 serves as the flange 4b that covers the open end of the mouth part 5 of the container body 2, as shown in FIG. 15A.

Example of Fourth Perspective

Reference Example 1

According to the method described above, the container body 2 (inner capacity: 300 mL) shown in FIG. 15 was manufactured by carrying out biaxial stretch blow molding on the preform 15 shown in FIGS. 16 to 17 using the manufacturing apparatus 40 shown in FIGS. 19 to 22. The inner preform 14 was manufactured by injection molding a propylene-ethylene random copolymer (type: Wintech, manufactured by Nippon Polypropylene Corporation). The outer preform 13 was manufactured by injection molding PET (type: titanium catalyst grade, manufactured by Teijin Ltd.) at 300° C. into the shape of the outer preform and then rapidly cooling it to 20° C. The molten PET was made amorphous by rapidly cooling.

The first temperature range was 119 to 149° C., since the homopolypropylene has a peak crystallization temperature of about 119° C. and a peak melting temperature of about 149° C. Since amorphous PET has a softening completion temperature of about 81° C. and a crystallization start temperature of about 120° C., the second temperature range is 81 to 120° C. The overlapping temperature range of the first temperature range and the second temperature range was about 1° C.

The container body 2 was obtained by heating the preform 15 to 110° C. (the temperature at the center in the longitudinal direction of the preform 15) and then carrying out biaxial stretch blow molding.

After cooling the container body 2 to room temperature, the state of the inner bag 4 was checked at the bottom part of the container body 2, and it was found that there was a gap of about 2 mm between the inner bag 4 and the outer shell 3 due to shrinkage of the inner bag 4.

Example 1

A container body 2 was manufactured in the same method as in reference example 1, except that the material of the inner preform 14 was changed.

In Example 1, the inner preform 14 was manufactured by injection molding a propylene-ethylene random copolymer (type: Wintech, manufactured by Japan Polypropylene Corporation). The first temperature range was 100 to 125° C., since the propylene-ethylene random copolymer has a crystallization peak temperature of about 100° C. and a melting peak temperature of about 125° C. The overlapping temperature range where the first temperature range and the second temperature range overlap was 20° C.

The container body 2 was obtained by heating the preform 15 to 110° C. (the temperature at the center in the longitudinal direction of the preform 15) and then carrying out biaxial stretch blow molding.

After cooling the container body 2 to room temperature, the state of the inner bag 4 was checked at the bottom part of the container body 2, and it was found that there was a gap of 1 mm or less between the inner bag 4 and the outer shell 3 due to shrinkage of the inner bag 4. This result indicates that in example 1, compared with reference example 1, shrinkage of the inner bag 4 during cooling after molding was suppressed.

Seventh Perspective

An embodiment of the seventh perspective of the present invention will be described with reference to FIGS. 23 to 27.
1. Configuration of Double Container 1
<Basic Configuration>

Figure 25:
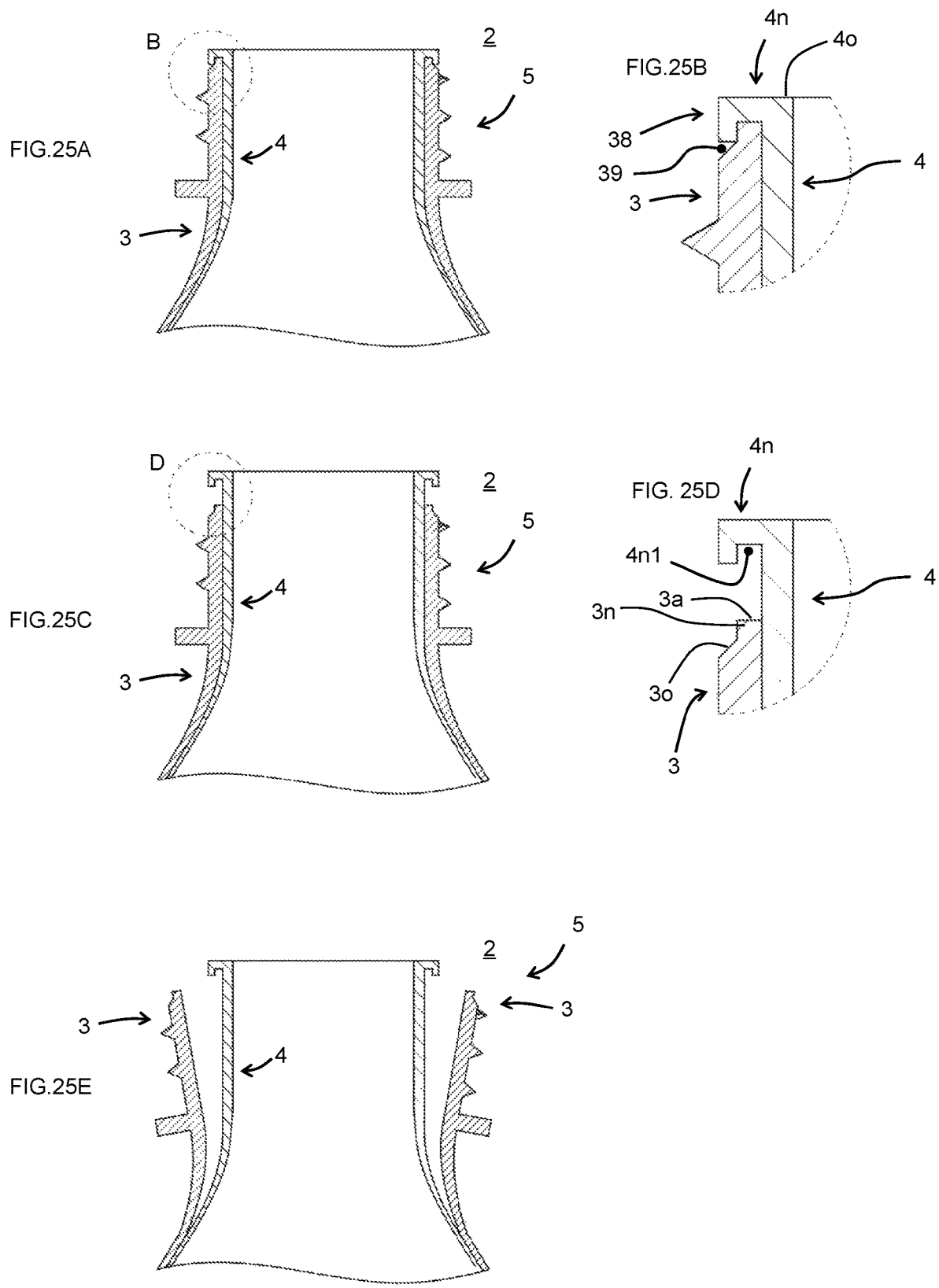

As shown in FIGS. 23 to 25, the double container 1 of one embodiment of the present invention includes the container body 2. The description of the container body 2 is the same as that described in "1. First Embodiment common to First to Third and Fifth to Sixth Perspectives" except for the points described below.

The inner bag 4 of the container body 2 is accommodated inside the outer shell 3 except for the flange 4n. For other points, the description of the basic configuration of the container body 2 is the same as that described in "1. First Embodiment common to First to Third and Fifth to Sixth Perspectives."
<Easily Diameter Expandable Part 36>

The easily diameter expandable part 36 that facilitates the diameter expansion of the mouth part 5 of the outer shell 3 when the inner bag 4 is pulled out from the outer shell 3 in the mouth part 5 of the outer shell 3. The easily diameter expandable part 36 is a portion that facilitates the diameter expansion of the mouth part 5 of the outer shell 3. In the present embodiment, the easily diameter expandable part 36 is configured by the slit 37 provided in the mouth part 5 of the outer shell 3, but may be configured differently. Examples of the easily diameter expandable part 36 include (a) a configuration where the slit 37 is filled with a filling material, (b) an elongated weakened part, and (c) an elongated thin part. As the filling material of (a), a material having a lower strength than that of the mouth part 5 of the outer shell 3 can be used. In the case of the configurations shown in (a) to (c), when a radial force is applied to the mouth part 5 of the outer shell 3, the easily diameter expandable part 36 is broken or stretched, and the mouth part 5 of the outer shell 3 is expanded.

It is preferable that the easily diameter expandable parts 36 are provided at a plurality of locations (four locations in the present embodiment) spaced apart in the circumferential direction in the mouth part 5 of the outer shell 3. It is preferable that the plurality of easily diameter expandable parts 36 are arranged at regular intervals in the circumferential direction. The number of easily diameter expandable part 36 is, for example, 1 to 8, preferably 2 to 6, specifically, for example, 1, 2, 3, 4, 5, 6, 7, 8, and may be in a range between any two of the numerical values exemplified herein. The width of the slit 37 is, for example, 0 to 1 mm, specifically, for example, 0.0, 0.1, 0.2, 0.3, 0.4, 0.5, 0.6, 0.7, 0.8, 0.9, 1.0 mm, and may be in a range between any two of the numerical values exemplified herein. When the slit 37 has a width of 0 mm, the slit 37 is configured by a cut formed in the outer shell 3. By providing the easily diameter expandable part 36, the diameter of the mouth part 5 of the outer shell 3 is easily expanded when the inner bag 4 is pulled out from the outer shell 3, and the force required to pull out the inner bag 4 is reduced.

It is preferable that the easily diameter expandable part 36 is provided so as to extend over the mouth part 5 and the shoulder part 6b of the outer shell 3. This is because the mouth part 5 of the outer shell 3 is easily expanded in diameter in this case.

By the way, when the mouth part 5 of the outer shell 3 is expanded in diameter before the contents of the double container 1 are used up, the usability and appearance of the double container 1 may deteriorate. Therefore, as shown in FIGS. 25A to 25B, a diameter expansion suppressing part 38 that suppresses the diameter expansion of the mouth part 5 of the outer shell 3 before starting to pull out the inner bag 4 is provided in the double container 1. The configuration of the diameter expansion suppressing part 38 is not particularly limited as long as it suppresses the diameter expansion of the mouth part 5 of the outer shell 3. In this embodiment, the diameter expansion suppressing part 38 is configured by engaging the flange 4n of the inner bag 4 with the open end 3a of the outer shell 3.

The flange 4n is a portion extending radially outward at the open end 40 of the inner bag 4, and is preferably formed in an annular shape. The flange 4n abuts on the open end 3a. An annular groove 4n1 is preferably provided on the lower side of the flange 4n, and an insertion part 3n formed by thinning the outer shell 3 is provided at the open end 3a of the outer shell 3. The flange 4n of the inner bag 4 is engaged with the open end 3a of the outer shell 3 by inserting the insertion part 3n into the groove 4n1.

When pulling out the inner bag 4, first, as shown in FIGS. 25C to 25D, the inner bag 4 is slightly lifted to remove the insertion part 3n from the groove 4n1. As a result, the engagement between the flange 4n and the open end 3a is released, and the diameter of the mouth part 5 of the outer shell 3 can be expanded. The distance where the inner bag 4 is lifted is, for example, 0.1 to 3 mm, specifically, for example, 0.1, 0.3, 0.5, 1.0, 1.5, 2.0, 2.5, 3.0 mm, and may be in a range between any two of the numerical values exemplified herein. A configuration for lifting the inner bag 4 is not particularly limited. The inner bag 4 may be lifted by manually lifting the flange 4n, by lifting a pull tab attached to the flange 4n, or by using a mouth part attachment member such as a pump or cap. A tapered surface 30 is provided at a position adjacent to the insertion part 3n, and a gap 39 is formed between the tapered surface 30 and the lower surface of the flange 4n. It is easy to lift the inner bag 4 by hooking a finger on the flange 4n in the gap 39.

When lifting the inner bag 4 using the mouth part attachment member, for example, a screw type part mouth part attachment member is screwed into the engaging part 5a and engaged with the inner bag 4, and in that state, the inner bag 4 can be lifted by rotating the mouth part attachment member in the direction of removing it from the engaging part 5a. In this case, since the diameter of the inner bag 4 is reduced by twisting, it becomes easier to pull out the inner bag 4.

Next, as shown in FIG. 25E, the mouth part 5 of the outer shell 3 is expanded in diameter, and the outer shell 3 is pulled out from the inner bag 4. The mouth part 5 of the outer shell 3 may be expanded in diameter by applying a radially outward force due to the inner bag 4 against the mouth part 5 of the outer shell 3 when the inner bag 4 is pulled out or by using another jig, etc.

By the way, when the inner bag 4 shrinks as the contents of the inner bag 4 are discharged, outside air is preferably introduced into the intermediate space between the outer shell 3 and the inner bag 4 in order to prevent the outer shell 3 from shrinking. When the easily diameter expandable part 36 is configured to have air permeability like the slit 37, outside air can be introduced into the intermediate space through the easily diameter expandable part 36. When the easily diameter expandable part 36 is configured not to have air permeability, it is preferable to provide an outside air introduction hole for introducing outside air into the intermediate space between the outer shell 3 and the inner bag 4. The outside air introduction hole can be provided, for example, in the body part or the bottom part.

2. Method for Manufacturing Double Container 1

As shown in FIGS. 26 to 27, the container body 2 can be manufactured using the same method as described in "1. First Embodiment common to First to Third and Fifth to Sixth Perspectives" except for the following points.

<Configuration of Inner Preform 14, Outer Preform 13 and Preform 15>

As shown in FIG. 26, a flange 14i is provided at the open end of the mouth part 14a of the inner preform 14. The flange 14i becomes the flange 4n in its original shape without deformation during molding. Accordingly, what is said about flange 4n also applies to flange 14i.

As shown in FIG. 26, a positioning hole 13k (shown in FIG. 27B) is provided in the bottom part 13c of the outer preform 13. A slit 13g is provided in the outer preform 13 so as to extend over the mouth part 13a and the body part 13b. The slit 13g becomes the slit 37 after molding.

As shown in FIG. 27, when forming the preform 15, the flange 14i is abutted on the open end of the mouth part 13a, and the positioning pin 14c1 is inserted into the positioning hole. Thereby, the inner preform 14 and the outer preform 13 are positioned relative to each other. In this state, the mouth part 14a and the mouth part 13a face each other, and the body part 14b and the body part 13b face each other. As shown in FIG. 27B, the flange 14i is engaged with the open end 13j of the outer preform 13. This prevents the mouth part 13a of the outer preform 13 from expanding in diameter during molding.

Eighth Perspective

An embodiment of the eighth perspective of the present invention will be described with reference to FIGS. 28 to 38.

1. First Embodiment 1-1. Configuration of Double Container 1
<Basic Configuration>

As shown in FIG. 28, the double container 1 of the first embodiment of the present invention includes a container body 2 and a mouth part attachment member 8. The description of the container body 2 and the mouth part attachment member 8 is the same as described in "1. First Embodiment common to First to Third and Fifth to Sixth Perspectives", except for the points described below.

As shown in FIG. 30A, the inner diameter D2 of the mouth part 5 of the outer shell 3 is, for example, 20 to 50 mm, preferably 25 to 40 mm. The outer diameter D4 of the mouth part 5 of the outer shell 3 is, for example, 25 to 55 mm, preferably 30 to 45 mm. Specifically, the inner diameter D2 is, for example, 20, 25, 30, 35, 40, 45, 50 mm, and the outer diameter D4 is specifically, for example, 25, 30, 35, 40, 45, 50, 55 mm and each may be in a range between any two of the numerical values exemplified herein. The length of the mouth part 5 is, for example, 15 to 35 mm, specifically, for example, 15, 20, 25, 30, 35 mm, and may be in a range between any two of the numerical values exemplified herein.

As shown in FIG. 30A, the body part 6 includes a curved part of that curves to bulge outward. The curved part 6f is provided at or near the boundary between the shoulder part 6b and the body part body 6c. When the diameter of the container body 2 at the portion 6f1 where the radius of curvature of the curved part 6f is the smallest is D, and the radius of curvature at the portion 6f1 is R, R/D is preferably 0.5 or more. (0.73 in this embodiment). The larger this value is, the larger the radius of curvature R with respect to the diameter D is, and the curved part of is gently curved. Therefore, the pressing of the inner bag 4 against the outer shell 3 in the vicinity of the curved part 6f is suppressed, and the force required to pull out the inner bag 4 is reduced. R/D is, for example, 0.5 to 2, specifically, for example, 0.5, 0.6, 0.7, 0.8, 0.9, 1.0, 1.1, 1.2, 1.3, 1.4, 1.5, 1.6, 1.7, 1.8, 1.9, 2.0, and may be in the range between the two values exemplified herein, or may be equal to or more than any one of the values exemplified herein.

Also, D/D2 is preferably 1.8 or less (1.4 in this embodiment). The smaller this value, the easier it is for the curved part 6f to pass through the mouth part 5, so the force required to pull out the inner bag 4 is reduced. D/D2 is, for example, 1.1 to 1.8, specifically, for example, 1.1, 1.2, 1.3, 1.4, 1.5, 1.6, 1.7, 1.8, and may be in a range between any two of the numerical values exemplified herein.

The shoulder part 6*b* preferably has an inclination angle α of 25 degrees or less with respect to the central axis of the mouth part (19 degrees in this embodiment). The smaller the inclination angle α, the more the pressure of the inner bag 4 against the outer shell 3 in the vicinity of the curved part 6*f* is suppressed, and the force required to pull out the inner bag 4 is reduced. The inclination angle α is, for example, 5 to 25 degrees, specifically, for example, 5, 6, 7, 8, 9, 10, 11, 12, 13, 14, 15, 16, 17, 18, 19, 20, 21, 22, 23, 24, 25 degrees, and may be in the range between the two values exemplified herein, or may be equal to or less than any one of the values exemplified herein.

As shown in FIG. 28, the body part 6 includes a reduced diameter part 6*g* that shrinks in diameter toward the bottom part 7, on the side of the bottom part 7 from the curved part 6*f*. The reduced diameter part 6*g* has a shape that functions as a so-called "extraction taper", and the force required to pull out the inner bag 4 is reduced by providing the reduced diameter part 6*g*. In the present embodiment, the body part body 6*c* has a shape that shrinks in diameter toward the bottom part 7, so that the entire body part body 6*c* serves as the reduced diameter part 6*g*. On the other hand, for example, a portion of the body part body 6*c* may shrink in diameter, and the remaining portion of the body part body 6*c* may shrink in diameter. It is preferable that the portion where diameter is not reduced is a portion where outer diameter does not change.

<Concave-Convex Shape 9 on inner surface of Mouth Part 5>

As shown in FIG. 31C, on the inner surface of at least one of the mouth part 5 and a position adjacent to the mouth part 5 in the body part 6, it is preferable that the concave-convex shape 9 where the recessed stripe 9*a* and the projecting stripe 9*b* appear alternately in the circumferential direction of the mouth part 5 is provided.

<Structure of Bottom Part 7>

As shown in FIG. 30B, the protrusion 4*e* is provided in the bottom part 7 of the inner bag 4.

<Design>

The container body 2 has a novel aesthetic appearance. The design of the container body 2 shown in FIG. 32 can be grasped as the overall design, a portion of the region A can be grasped as "the portion where the design registration is requested as a partial design", and a region of the region B can be grasped as "the portion where the design registration is requested as a partial design," and other portions can be grasped as "the portion where the design registration is requested as a partial design." Regions A and B are shown only in the front view for the sake of convenience, but the entire circumference of the container body 2 is intended to be "the portion where the design registration is requested as a partial design."

In the bottom part 7, the region C including the bottom part concave region 7*a* may or may not be included in the "the portion where the design registration is requested as a partial design."

<Engagement Structure Between Mouth Part Attachment Member 8 and Inner Bag 4, and Engagement Structure Between Inner Bag 4 and Outer Shell 3 at Mouth Part 5>

As shown in FIG. 28, the inner bag 4 includes a projecting part 4*c* projecting from the open end 3*a* of the outer shell 3.

As shown in FIG. 33, the mouth part attachment member 8 includes an outer cylinder 8*a*, an inner cylinder 8*c*, an engaging part 8*d*, a claw part 8*e*, a top plate 8*f* and a discharge port 8*j*.

A convex and concave shape where the convex and concave is alternately repeated in the circumferential direction is provided on the outer surface of the outer cylinder 8*a*. This facilitates rotation of the mouth part attachment member 8. The engaging part 8*d* is provided on the inner surface of the outer cylinder 8*a*. The engaging part 8*d* is an engaging part that engages with the engaging part 5*a* of the mouth part 5. By engaging the engaging part 8*d* with the engaging part 5*a*, the mouth part attachment member 8 is attached to the mouth part 5.

The upper surface of the outer cylinder 8*a* is covered with the top plate 8*f*. The discharge port 8*j* is provided on the top plate 8*f*. A nozzle may be provided in the discharge port 8*j*. The inner cylinder 8*c* is a so-called inner ring that has a smaller diameter than the outer cylinder 8*a* and is arranged inside the outer cylinder 8*a*.

The claw part 8*e* is provided on the inner surface of the outer cylinder 8*a*. A plurality of (eight in the present embodiment) claw part 8*e* are provided so as to be spaced apart in the circumferential direction. The number of claw part 8*e* is, for example, 1 to 20, preferably 4 to 12. On the top plate 8*f*, the through hole 8*h* is provided at a position facing the claw part 8*e*.

The mouth part attachment member 8 having such a shape can be manufactured using a split mold that opens and closes in the vertical direction. Since the through hole 8*h* and the upper surface 8*e*1 of the claw part 8*e* can be formed using the protrusion provided on the upper mold, the claw part 8*e* can be formed without forcibly removing the lower mold. Therefore, it is not necessary to set the protrusion amount of the claw part 8*e* to a protrusion amount that allows forcible removal, and the protrusion amount (for example, 1 mm or more) suitable for engagement with the inner bag 4 can be set.

In this embodiment, the engaging part 5*a* is a male threaded part 5*a*1, and the engaging part 8*d* is a female threaded part 8*d*1 that can be screwed onto the male threaded part 5*a*1. Therefore, by rotating the mouth part attachment member 8 relative to the mouth part 5 in the tightening direction (usually clockwise when viewed from above) (hereinafter, relative rotation with respect to the mouth part 5 is also simply referred to as "rotation"), it is possible to attach the mouth part attachment member 8 to the mouth part 5. When the mouth part attachment member 8 is rotated in the tightening direction, the female threaded part 8*d*1 is screwed into the male threaded part 5*a*1 while the outer peripheral surface of the inner cylinder 8*c* shown in FIG. 35A is in close contact with the inner peripheral surface of the inner bag 4. At this time, when the mouth part 5 of the inner bag 4 rotates together with the mouth part attachment member 8 due to friction between the outer peripheral surface of the inner cylinder 8*c* and the inner peripheral surface of the inner bag 4, the inner bag 4 is twisted. The content is filled in the inner bag 4 before the mouth part attachment member 8 is attached and when the inner bag 4 is twisted, a problem that the contents in the inner bag 4 overflow occurs. In order to prevent such problem from occurring, the inner bag 4 and the outer shell 3 should be tightly fitted so that the inner bag 4 does not rotate relative to the outer shell 3 at the mouth part 5. However, when they are simply tightly fitted, a new problem that it becomes difficult to pull out the inner bag 4 from the outer shell 3 occurs.

Therefore, in the present embodiment, a configuration where the first resistance to relative rotation of the inner bag 4 with respect to the outer shell 3 in one direction at the mouth part 5 is greater than the second resistance to relative rotation in the other direction. is adopted. For example, when the male threaded part 5*a*1 is a right-handed thread, the one direction and the other direction are the clockwise direction and the counterclockwise direction, respectively, when viewed from above the container body 2. In other words, the one direction is the tightening direction of the mouth part attachment member 8 and the other direction is the loosening direction of the mouth part attachment member 8. According to such a configuration, when the mouth part attachment member 8 is attached, the inner bag 4 is less likely to rotate relative to the outer shell 3, so that the occurrence of the problem that the inner bag 4 is twisted when the mouth part attachment member 8 is attached is suppressed. In addition, since the second resistance against relative rotation in the other direction is relatively small, when the inner bag 4 is separated from the outer shell 3 after use, by rotating the mouth part 5 of the inner bag 4 in the other direction relative to the outer shell 3, the inner bag 4 can be easily twisted and reduced in diameter. Therefore, it is easy to pull out the inner bag 4 from the outer shell 3.

Specifically, the inner bag 4 and the outer shell 3 are in concave-convex engagement in the mouth part 5, and this concave-convex engagement is configured such that the first resistance is greater than the second resistance. More specifically, as shown in FIGS. 31B, the concave-convex engagement is engagement between the convex part 4$f$ provided on the outer peripheral surface of the inner bag 4 and the concave part 3$f$ provided on the inner peripheral surface of the outer shell 3. As shown in FIG. 31B, a protrusion 3$g$ projecting inward is provided in the outer shell 3 on the clockwise side (tightening direction side) of the convex part 4$f$. On the other hand, such a protrusion is not provided on the counterclockwise side (loosening direction side) of the convex part 4$f$. Therefore, in the mouth part 5, the resistance (the first resistance) for rotating the inner bag 4 relative to the outer shell 3 in the tightening direction is higher than the resistance (the second resistance) for relatively rotating in the loosening direction. In the present embodiment, two sets of the convex part 4$f$ and the concave part 3$f$ are provided at intervals of 180 degrees, but the number of sets of the convex part 4$f$ and the concave part 3$f$ may be one or three or more.

It is noted that the concave-convex engagement may be engagement between a concave part provided on the outer peripheral surface of the inner bag 4 and a convex part provided on the inner peripheral surface of the outer shell 3. Moreover, although the concave part 3$f$ is configured by a through hole penetrating the outer shell 3, the concave part 3$f$ may not penetrate the outer shell 3 as long as the concave part 3$f$ can be engaged with the convex part 4$f$.

When the mouth part attachment member 8 is further rotated in the tightening direction, the claw part 8$e$ gradually approaches the projecting part 4$c$ while the female threaded part 8$d$1 is screwed into the male threaded part 5$a$1, and at a certain point the inclined surface provided on the lower side of the claw part 8$e$ abuts on the engagement flange 4$c$3 shown in FIG. 28B.

In this state, when the mouth part attachment member 8 is further rotated in the tightening direction, the claw part 8$e$ climbs over the engagement flange 4$c$3 to enter the state shown in FIG. 35A.

In this state, the claw part &e is arranged between the engagement flange 4$c$3 and the abutting flange 4$c$4. The engagement flange 4$c$3 is accommodated in the gap between the claw part 8e and the top plate 8$f$.

As shown in FIG. 35A, the projecting cylinder 4$c$1 is arranged between the claw part 8$e$ and the inner cylinder 8$c$. At this point, when the male threaded part 5$a$1 and the female threaded part 8$d$1 are not completely tightened, the claw part 8$e$ is guided by the circumferential inclined surface 4$c$5 provided on the engagement protrusion 4$c$2, and the claw part &e climbs over the engagement protrusion 4$c$2. Thereby, the mouth part attachment member 8 can be rotatable further in the tightening direction. After the male threaded part 5$a$1 and the female threaded part 8$d$1 are completely tightened, the mouth part attachment member 8 cannot rotate in the tightening direction and cannot move in the axial direction of the mouth part 5.

In this state, the engagement protrusion 4$c$2 is engaged with the claw part 8$e$ of the mouth part attachment member 8 in the rotational direction of the mouth part attachment member 8, and the engagement flange 4$c$3 is engaged with the claw part 8$e$ of the mouth part attachment member 8 in the axial direction of the mouth part 5. That is, the claw part 8$e$ is engaged with the engagement protrusion 4$c$2 and the engagement flange 4$c$3.

For this reason, after the contents in the inner bag 4 were used up, when the mouth part attachment member 8 is rotated in the loosening direction (usually counterclockwise when viewed from above), the inner bag 4 rotates as the mouth part attachment member 8 rotates. As a result, the inner bag 4 is twisted and reduced in diameter.

When the mouth part attachment member 8 is further rotated in the loosening direction to unscrew the female threaded part 8$dl$ and the male threaded part 5$a$1, the mouth part attachment member 8 becomes movable in the direction away from the open end 3$a$ (that is, in the axial direction of the mouth part 5). Since the engagement flange 4$c$3 is engaged with the mouth part attachment member 8 in the axial direction of the mouth part 5, when the mouth part attachment member 8 is moved in the axial direction of the mouth part 5, the inner bag 4 is also moved together with the mouth part attachment member 8, and the inner bag 4 is pulled out from the outer shell 3.

As described above, according to the configuration of the present embodiment, the inner bag 4 is twisted and reduced in diameter, and then pulled out from the outer shell 3 simply by rotating the mouth part attachment member 8 in the loosening direction. Therefore, the inner bag 4 and the outer shell 3 can be smoothly separated by a simple operation.

<Loosening Prevention Structure of Mouth Part Attachment Member 8>

In the container body 2 of this embodiment, the male threaded part Sal and the female threaded part 8$d$1 are multi-threaded (more specifically, three-threaded). Therefore, even after the male threaded part 5$a$1 and the female threaded part 8$d$1 are tightened, they are easily loosened. Therefore, as shown in FIG. 35B, a loosening prevention structure 24 is provided to prevent loosening of screwing between the mouth part 5 and the mouth part attachment member 8. In this embodiment, the loosening prevention structure 24 is configured by a protrusion 3$i$ protruding from the outer peripheral surface of the outer shell 3 and a protrusion 8$i$ protruding from the inner peripheral surface of the outer cylinder 8$a$ of the mouth part attachment member 8. A plurality (three in the present embodiment) of the protrusions 3$i$ and the protrusions 8$i$ are provided spaced, preferably evenly, in the circumferential direction, respectively. The loosening prevention structure 24 may be another configuration that engages the mouth part 5 and the mouth part attachment member 8 in the circumferential direction and may, for example, engage a concave part provided in the inner peripheral surface of the outer cylinder 8$a$ of the mouth part attachment member 8 with the protrusion 3$i$.

<Protrusion 3h on inner surface of Mouth Part 5 of Outer Shell 3>

As shown in FIG. 31A, a protrusion 3h is provided at a position closer to the open end 3a than the protrusion 3g on the inner surface of the mouth part 5 of the outer shell 3. The protrusion 3h is preferably provided so as to be connected to the protrusion 3g. The mouth part 5 of the outer shell 3 is thinned at a portion where the protrusions 3g, 3h are provided, so that the outer shell 3 abuts on the inner bag 4 only at the protrusions 3g, 3h. Therefore, the contact area between the outer shell 3 and the inner bag 4 is reduced, and the force required to pull out the inner bag 4 is reduced. Moreover, the protrusions 3g, 3h are provided at a plurality of locations (two locations in this embodiment) spaced apart, preferably at equal intervals, in the circumferential direction. This allows the mouth part 5 of the outer shell 3 and the mouth part 5 of the inner bag 4 to be maintained concentrically.

By the way, when the mouth part attachment member 8 is rotated in the loosening direction, the screwing between the mouth part attachment member 8 and the mouth part 5 is released by about half a turn, when this screwing is released, the inner bag 4 can be pulled out from the outer shell 3. However, there may arise a problem that the mouth part attachment member 8 may be left idling indefinitely without being immediately aware that the screwing was released. On the other hand, in the present embodiment, when the convex part 4f rotates in the loosening direction (counterclockwise direction in FIGS. 31A to 31B), the convex part 4f reaches the protrusion 3h in about half a turn (for example, the convex part 4f on the right side of FIG. 31B reaches the protrusion 3h on the left side of FIG. 31A), further rotation of the inner bag 4 is prevented. According to such a configuration, the inner bag 4 can be pulled out when the inner bag 4 stops rotating when the mouth part attachment member 8 is rotated in the loosening direction, so the inner bag 4 can be pulled out at an appropriate timing, it becomes possible to improve usability.

1-2. Method for Manufacturing Double Container 1

As shown in FIGS. 36 to 38, the container body 2 can be manufactured using the same method as described in "1. First Embodiment common to First to Third and Fifth to Sixth Perspectives" except for the following points.

<Configuration of Inner Preform 14, Outer Preform 13 and Preform 15>

As shown in FIG. 36, the inner preform 14 has a cylindrical shape with a bottom, and includes a mouth part 14a, a body part 14b, and a bottom part 14c. As shown in FIG. 37, a concave-convex shape 19 is provided on the inner surface of the inner preform 14.

As shown in FIG. 36, the outer preform 13 has a cylindrical shape with a bottom, and includes a mouth part 13a, a body part 13b, and a bottom part 13c. A protrusion 13h that serves as the protrusion 3h, a protrusion (not shown) that serves as the protrusion 3g, and a protrusion 13i that serves as the protrusion 3i are provided in the mouth part 13a of the outer preform 13.

As shown in FIG. 38, when forming the preform 15, the projecting part 14d is abutted on the open end of the mouth part 13a, and the positioning pin 14c1 is inserted into the positioning hole.

<Concave-Convex Engagement at Mouth Part 15a of Inner Preform 14 and Outer Preform 13>

In this embodiment, as shown in FIG. 36, the concave-convex engagement is engagement between a convex part 14f provided on the outer peripheral surface of the mouth part 14a of the inner preform 14 and a concave part 13f provided on the inner peripheral surface of the mouth part 13a of the outer preform 13. The convex part 14f and the concave part 13f become the convex part 4f and the concave part 3f, respectively.

2. Other Embodiment

The container body 2 may be formed by a method other than biaxial stretch blow molding. For example, the container body 2 can be formed by direct blow molding that molds a laminated parison in a molten state.

Ninth Perspective

An embodiment of the ninth perspective of the present invention will be described with reference to FIGS. 39 to 48.

1. First Embodiment 1-1. Configuration of Double Container 1
<Basic Configuration>

As shown in FIG. 39, the double container 1 of the first embodiment of the present invention includes a container body 2 and a mouth part attachment member 8. The description of the container body 2 and the mouth part attachment member 8 is the same as described in "1. First Embodiment common to First to Third and Fifth to Sixth Perspectives", except for the points described below.

As shown in FIGS. 39 to 40, the container body 2 includes a mouth part 5, a body part 6 and a bottom part 7. As shown in FIG. 41, the container body 2 includes an inner bag 4 and an outer shell 3 arranged to cover the inner bag 4. The description of the inner diameter D2 of the mouth part 5 of the outer shell 3 and the outer diameter D4 of the mouth part 5 of the outer shell 3 are the same as in the eighth perspective.

<Engagement Structure between Mouth Part Attachment Member 8 and Container Body 2>

The mouth part attachment member 8 is configured to be attachable to the mouth part 5 and is preferably configured so that the inner bag 4 rotates in the mouth part 5 as the mouth part attachment member 8 rotates (here, relative to the outer shell 3). With such a configuration, it is possible to rotate the inner bag 4 at the mouth part 5 by rotating the mouth part attachment member 8. The container body 2 of this embodiment moves in the direction where the inner bag 4 is removed from the outer shell 3 by rotating the inner bag 4 relative to the outer shell 3. Therefore, the inner bag 4 can be raised from the outer shell 3 by rotating the mouth part attachment member 8. Then, the inner bag 4 can be easily pulled out from the outer shell 3 by using the part where the inner bag 4 rises from the outer shell 3 as a trigger.

Further, since the body part 6 of the container body 2 has a larger outer diameter than the mouth part 5, it is not easy to pull out the inner bag 4 through the mouth part 5 of the outer shell 3 simply by pulling the inner bag 4. However, by rotating the mouth part 5 of the inner bag 4 and twisting the inner bag 4 to reduce the diameter of the body part 6 of the inner bag 4, the body part 6 of the inner bag 4 passes through the mouth part 5 of the outer shell 3, and the inner bag 4 can be easily pulled out from the outer shell 3.

The engagement structure between the mouth part attachment member 8 and the container body 2 will be described in more detail below.

As shown in FIG. 42, the inner bag 4 includes a projecting part 4c projecting from the open end 3a of the outer shell 3.

The projecting part 4c includes a projecting cylinder 4c1, an engagement protrusion 4c2 and an abutting flange 4c4.

The engagement protrusion 4c2 protrudes radially outward from the peripheral surface of the projecting cylinder 4c1. The engagement protrusions 4c2 are provided at a plurality of locations (eight locations in the present embodiment) spaced apart in the circumferential direction. The engagement protrusion 4c2 is provided with a tapered surface 4c6 on its upper surface. As will be described later, this makes it easier for the annular convex part 28c (shown in FIG. 44A) of the mouth part attachment member 8 to climb over the engagement protrusion 4c2.

The abutting flange 4c4 is an annular portion disposed at a position abutting on the open end 3a and having a diameter larger than that of the projecting cylinder 4c1. The inner bag 4 is prevented from falling into the outer shell 3 by the abutment of the abutting flange 4c4 against the open end 3a. On the other hand, it is also possible to prevent the inner bag 4 from falling into the outer shell 3 by bringing the engagement protrusion 4c2 into contact with the open end 3a without providing the abutting flange 4c4.

An annular convex part 5a2 and engagement convex parts 3k intermittently provided on the annular convex part 5a2 are provided on the outer peripheral surface of the mouth part 5 of the outer shell 3. The engagement convex parts 3k are provided at a plurality of locations (eight locations in this embodiment) spaced apart in the circumferential direction on the annular convex part 5a2.

As shown in FIG. 44, the mouth part attachment member 8 is a plugging type, the mouth part attachment member 8 can be attached to the mouth part 5 by applying a force in the axial direction (direction perpendicular to the opening surface 5c1 surrounded by the open end 5c of the mouth part 5) to the mouth part attachment member 8.

The mouth part attachment member 8 includes a body part 28 and a band part 29. The body part 28 and the band part 29 are connected to each other via an easily tearable connecting part 30. The band part 29 engages the mouth part 5 of the outer shell 3 in the circumferential and axial directions. Therefore, the band part 29 is restricted from moving in the circumferential direction and the axial direction with respect to the mouth part 5 of the outer shell 3. The body part 28 engages the mouth part 5 of the inner bag 4 in the circumferential direction and the axial direction. Therefore, the body part 28 is restricted from moving in the circumferential direction and the axial direction with respect to the mouth part 5 of the inner bag 4.

The connecting part 30 is configured to be torn by applying a force (shearing force, rotational force, etc.) between the body part 28 and the band part 29. The connecting part 30 is preferably thinner than the body part 28 and the band part 29. It is preferable that the connecting parts 30 are provided at a plurality of locations spaced apart in the circumferential direction. This makes it easier to tear.

The band part 29 has a belt shape and is arranged so as to surround the annular convex part 5a2. An engagement convex part 29a extending in the circumferential direction and an engagement concave part 29b provided at a position closer to the connecting part 30 than the engagement convex part 29a are provided on the inner peripheral surface of the band part 29. The engagement concave parts 29b are provided at a plurality of locations (eight locations in the present embodiment) spaced apart in the circumferential direction. The band part 29 is axially engaged with the mouth part 5 of the outer shell 3 by axially engaging the engagement convex part 29a with the annular convex part 5a2. A tapered surface 29a1 is provided on the lower side of the engagement convex part 29a, and the force required for the engagement convex part 29a to climb over the annular convex part 5a2 is reduced.

Further, as shown in FIG. 46B, the band part 29 is engaged with the mouth part 5 of the outer shell 3 in the circumferential direction by accommodating the engagement convex part 3k in the engagement concave part 29b. As will be described later, the double container 1 of this embodiment is configured so that the inner bag 4 moves in a direction to come out of the outer shell 3 by integrally rotating the mouth part attachment member 8 and the inner bag 4. Therefore, when the mouth part attachment member 8 unintentionally rotates with respect to the outer shell 3, there is a risk that the inner bag 4 may unintentionally come out of the outer shell 3. In order to prevent such a problem from occurring, the band part 29 of the mouth part attachment member 8 is engaged with the mouth part 5 of the outer shell 3 in the circumferential direction, thereby suppressing rotation of the mouth part attachment member 8 with respect to the mouth part 5 of the outer shell 3.

A notch part 29c is provided in the band part 29. By grasping one end of the band part 29 at the notch part 29c and pulling it radially outward, the band part 29 can be removed by tearing the connecting part 30. A knob may be provided at one end of the band part 29 so that one end of the band part 29 can be easily grasped.

The body part 28 includes an outer cylinder 28a, an inner cylinder 28b, an annular convex part 28c, an engagement convex part 28d, a top plate 28e and a discharge port 28f.

The top plate 28e is provided on the upper surface of the outer cylinder 28a. The discharge port 28f is provided on the top plate 28e. A nozzle may be provided in the discharge port 28f. The inner cylinder 28b is a so-called inner ring that has a smaller diameter than the outer cylinder 28a and is arranged inside the outer cylinder 28a.

The annular convex part 28c is an annular convex part provided so as to extend in the circumferential direction on the inner peripheral surface of the outer cylinder 28a. The body part 28 is axially engaged with the mouth part 5 of the inner bag 4 by axially engaging the annular convex part 28c with the engagement protrusion 4c2. The engagement convex parts 28d are provided at a plurality of locations (eight locations in the present embodiment) spaced apart in the circumferential direction. As shown in FIG. 46A, the engagement convex part 28d is arranged between adjacent engagement protrusions 4c2, as a result, the body part 28 engages the mouth part 5 of the inner bag 4 in the circumferential direction.

<Engagement Structure between Outer Shell 3 and Inner Bag 4>

As shown in FIG. 42, a cam convex part 4g and an engagement convex part 4h are provided on the outer peripheral surface of the inner bag 4. The cam convex part 4g and the engagement convex part 4h are connected to each other. The lower surfaces of the cam convex part 4g and the engagement convex part 4h are respectively inclined so as to approach the open end 5c as they move clockwise when viewed from the open end 5c side of the mouth part 5.

As shown in FIG. 43, a cam rail 3l and an engagement concave part 3m are provided on the inner peripheral surface of the outer shell 3. The engagement concave part 3m is provided so that the lower surface of the engagement concave part 3m is continuous with the upper surface of the cam rail 3l. The upper surface of the cam rail 3l and the lower surface of the engagement concave part 3m are inclined so as to approach the open end 3a as they move clockwise when viewed from the open end 3a side. In the state before pulling out the inner bag 4 from the outer shell 3, the engagement convex part 4*h* is arranged in the engagement concave part 3*m*, and the lower surface of the cam convex part 4*g* abuts on the upper surface of the cam rail 3*l*. The cam mechanism 3*l* is configured by the cam convex part 4*g* and the cam rail 3*l*. In this embodiment, the engagement concave part 3*m* is a through hole, but may be a non-through hole.

<Method for Pulling out the Inner Bag 4>

In the state before starting to pull out the inner bag 4, the body part 28 of the mouth part attachment member 8 and the band part 29 are connected, and the band part 29 is axially engaged with the mouth part 5 of the outer shell 3. Therefore, in this state, the inner bag 4 cannot be pulled out from the outer shell 3. For this reason, first, by grasping one end of the band part 29 at the notch part 29*c* and pulling it radially outward, the band part 29 is removed by tearing the connecting part 30. As a result, the engagement between the mouth part attachment member 8 and the mouth part 5 of the outer shell 3 is released, and it is possible to pull out the inner bag 4.

Next, the mouth part attachment member 8 is rotated clockwise as viewed from the open end 5*c*. Since the inner bag 4 is engaged with the mouth part attachment member 8 in the circumferential direction, the inner bag 4 rotates in the same direction as the mouth part attachment member 8 rotates, and the cam convex part 4*g* moves along the cam rail 3*l*, along with this movement, the inner bag 4 moves in the direction of coming out of the outer shell 3. At this time, the inner bag 4 is twisted and the diameter of the body part 6 of the inner bag 4 is reduced. It is noted that when the inner bag 4 is rotated counterclockwise when viewed from the open end 5*c*, as shown in FIG. 46B, since the cam convex part 4*g* of the inner bag 4 interferes with the convex part 311 configuring the cam rail 3*l*, the inner bag 4 is configured not to be able to be rotated. Therefore, it is possible to prevent the rotation direction of the inner bag 4 from being mistaken.

After that, the mouth part attachment member 8 is axially moved so as to pull the inner bag 4 out of the outer shell 3. Since the mouth part attachment member 8 is axially engaged with the inner bag 4, the axial force applied to the mouth part attachment member 8 is transmitted to the inner bag 4, and the inner bag 4 is pulled out from the outer shell 3. Since this pulling is performed in a state where the inner bag 4 rises from the outer shell 3, the force required to pull out the inner bag 4 is reduced.

1-2. Method for Manufacturing Double Container 1

As shown in FIGS. 47 to 48, the container body 2 can be manufactured by the same method as described in "1. First Embodiment common to First to Third and Fifth to Sixth Perspectives" except for the following points.

<Configuration of Inner Preform 14, Outer Preform 13 and Preform 15>

As shown in FIG. 47, the inner preform 14 has a cylindrical shape with a bottom, and includes a mouth part 14*a*, a body part 14*b* and a bottom part 14*c*. A cam convex part 14*g* serving as the cam convex part 4*g* and the engagement convex part 4*h*, and an engagement convex part 14*h* are provided on the outer peripheral surface of the mouth part 14*a* of the inner preform 14.

As shown in FIG. 47, the outer preform 13 has a cylindrical shape with a bottom, and includes a mouth part 13*a*, a body part 13*b* and a bottom part 13*c*. The bottom part 13*c* is provided so as to close the lower end of the body part 13*b*. An annular convex part 13*d* and a positioning hole (not shown) are provided in the bottom part 13*c*. A cam rail 13*l* serving as the cam rail 3*l* and an engagement concave part 13*m* serving as the engagement concave part 3*m* are provided in the mouth part 13*a* of the outer preform 13.

As shown in FIG. 48, when forming the preform 15, the projecting part 14*d* is abutted on the open end of the mouth part 13*a*, and the positioning pin 14*c*1 is inserted into the positioning hole.

<Concave-Convex Engagement at Mouth Part 15*a* of Inner Preform 14 and Outer Preform 13>

In this embodiment, as shown in FIG. 47, the concave-convex engagement is engagement between the engagement convex part 14*h* provided on the outer peripheral surface of the mouth part 14*a* of the inner preform 14 and the engagement concave part 13*m* provided on the inner surface of the mouth part 13*a* of the outer preform 13. The engagement convex part 14*h* and the engagement concave part 13*m* become the engagement convex part 4*h* and the engagement concave part 3*m*, respectively.

2. Other Embodiments

It is not essential to engage the mouth part attachment member 8 with the inner bag 4, and the inner bag 4 may be directly grasped to rotate the inner bag 4 or to pull out the inner bag 4.

Any mechanism that can change the relative rotation of the inner bag 4 and the outer shell 3 to the axial movement of the inner bag 4 can be used as the cam mechanism 3*l*.

Tenth Perspective

An embodiment of the tenth perspective of the present invention will be described with reference to FIGS. 28 to 38.

1. First Embodiment 1-1. Configuration of Double Container 1
<Basic Configuration>

The description of the container body 2 and the mouth part attachment member 8 is the same as that described in the eighth perspective, except for the points described below.

The container body 2 is a biaxially stretched blow molded body formed by biaxially stretched blow molding, and the inner bag 4 and outer shell 3 are formed by biaxially stretched blow molding. The details of the biaxial stretch blow molding will be described later. In the biaxially stretched blow molded body, the adhesion between the inner bag 4 and the outer shell 3 is unlikely to be high. Therefore, the force required to pull out the inner bag 4 from the outer shell 3 is reduced as compared with a direct blow molded body that is a blow molded body of molten parison.

<Material and Layer Configuration>

The inner bag 4 preferably includes an EVOH layer. The EVOH layer is a layer made of an EVOH-based resin containing 50% by mass or more of EVOH (ethylene-vinyl alcohol copolymer). The EVOH-based resin may contain only EVOH, or may be a mixed resin of EVOH and other resin. Other resins include an olefinic resin. The olefinic resin is a resin containing 50% by mass or more of olefin units in resin. Olefins include ethylene, propylene, and the like. The ratio of olefin units contained in the olefinic resin is, for example, 50 to 100% by mass, specifically, for example, 50, 60, 70, 80, 90, 100% by mass, and may be in the range between the two values exemplified herein, or may be equal to or more than any one of the values exemplified herein. Examples of olefinic resins include low-density polyethylene, linear low-density polyethylene, high-density polyethylene, polypropylene, and copolymers (random copolymers or block copolymers) of propylene and other olefins (such as ethylene). The ratio of EVOH in the EVOH-based resin is, for example, 50 to 100% by mass, specifically, for example, 50, 60, 70, 80, 90, 100% by mass, and may be in the range between the two values exemplified herein, or may be equal to or more than any one of the values exemplified herein.

The EVOH contained in the EVOH layer preferably has an ethylene content of 32 to 46 mol %. By providing the inner bag 4 with the EVOH layer, the gas barrier property of the inner bag 4 is enhanced. When the ethylene content of the EVOH is too low, the decrease in flexibility of the inner bag 4 becomes remarkable, and the deterioration of the pullability of the inner bag 4 tends to become remarkable. Also, as will be described later, when the ethylene content of the EVOH is too low, the inner bag 4 becomes too brittle, and as shown in FIG. 28, when the mouth part attachment member 8 is engaged with the projecting part 4c of the inner bag 4, there is a possibility that cracks may occur in the projecting part 4c. On the other hand, when the ethylene content of EVOH is too high, improvement of the gas barrier property of the inner bag 4 tends to be insufficient. By setting the ethylene content within the above range, it is possible to suppress the occurrence of the above problems. Specifically, the ethylene content is, for example, 32, 33, 34, 35, 36, 37, 38, 39, 40, 41, 42, 43, 44, 45, 46 mol %, and may be in the range between the two values exemplified herein.

The inner bag 4 may have a single layer configuration of an EVOH layer, or may have a multi layer configuration including an EVOH layer. When the inner bag 4 has a single layer configuration of the EVOH layer, the inner preform 14 (shown in FIG. 36) for forming the inner bag 4 can also have a single layer configuration. The inner preform 14 having a single-layer configuration can be formed by general injection molding, so the manufacturing cost can be reduced. When the inner bag 4 has a multi layer configuration, another layer is provided on one or both of the inner surface side and the outer surface side of the EVOH layer. Another layer is an olefinic resin layer made of an olefinic resin. The explanation of the olefinic resin is as described above. Specifically, the layer configuration of the inner bag 4 includes, from the outer surface side, outer layer/EVOH layer, EVOH layer/inner layer, and outer layer/EVOH layer/inner layer. The outer surface layer and the inner surface layer are the separate layers described above, and these layers may have a single layer configuration or a multi layer configuration. It is particularly preferred that the outer layer and the inner layer are each polypropylene layers.

When the adhesion between the EVOH layer and the other layer is not good, an adhesive resin layer may be provided between the EVOH layer and the other layer and/or one or both of the EVOH layer and the other layer may blended with an adhesive resin. The adhesive resin is a resin that has good adhesion to both the EVOH layer and the other layer, and includes acid-modified polyolefin resins (for example, maleic anhydride-modified polyethylene, maleic anhydride-modified polypropylene) and the like.

The EVOH layer may or may not be exposed on the inner surface side of the inner bag 4. When the EVOH layer is exposed on the inner surface side of the inner bag 4, the EVOH layer absorbs moisture from the contents and is softened, so there is an advantage that the inner bag 4 can be pulled out more easily. In addition, since EVOH does not easily adsorb citrus scent components, when the contents contain citrus scent components, deterioration of the flavor of the contents can be suppressed by using the EVOH layer as the innermost layer of the inner bag 4. When the EVOH layer is exposed on the inner surface side of the inner bag 4, the EVOH layer absorbs moisture, and the gas barrier property of the EVOH layer is slightly reduced. However, the higher the ethylene content of EVOH, the smaller the degree of deterioration in gas barrier property due to water absorption, so the advantage of improved flexibility outweighs the disadvantage of reduced gas barrier property. On the other hand, when the EVOH layer is not exposed on the inner surface side of the inner bag 4, since the EVOH layer is prevented from absorbing moisture from the contents, thereby preventing deterioration of the gas barrier property of the EVOH layer.

The material and layer configuration of the outer shell 3 are not particularly limited, and the outer shell 3 can be formed of a thermoplastic resin such as polyester (for example, PET) or polyolefin (for example, polypropylene, polyethylene), and is preferably formed of PET from the perspective of recyclability. Moreover, from the perspective of reducing the environmental load, the outer shell 3 is preferably formed of biomass plastic.

1-2. Method of Manufacturing Double Container 1

<Material and Manufacturing Method of Inner Preform 14 and Outer Preform 13>

The inner preform 14 can be formed of the material described above for the inner bag 4. The inner preform 14 can be formed by direct blow molding, injection molding, or the like, but is preferably formed by injection molding from the perspective of manufacturing costs and the like. The inner bag 4 having a multi layer configuration can be formed using an inner preform 14 having a multi layer configuration. The inner preform 14 having a multi layer configuration can be formed by two-color molding or co-injection molding.

The outer preform 13 can be formed of the materials described above for the outer shell 3. The outer preform 13 can be formed by direct blow molding, injection molding, or the like, but is preferably formed by injection molding from the perspective of manufacturing costs and the like.

The preform 15 may be formed by forming the inner preform 14 and the outer preform 13 separately and then combining them, or may be formed by two-color molding.

Example of Tenth Perspective

1. Manufacture of Container Body 2

According to the method described above, the container body 2 (inner capacity: 300 mL) shown in FIG. 28 was manufactured by carrying out biaxial stretch blow molding on the preform 15 shown in FIGS. 36 to 38. The inner preform 14 was manufactured by injection molding EVOH (ethylene content 38 mol %, type: G Soarnol GH3804B, manufactured by Mitsubishi Chemical Corporation) at 250° C. The outer preform 13 was manufactured by injection molding PET (type: titanium catalyst grade, manufactured by Teijin Ltd.) at 300° C. into the shape of the outer preform and then rapidly cooling it to 20° C. The molten PET was made amorphous by rapidly cooling.

The container body 2 was obtained by heating the preform 15 to 110° C. (the temperature at the center in the longitudinal direction of the preform 15) and then carrying out biaxial stretch blow molding.

Comparative Example 1

The container body 2 was obtained in the same manner as in example 1, except that the inner preform 14 was formed of EVOH (ethylene content: 29 mol %, type: Soarnol D2908, manufactured by Mitsubishi Chemical Corporation).

2. Test

A crack resistance test and a pullability test were performed on the container body 2 of example 1 and comparative example 1. Regarding the container body 2 of example 1, the results of both the crack resistance test and the pullability test were positive. On the other hand, regarding the container body 2 of comparative example 1, the results of both the crack resistance test and the pull-out test were negative.

Specifically, the crack resistance test and pullability test were performed by the following methods.

<Crack Resistance Test>

A test was conducted to determine whether or not the engagement protrusion 4c2 was cracked by the claw part &e of the mouth part attachment member 8 when the mouth part attachment member 8 shown in FIG. 28 was engaged with the mouth part 5 of the container body 2, and was evaluated according to the following criteria.

Positive: no crack occurred
Negative: crack occurred

<Pullability Test>

After water was accommodated in the inner bag 4 of the container body 2, the mouth part attachment member 8 was attached to the mouth part 5 and the mouth part attachment member 8 was engaged with the inner bag 4 and left for one day. After that, after all the water is discharged from the inner bag 4, the mouth part attachment member 8 is rotated in the loosening direction to release the engagement with the mouth part 5. After that, the inner bag 4 was pulled out from the container body 2 by pulling the mouth part attachment member 8. The extraction strength at that time was measured and evaluated according to the following criteria.

Positive: extraction strength is less than 3 kgf
Negative: extraction strength is 3 kgf or more

REFERENCE SIGNS LIST

1: double container, 2: container body, 3: outer shell, 3a: open end, 3b: annular convex part, 3c: through hole, 3f: concave part, 3f1: groove, 3f2: end part, 3f3: end part, 3g: protrusion, 3h: protrusion, 3i: protrusion, 3k: engagement convex part, 3l: cam rail, 3l1: convex part, 3m: engagement concave part, 3n: insertion part, 3o: tapered surface, 4: inner bag, 4b: flange, 4c: projecting part, 4c1: projecting cylinder, 4c2: engagement protrusion, 4c3: engagement flange, 4c4: abutting flange, 4c5: circumferential inclined surface, 4c6: tapered surface, 4d: side surface, 4e: protrusion, 4f: convex part, 4f1: tapered surface, 4g: cam convex part, 4h: engagement convex part, 4n: flange, 4n1: groove, 4o: open end, 5: mouth part, 5a: engaging part, 5a1: male threaded part, 5a2: annular convex part, 5b: flange, 5e: open end, 5c1: opening surface, 6: body part, 6a: upper end, 6b: shoulder part, 6c: body part body, 6d: concave part, 6e: groove, 6f: curved part, 6f1: portion, 6g: reduced diameter part, 7: bottom part, 7a: bottom part concave region, 7a1: peripheral surface, 7a2: bottom surface, 7b: peripheral edge region, 8: mouth part attachment member, 8a: outer cylinder, 8b: intermediate cylinder, 8c: inner cylinder, 8d: engaging part, 8d1: female threaded part, 8e: claw part, 8e1: upper surface, 8e2: lower side inclined surface, 8f: top plate, 8g: nozzle, 8h: through hole, 8i: protrusion, 8j: discharge port 9: concave-convex shape, 9a: recessed stripe, 9b: projecting stripe, 10: alternating wall thickness shape, 10a: thin part, 10b: thick part, 11: recessed stripe, 13: outer preform, 13a: mouth part, 13b: body part, 13c: bottom part, 13c2: positioning hole, 13c4: annular convex part, 13d: annular convex part, 13f: concave part, 13g: slit, 13h: protrusion, 13i: protrusion, 13j: open end, 13k: positioning hole, 131: cam rail, 13m: engagement concave part, 14: inner preform, 14a: mouth part, 14a1: flange, 14b: body part, 14c: bottom part, 14c1: positioning pin, 14d: projecting part, 14f: convex part, 14f1: tapered surface, 14f2: tapered surface, 14g: cam convex part, 14h: engagement convex part, 14i: flange, 15: preform, 15a: mouth part, 15b: body part, 15c: bottom part, 15d: stretched part, 16: outside air introduction hole, 17: through hole, 19: concave-convex shape, 20: alternating wall thickness shape, 20a: thin part, 20b: thick part, 21: recessed stripe, 22: information transmission display, 22a: recycle mark, 22b: message, 23: information transmission display, 23a: recycle mark, 23b: message, 24: loosening prevention structure, 25: support rod, 26: air passage, 28: body part, 28a: outer cylinder, 28b: inner cylinder, 28c: annular convex part, 28d: engagement convex part, 28e: top plate, 28f: discharge port, 29: band part, 29a: engagement convex part, 29a1: tapered surface, 29b: engagement concave part, 29c: notch part, 30: connecting part, 31: cam mechanism, 33: concave-convex shape, 33a: convex part, 33b: concave part, 34: concave-convex shape, 34a: convex part, 34b: concave part, 35: concave-convex shape, 36: easily diameter expandable part, 37: slit. 38: diameter expansion suppression part, 39: gap, 40: manufacturing apparatus, 44: concave-convex shape, 45: concave-convex shape, 50: mold unit, 51: mouth part support type, 51a: insertion hole, 52: bottom part support mold, 52a: concave part, 52b: concave part, 52c: drive mechanism, 53: forming die, 53a: cavity surface, 54: forming die, 54a: cavity surface, 61: heater, A: surface, C: central axis, D2: inner diameter, D4: outer diameter, R: radius of curvature, a: angle of inclination

The invention claimed is:

1. A double container comprising a container body and a mouth part attachment member, wherein
the container body includes a mouth part and a body part and a bottom part,
the mouth part of the container body is a tubular portion having an open end,
the body part is arranged adjacent to the mouth part of the container body on a side farther from the open end than the mouth part of the container body, and has a larger outer diameter than the mouth part of the container body,
the bottom part is configured to close a lower end of the body part,
the container body includes an inner bag and an outer shell arranged to cover the inner bag, each of the inner bag and the outer shell includes a mouth part, a body part, and a bottom part,
the mouth part attachment member is configured to be attachable to the mouth part of the container body, and is configured such that the inner bag rotates as the mouth part attachment member rotates,
the double container is configured so that the inner bag is twisted and the body part of the inner bag is reduced in diameter as the mouth part attachment member rotates
the container body is a biaxial stretch blow-molded article of a preform that is configured by covering an inner preform that becomes the inner bag with an outer preform that becomes the outer shell, the body part of the outer shell includes a shoulder part of the outer shell that increases in outer diameter as it moves away from the mouth part of the outer shell, and the body part of the inner bag includes a shoulder part of the inner bag that increases in outer diameter as it moves away from the mouth part of the inner bag.

2. The double container of claim 1, wherein the inner bag includes a projecting part projecting from an open end of the outer shell, the projecting part includes a projecting cylinder and an engagement protrusion projecting radially outward from a peripheral surface of the projecting cylinder, and the double container is configured such that the inner bag rotates as the mouth part attachment member rotates by engaging the engagement protrusion with a claw part of the mouth part attachment member in a rotational direction of the mouth part attachment member.

3. The double container of claim 2, wherein the projecting part includes an engagement flange at a position farther from the open end than the engagement protrusion, and the double container is configured such that the inner bag is pulled out from the outer shell as the mouth part attachment member is moved in a direction away from the open end by engaging the engagement flange with the claw part of the mouth part attachment member in an axial direction of the mouth part.

4. The double container of claim 3, wherein the projecting part includes an abutting flange abutting on the open end, and the engagement protrusion is arranged between the abutting flange and the engagement flange.

5. The double container of claim 1, wherein a concave-convex shape is provided where a recessed stripe and a projecting stripe alternately appear in a circumferential direction of the mouth part of the container body on an inner surface of at least one of the mouth part of the container body and a position of the body part adjacent to the mouth part of the container body, and the recessed stripe and the projecting stripe extend non-parallel to the circumferential direction of the mouth part of the container body.

6. The double container of claim 1, wherein the shoulder part of the outer shell and the shoulder part of the inner bag are in contact with each other.

7. A double container comprising a container body including an inner bag and an outer shell, wherein the container body includes a mouth part and a body part and a bottom part, the mouth part is a tubular portion having an open end, the body part is arranged adjacent to the mouth part on a side farther from the open end than the mouth part, and has a larger outer diameter than the mouth part, the bottom part is configured to close a lower end of the body part, the body part includes a shoulder part that increases in outer diameter as it moves away from the mouth part, the shoulder part is provided in each of the inner bag and the outer shell, a concave-convex shape that reduces a contact area between an outer surface of the inner bag and an inner surface of the outer shell is provided in each of the outer surface of the inner bag and the inner surface of the outer shell in the shoulder part of the container body, the outer surface of the inner bag and the inner surface of the outer shell contact each other at a convex part of the concave-convex shape and do not contact each other at a concave part of the concave-convex shape, and the container body is a biaxial stretch blow-molded article of a preform that is configured by covering an inner preform that becomes the inner bag with an outer preform that becomes the outer shell.

8. The double container of claim 7, wherein when the concave-convex shape is a first concave-convex shape, a concave-convex shape is not provided or a second concave-convex shape that is not complementary to the first concave-convex shape is provided on the other of the outer surface of the inner bag and the inner surface of the outer shell.

9. The double container of claim 7, wherein when the concave-convex shape is a first concave-convex shape, a second concave-convex shape that is not complementary to the first concave-convex shape is provided on the other of the outer surface of the inner bag and the inner surface of the outer shell.

10. The double container of claim 7, wherein the concave-convex shape includes plural convex parts and plural concave parts arranged irregularly.

11. A double container comprising a container body including an inner bag and an outer shell, wherein the double container is configured such that a mouth part of the inner bag moves in a direction to escape from the outer shell by rotating the inner bag relative to the outer shell, the inner bag is configured to be able to move in the direction by a cam mechanism, the cam mechanism is realized by an engagement structure having direct contact between the outer shell and the inner bag, the container body is a biaxial stretch blow-molded article of a preform that is configured by covering an inner preform that becomes the inner bag with an outer preform that becomes the outer shell, the body part of the outer shell includes a shoulder part of the outer shell that increases in outer diameter as it moves away from the mouth part of the outer shell, and the body part of the inner bag includes a shoulder part of the inner bag that increases in outer diameter as it moves away from the mouth part of the inner bag.

12. The double container of claim 11, wherein the cam mechanism is provided on an outer peripheral surface of the inner bag and an inner peripheral surface of the outer shell.

13. The double container of claim 11, wherein the double container includes a mouth part attachment member, the mouth part attachment member includes a body part and a band part, the body part and the band part are connected to each other via an easily tearable connecting part, the band part is engaged with the mouth part of the outer shell in a circumferential direction and an axial direction, the body part is engaged with the mouth part of the inner bag in a circumferential direction and an axial direction, and the band part is configured to be separable from the body part by tearing the connecting part.

14. The double container of claim 11, wherein
the shoulder part of the outer shell and the shoulder part of the inner bag are in contact with each other.

\* \* \* \* \*